(12) United States Patent
Arao

(10) Patent No.: US 9,262,473 B2
(45) Date of Patent: Feb. 16, 2016

(54) TRAIL LOG ANALYSIS SYSTEM, MEDIUM STORING TRAIL LOG ANALYSIS PROGRAM, AND TRAIL LOG ANALYSIS METHOD

(71) Applicant: FUJITSU LIMITED, Kawasaki-shi (JP)

(72) Inventor: Hidekazu Arao, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 13/720,063

(22) Filed: Dec. 19, 2012

(65) Prior Publication Data

US 2013/0117294 A1 May 9, 2013

Related U.S. Application Data

(63) Continuation of application No. PCT/JP2010/061210, filed on Jun. 30, 2010.

(51) Int. Cl.
*G06F 7/00* (2006.01)
*G06F 17/30* (2006.01)
*G06F 21/55* (2013.01)
(Continued)

(52) U.S. Cl.
CPC ........ *G06F 17/30424* (2013.01); *G06F 21/552* (2013.01); *H04L 63/1425* (2013.01); *G06F 11/3476* (2013.01)

(58) Field of Classification Search
CPC ............ G06F 17/30424; G06F 21/552; G06F 11/3476; H04L 63/1425
See application file for complete search history.

(56) References Cited

U.S. PATENT DOCUMENTS

| 5,446,874 | A | 8/1995 | Waclawsky et al. |
| 7,506,195 | B2 * | 3/2009 | Takahashi et al. ............. 714/4.4 |
| 7,526,521 | B2 * | 4/2009 | Clark et al. ................... 709/203 |

(Continued)

FOREIGN PATENT DOCUMENTS

| JP | 2005-515391 | 5/2005 |
| JP | 2005-322261 | 11/2005 |

(Continued)

OTHER PUBLICATIONS

International Preliminary Report on Patentability mailed Feb. 21, 2013, issued in corresponding PCT Patent Application No. PCT/JP2010/061210.

(Continued)

*Primary Examiner* — Azam Cheema
(74) *Attorney, Agent, or Firm* — Staas & Halsey LLP

(57) ABSTRACT

A trail log analysis system detects a fraudulent operation from a trail log of an information system, and confirms the correctness of a system action. An information development device generates an information development table from a trail log to be analyzed. The information development table defines a subject (who), an object (what), and an action (what is to be done) as comparison targets, and counts and record an event occurrence number corresponding to an event occurrence time recorded in a trail log for each combination of comparison targets. An accumulation device generates an accumulative information development table by accumulating the information development table corresponding to a trail log recorded previously and up to a time point immediately before the last collected trail log to be analyzed. A comparison device compares the information development table with the accumulative information development table, and outputs a comparison result.

18 Claims, 78 Drawing Sheets

(51) Int. Cl.
*H04L 29/06* (2006.01)
*G06F 11/34* (2006.01)

(56) References Cited

U.S. PATENT DOCUMENTS

| | | | |
|---|---|---|---|
| 2005/0076065 A1* | 4/2005 | Guay et al. | 707/200 |
| 2005/0085363 A1 | 4/2005 | Helms et al. | |
| 2006/0101413 A1 | 5/2006 | Kinno et al. | |
| 2007/0038889 A1* | 2/2007 | Wiggins et al. | 714/20 |
| 2007/0180516 A1 | 8/2007 | Aoki et al. | |
| 2009/0292781 A1* | 11/2009 | Teng et al. | 709/206 |

FOREIGN PATENT DOCUMENTS

| | | |
|---|---|---|
| JP | 2005-3222661 | 11/2005 |
| JP | 2005-332345 | 12/2005 |
| JP | 2006-53788 | 2/2006 |
| JP | 2006-195634 | 7/2006 |
| JP | 2007-148946 | 6/2007 |
| JP | 2008-192091 | 8/2008 |
| JP | 2009-20812 | 1/2009 |
| JP | 2009-48410 | 3/2009 |
| JP | 2010-108469 | 5/2010 |
| JP | 2010-128661 | 6/2010 |
| WO | 2005/048119 A1 | 5/2005 |

OTHER PUBLICATIONS

International Search Report of Corresponding PCT Application PCT/JP2010/061210 mailed Oct. 5, 2010.

Extended European Search Report mailed Oct. 24, 2013 in corresponding European Application No. 10854092.3.

Dorothy E. Denning, "An Intrusion-Detection Model", IEEE Transactions on Software Engineering, vol. SE-13, No. 2, Feb. 1987, pp. 222-232.

Office Action mailed Sep. 24, 2013 in corresponding Japanese Application No. 2012-522400.

* cited by examiner

| DATE | TIME | JOB NAME | USER NAME | TERMINAL NAME | LOG TYPE | MAIN DATA | AUXILIARY DATA |
|---|---|---|---|---|---|---|---|
| 2009/1/14 | 16:39:31 | SPJOB | XSYSOPR | WKSTN001 | PGM-INIT | PGM=STRLWSM | CPL=03 |
| 2009/1/14 | 16:39:31 | XLVSM | XSYSMNGR | | EMS | ENT=----- LIB=XJTL0035 | REQ=OPEN ATTR=0000 |
| 2009/1/14 | 16:39:31 | XLVSM | XSYSMNGR | | EMS | ENT=----- LIB=XJTL0035 | REQ=CREATE ATTR=000 |
| 2009/1/14 | 16:39:31 | XLVSM | XSYSMNGR | | EMS | ENT=XJTMPFRM LIB=XJTL0035 | REQ=OPEN ATTR=FRM |
| 2009/1/14 | 16:39:31 | XLVSM | XSYSMNGR | | EMS | ENT=XJTMPFRM LIB=XJTL0035 | REQ=CREATE ATTR=FRM |
| 2009/1/14 | 16:39:31 | XLVSM | XSYSMNGR | | EMS | ENT=XJLG LIB=XJTL0035 | REQ=OPEN ATTR=LOG |
| 2009/1/14 | 16:39:31 | XRKOTL | XSYSMNGR | | TLIBEX | SYSCALL=CHGDIR ERRNO=0 FILEKIND=TDIR EUID=0 EGID=0 OWNUID=0 OWNGID=0 | OMODE=R |
| 2009/1/14 | 16:39:31 | XRKOTL | XSYSMNGR | | TLIBEX | SYSCALL=OPEN ERRNO=0 FILEKIND=TFILE EUID=0 EGID=0 OWNUID=0 OWNGID=0 | OMODE=R |
| 2009/1/14 | 16:39:31 | XRKOTL | XSYSMNGR | | TLIBEX | SYSCALL=OPEN ERRNO=2 FILEKIND= EUID=0 EGID=0 OWNUID=0 OWNGID=0 INODE=0 TLIB= | FMC |
| 2009/1/14 | 16:39:31 | XLVSM | XSYSMNGR | | TLIBEX | SYSCALL=DELETE ERRNO=2 FILEKIND= EUID=0 EGID=0 OWNUID=0 OWNGID=0 INODE=0 TLIB= | FMC |
| 2009/1/14 | 16:39:31 | XLVSM | XSYSMNGR | | TLIBEX | SYSCALL=DELETE ERRNO=0 FILEKIND=TFILE EUID=0 EGID=0 OWNUID=0 OWNGID=0 INODE=2 TLIB=XS | |
| 2009/1/14 | 16:39:31 | XLVSM | XSYSMNGR | | TLIBEX | SYSCALL=CHGDIR ERRNO=0 FILEKIND=TDIR EUID=0 EGID=0 OWNUID=0 OWNGID=0 INODE=0 TLIB=XS | |
| 2009/1/14 | 16:39:31 | XLVSM | XSYSMNGR | | JOBSTART | JOB=XLVSM PROFILE=XSYSMNGR | RESULT=OK |
| 2009/1/14 | 16:39:31 | SPJOB | XSYSOPR | WKSTN001 | SBMJOB | JOB=XLVSM PROFILE=XSYSMNGR | RESULT=OK |
| 2009/1/14 | 16:39:31 | XLVSM | XSYSMNGR | WKSTN001 | PGM-TERM | PGM=STRLWSM | CPL=03 PGMEC=0000 |
| 2009/1/14 | 16:39:31 | XLVSM | XSYSMNGR | | EMS | ENT=LWJOBD11 LIB=WSENV | REQ=OPEN ATTR=JOBD |
| 2009/1/14 | 16:39:31 | XLVSM | XSYSMNGR | | TLIBEX | SYSCALL=OPEN ERRNO=2 FILEKIND= EUID=0 EGID=0 OWNUID=0 OWNGID=0 INODE=0 | OMODE=R |
| 2009/1/14 | 16:39:31 | SPJOB | XSYSOPR | WKSTN001 | PGM-INIT | PGM=STRLWWTR | CPL=03 |
| 2009/1/14 | 16:39:31 | XLVSM | XSYSMNGR | | EMS | ENT=LWJOBD11 LIB=WSENV | REQ=CLOSE ATTR=JOBD |
| 2009/1/14 | 16:39:31 | XLVSM | XSYSMNGR | | TLIBEX | SYSCALL=OPEN ERRNO=0 FILEKIND=TFILE EUID=0 EGID=0 OWNUID=0 OWNGID=0 | OMODE=R |
| 2009/1/14 | 16:39:31 | XLVSM | XSYSMNGR | | TLIBEX | SYSCALL=OPEN ERRNO=0 FILEKIND=TFILE EUID=0 EGID=0 OWNUID=0 OWNGID=0 | OMODE=R |
| 2009/1/14 | 16:39:31 | XLVSM | XSYSMNGR | | TLIBEX | SYSCALL=OPEN ERRNO=0 FILEKIND=TFILE EUID=0 EGID=0 OWNUID=0 OWNGID=0 | OMODE=R |
| 2009/1/14 | 16:39:31 | XLVSM | XSYSMNGR | | TLIBEX | SYSCALL=OPEN ERRNO=6 FILEKIND=TFILE EUID=0 EGID=0 OWNUID=0 OWNGID=0 | OMODE=RW |
| 2009/1/14 | 16:39:31 | XLVSM | XSYSMNGR | | EMS | ENT=LWJOBD11 LIB=WSENV | REQ=OPEN ATTR=JOBD |
| 2009/1/14 | 16:39:31 | SPJOB | XSYSOPR | | EMS | ENT=----- LIB=XJTL0036 | REQ=CLOSE ATTR=JOB |
| 2009/1/14 | 16:39:32 | LWWTR1 | XSYSMNGR | | EMS | ENT=----- LIB=XJTL0036 | REQ=OPEN ATTR=0000 |
| 2009/1/14 | 16:39:32 | XLVSM | XSYSMNGR | WKSTN001 | SYSLOG | MSGID=S7636 TYPE=SNDA | FROM=SCLVS|XLVSM |
| 2009/1/14 | 16:39:32 | LWWTR1 | XSYSMNGR | | EMS | ENT=----- LIB=XJTL0036 | REQ=CREATE ATTR=000 |
| 2009/1/14 | 16:39:32 | XLVSM | XSYSMNGR | | TLIBEX | SYSCALL=OPEN ERRNO=6 FILEKIND=TFILE EUID=0 EGID=0 OWNUID=0 OWNGID=0 | OMODE=RW |
| 2009/1/14 | 16:39:32 | LWWTR1 | XSYSMNGR | | EMS | ENT=XJTMPFRM LIB=XJTL0036 | REQ=OPEN ATTR=FRM |
| 2009/1/14 | 16:39:32 | LWWTR1 | XSYSMNGR | | EMS | ENT=XJTMPFRM LIB=XJTL0036 | REQ=CREATE ATTR=FRM |
| 2009/1/14 | 16:39:32 | LWWTR1 | XSYSMNGR | WKSTN001 | JOBSTART | JOB=LWWTR1 PROFILE=XSYSMNGR | RESULT=OK |
| 2009/1/14 | 16:39:32 | SPJOB | XSYSOPR | WKSTN001 | SBMJOB | JOB=LWWTR1 PROFILE=XSYSMNGR | RESULT=OK |
| 2009/1/14 | 16:39:32 | LWWTR1 | XSYSMNGR | WKSTN001 | SYSLOG | MSGID=S5904 TYPE=SNDA | FROM=SCLVS|LWWTR1 |

WHEN — WHO — WHAT IS DONE

■ACCUMULATIVE INFORMATION DEVELOPMENT TABLE

| USER | RESOURCE | TYPE OF INFORMATION | DIRECT OPERATION | FREQUENCY | UP COUNTER | TIME ZONE | | | |
|---|---|---|---|---|---|---|---|---|---|
| | | | | | | T1 | T1 VALID /UP COUNTER | T2 | T2 VALID /UP COUNTER |
| USER1 | RESOURCE1 | ACCUMULATIVE | 0 | N | (C) | N | (C) | N | (C) |
| USER1 | RESOURCE1 | LATEST | 0 | 30 | — | 3 | 1 | 27 | 1 |
| USER1 | RESOURCE2 | ACCUMULATIVE | 0 | N | (C) | N | (C) | N | (C) |
| USER1 | RESOURCE2 | LATEST | 0 | 5 | — | 1 | 1 | 5 | 1 |
| USER2 | RESOURCE1 | ACCUMULATIVE | 0 | N | (C) | N | (C) | N | (C) |
| USER2 | RESOURCE1 | LATEST | 0 | 75 | — | 20 | 1 | 55 | 1 |
| USER2 | RESOURCE2 | ACCUMULATIVE | 0 | N | (C) | N | (C) | N | (C) |
| USER2 | RESOURCE2 | LATEST | 0 | 22 | — | 5 | 1 | 16 | 1 |
| USER3 | RESOURCE1 | ACCUMULATIVE | 0 | N | (C) | N | (C) | N | (C) |
| USER3 | RESOURCE1 | LATEST | 0 | 3 | — | 2 | 1 | 1 | 1 |

FIG. 3A

■ACCUMULATIVE INFORMATION DEVELOPMENT TABLE

| DATE | | | | ... | | | DAY OF WEEK | | ... | | | REPORT | NG |
|---|---|---|---|---|---|---|---|---|---|---|---|---|---|
| 1 | 1 VALID /UP COUNTER | 2 | 2 VALID /UP COUNTER | ... | 31 | 31 VALID /UP COUNTER | SUN | SUN VALID /UP COUNTER | ... | SAT | SAT VALID /UP COUNTER | | |
| N 3 | (C) 1 | N 2 | (C) 1 | | N 0 | (C) 0 | N 0 | (C) 1 | | N 1 | (C) 1 | — | — |
| N 3 | (C) 1 | N 2 | (C) 1 | | N 0 | (C) 0 | N 0 | (C) 1 | | N 2 | (C) 1 | (A) | (B) |
| N 0 | (C) 1 | N 3 | (C) 1 | | N 0 | (C) 0 | N 0 | (C) 1 | | N 3 | (C) 1 | — | — |
| N 2 | (C) 1 | N 1 | (C) 1 | | N 0 | (C) 0 | N 0 | (C) 1 | | N 2 | (C) 1 | (A) | (B) |
| N 0 | (C) 1 | N 0 | (C) 1 | | N 0 | (C) 0 | N 0 | (C) 1 | | N 2 | (C) 1 | (A) | (B) |

(A) REPORT ITEM: COMPARISON RESULT BETWEEN ACCUMULATED RECORD AND LATEST RECORD
0: INITIAL VALUE
1: NEW OCCURRENCE
2: FREQUENCY EXCEEDING SPECIFIED RANGE
3: RATE EXCEEDING SPECIFIED RANGE
4: RATE NOT REACHING SPECIFIED RANGE (B) NG ITEM: ADMINISTRATOR DETERMINATION RESULT
0: INITIAL VALUE, NORMAL
1: ABNORMAL (C) EACH UP COUNTER
RECORDING ACCUMULATION FREQUENCY WHEN EACH VALID ITEM OF LATEST NORMAL RECORD IS ACCUMULATED TO EACH ACCUMULATED RECORD

FIG. 3B

■ACCUMULATIVE INFORMATION DEVELOPMENT TABLE

FROM INFORMATION DEVELOPMENT TABLE 

| USER | RESOURCE | TYPE OF INFORMATION | DIRECT OPERATION | FREQUENCY | UP COUNTER | TIME ZONE | | | |
|---|---|---|---|---|---|---|---|---|---|
| | | | | | | T1 | T1 VALID /UP COUNTER | T2 | T2 VALID /UP COUNTER |
| USER1 | RESOURCE1 | ACCUMULATIVE | 0 | N | (C) | N | (C) | N | (C) |
| USER1 | RESOURCE1 | LATEST | 0 | 30 | — | 3 | 1 | 27 | 1 |
| USER1 | RESOURCE2 | ACCUMULATIVE | 0 | N | (C) | N | (C) | N | (C) |
| USER1 | RESOURCE2 | LATEST | 0 | 5 | — | 1 | 1 | 5 | 1 |
| USER2 | RESOURCE1 | ACCUMULATIVE | 0 | N | (C) | N | (C) | N | (C) |
| USER2 | RESOURCE1 | LATEST | 0 | 75 | — | 20 | 1 | 55 | 1 |
| USER2 | RESOURCE2 | ACCUMULATIVE | 0 | N | (C) | N | (C) | N | (C) |
| USER2 | RESOURCE2 | LATEST | 0 | 22 | — | 5 | 1 | 16 | 1 |
| USER3 | RESOURCE1 | ACCUMULATIVE | 0 | N | (C) | N | (C) | N | (C) |
| USER3 | RESOURCE1 | LATEST | 0 | 3 | — | 2 | 1 | 1 | 1 |

FIG. 4B

■ACCUMULATIVE INFORMATION DEVELOPMENT TABLE

| | DATE | | | | | | | DAY OF WEEK | | | | REPORT | NG |
|---|---|---|---|---|---|---|---|---|---|---|---|---|---|
| 1 | 1 VALID /UP COUNTER | 2 | 2 VALID /UP COUNTER | ... | 31 | 31 VALID /UP COUNTER | SUN | SUN VALID /UP COUNTER | ... | SAT | SAT VALID /UP COUNTER | | |
| N | (C) | N | (C) | | N | (C) | N | (C) | | N | (C) | — | — |
| 3 | 1 | 2 | 1 | | 0 | 0 | 0 | 1 | | 1 | 1 | (A) | (B) |
| N | (C) | N | (C) | | N | (C) | N | (C) | | N | (C) | — | — |
| 3 | 1 | 2 | 1 | | 0 | 0 | 0 | 1 | | 2 | 1 | (A) | (B) |
| N | (C) | N | (C) | | N | (C) | N | (C) | | N | (C) | — | — |
| 0 | 1 | 3 | 1 | | 0 | 0 | 0 | 1 | | 3 | 1 | (A) | (B) |
| N | (C) | N | (C) | | N | (C) | N | (C) | | N | (C) | — | — |
| 2 | 1 | 1 | 1 | | 0 | 0 | 0 | 1 | | 2 | 1 | (A) | (B) |
| N | (C) | N | (C) | | N | (C) | N | (C) | | N | (C) | — | — |
| 0 | 1 | 0 | 1 | | 0 | 0 | 0 | 1 | | 2 | 1 | (A) | (B) |

F I G. 4 C

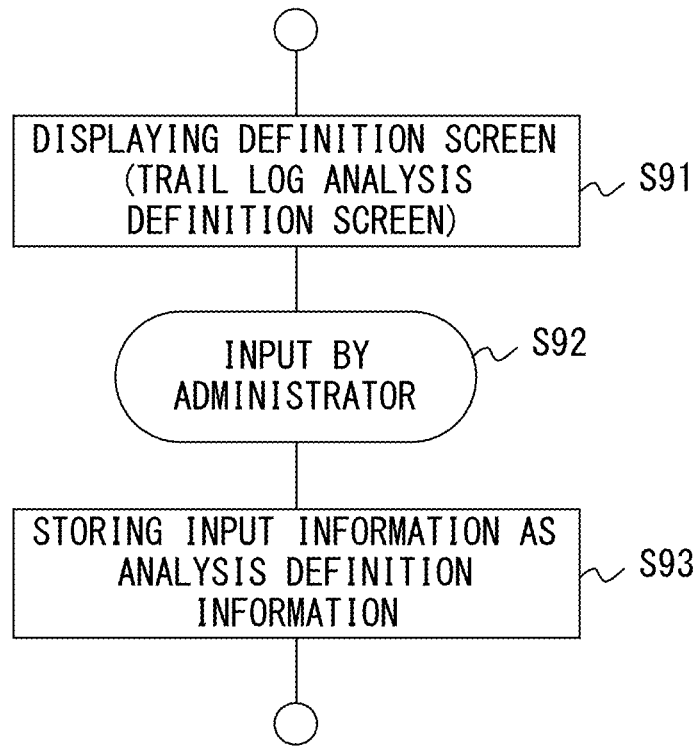
F I G. 9

■TRAIL LOG ANALYSIS DEFINITION INPUT SCREEN

- COMPARISON KEY
  - ☐USER  ☐RESOURCE  ☐JOB

---

- COMPARISON ZONE
  ____DATE  ____DAY OF WEEK  ____~____TIME ZONE
- COMPARISON KEY VALUE
  USER____ 、RESOURCE____ 、JOB____
- SPECIFIED FREQUENCY

____

- SPECIFIED RATE (%)
  ____~____

.
.
.

- COMPARISON ZONE
  ____DATE  ____DAY OF WEEK  ____~____TIME ZONE
- COMPARISON KEY VALUE
  USER____ 、RESOURCE____ 、JOB____
- SPECIFIED FREQUENCY

____

- SPECIFIED RATE (%)
  ____~____

F I G. 1 0

■DATA STRUCTURE OF ANALYSIS DEFINITION INFORMATION

| DEFINITION ITEM | VALUE |
| --- | --- |
| (A) COMPARISON KEY | USER, RESOURCE, JOB |
| (B) COMPARISON ZONE | XXX |
| (C) COMPARISON KEY VALUE | USER=x x x<br>RESOURCE=xxx<br>JOB=x x x |
| (D) SPECIFIED FREQUENCY | NNN |
| (E) SPECIFIED RATE(%) | NNN~NNN |
| ⋮ | |
| (B) COMPARISON ZONE | XXX |
| (C) COMPARISON KEY VALUE | USER=x x x<br>RESOURCE=xxx<br>JOB=x x x |
| (D) SPECIFIED FREQUENCY | NNN |
| (E) SPECIFIED RATE | NNN~NNN |

\* REPEATEDLY DEFINING FOR EACH COMPARISON ZONE "COMPARISON KEY VALUE", "COMPARISON ZONE", "SPECIFIED FREQUENCY", AND "SPECIFIED RATE"

FIG. 11

TRAIL LOG TO BE ANALYZED

| LINE NUMBER | DATE | TIME | JOB NAME | USER | LOG TYPE | MAIN DATA | AUXILIARY DATA |
|---|---|---|---|---|---|---|---|
| 1 | FEB. 1, 2009 | 08:10:20 | XCTL | | AUTH | PROF=PROF1 | |
| 2 | FEB. 1, 2009 | 08:10:22 | XCTL | | AUTH | PROF=PROF2 | |
| 3 | FEB. 1, 2009 | 08:20:30 | XCTL | | AUTH | PROF=ARA0 | |
| 4 | FEB. 1, 2009 | 08:22:12 | DJOB | :PROF1 | WSLOG | | ****:SAVEFILE JUCHUPF.BLIB, **** |
| 5 | FEB. 1, 2009 | 08:25:00 | AJOB | :PROF2 | RDB | FL=P100.ALIB | OP=OPEN |
| 6 | FEB. 1, 2009 | 08:25:05 | AJOB | :PROF2 | RDB | FL=P100.ALIB | OP=READ |
| 7 | FEB. 1, 2009 | 08:30:30 | **** | **** | **** | **** | ****** |
| 8 | FEB. 1, 2009 | 10:10:20 | BJOB | :ARA0 | RDB | FL=P200.ALIB | OP=OPEN |
| 9 | FEB. 1, 2009 | 10:10:25 | BJOB | :ARA0 | RDB | FL=P200.ALIB | OP=WRITE |
| 10 | FEB. 1, 2009 | 10:10:30 | BJOB | :ARA0 | RDB | FL=P200.ALIB | OP=WRITE |
| 11 | FEB. 1, 2009 | 10:10:33 | **** | :ARA0 | **** | **** | ****** |
| 12 | | | | | | | |
| 13 | FEB. 2, 2009 | 09:25:00 | AJOB | :ARA0 | RDB | FL=P100.ALIB | OP=OPEN |
| 14 | FEB. 2, 2009 | 09:30:05 | AJOB | :ARA0 | RDB | FL=P100.ALIB | OP=WRITE |

ONE LINE REFERS TO ONE EVENT

F I G. 1 2 A

ⒶⒷ

| USER | DIRECT OPERATION | FREQUENCY | DATE | | | |
|---|---|---|---|---|---|---|
| | | | 1 | 2 | ... | 31 |
| PROF1 | 0 | 1 | 1 | 0 | ... | 0 |
| PROF2 | 0 | 1 | 1 | 0 | ... | 0 |
| ARAO | 0 | 2 | 1 | 1 | ... | 0 |

INFORMATION DEVELOPMENT TABLE (USER)

ⒸⒹ

| RESOURCE | DIRECT OPERATION | FREQUENCY | DATE | | | |
|---|---|---|---|---|---|---|
| | | | 1 | 2 | ... | 31 |
| JUCHUPF | 1 | 1 | 1 | 0 | ... | 0 |
| P100.ALIB | 0 | 4 | 2 | 2 | ... | 0 |
| P200.ALIB | 0 | 3 | 3 | 0 | ... | 0 |

INFORMATION DEVELOPMENT TABLE (RESOURCE)

ⒺⒻ

| USER | DIRECT OPERATION | FREQUENCY | DATE | | | |
|---|---|---|---|---|---|---|
| | | | 1 | 2 | ... | 31 |
| SAVFILE | 1 | 1 | 1 | 0 | ... | 0 |
| AJOB | 0 | 2 | 2 | 0 | ... | 0 |
| BJOB | 0 | 5 | 3 | 2 | ... | 0 |

INFORMATION DEVELOPMENT TABLE (FREQUENCY)

| USER | RESOURCE | JOB | DIRECT OPERATION | FREQUENCY | DATE | | | |
|---|---|---|---|---|---|---|---|---|
| | | | | | 1 | 2 | ... | 31 |
| PROF1 | JUCHUPF.BLIB | SAVFILE | 1 | 1 | 1 | 0 | ... | 0 |
| PROF2 | P100.ALIB | AJOB | 0 | 2 | 2 | 0 | ... | 0 |
| ARAO | P200.ALIB | BJOB | 0 | 3 | 3 | 0 | ... | 0 |
| ARAO | P100.ALIB | AJOB | 0 | 2 | 0 | 2 | ... | 0 |

INFORMATION DEVELOPMENT TABLE (USER/RESOURCE/JOB)

F I G. 1 2 B

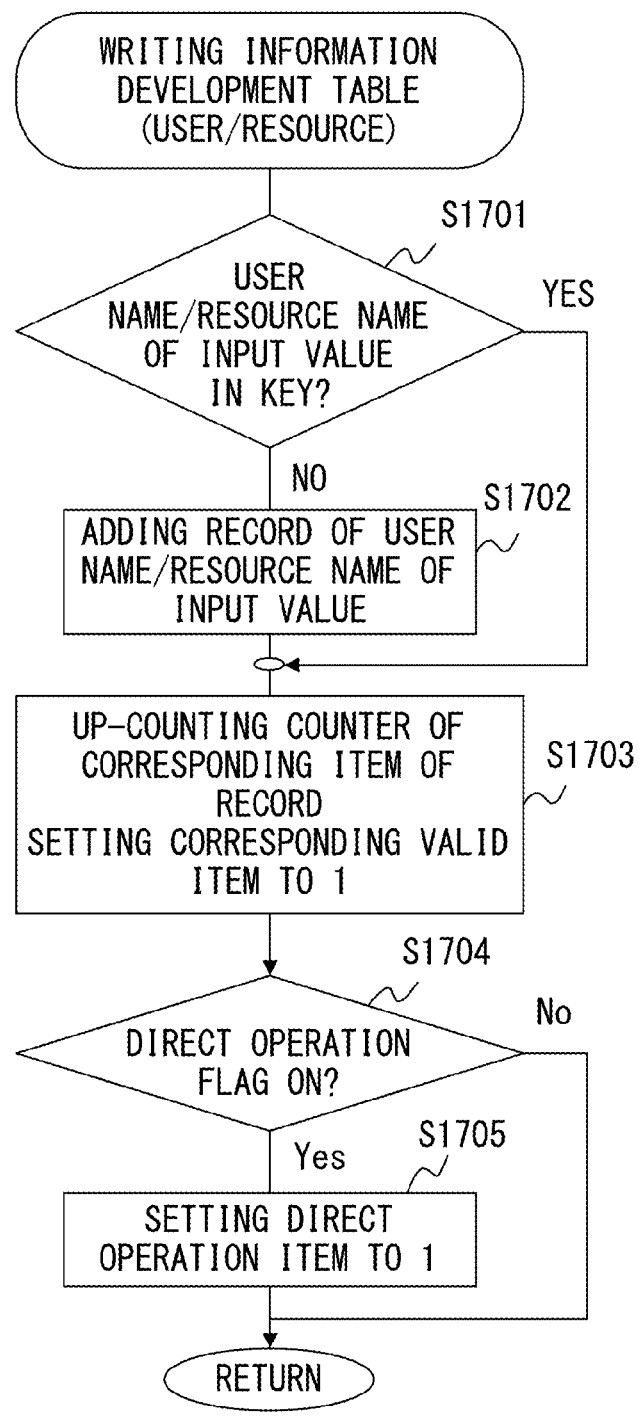
F I G. 1 7

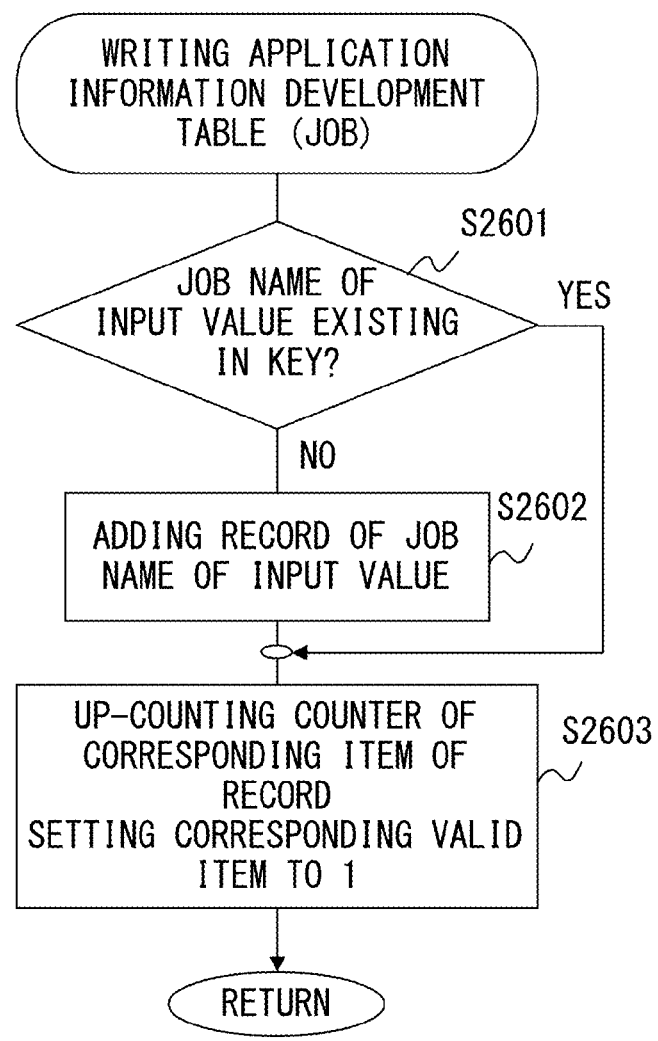
F I G. 2 6

INFORMATION DEVELOPMENT TABLE (USER/RESOURCE/JOB)

| USER | RESOURCE | JOB | FREQUENCY | DATE | | |
|---|---|---|---|---|---|---|
| | | | | 1 | 2 | 31 |
| PROF1 | JUCHUPF.BLIB | DJOB | 1 | 1 | 0 | 0 |
| PROF2 | P100.ALIB | AJOB | 2 | 2 | 0 | 0 |
| ARAO | P200.ALIB | BJOB | 3 | 3 | 0 | 0 |
| ARAO | P100.ALIB | AJOB | 2 | 0 | 2 | 0 |

ADDING RECORD (EVENT)

ACCUMULATIVE INFORMATION DEVELOPMENT TABLE (USER/RESOURCE/JOB)

| USER | FREQUENCY | TIME ZONE | | | | DATE | | | | DAY OF WEEK | | | NG |
|---|---|---|---|---|---|---|---|---|---|---|---|---|---|
| | | T1 | T2 | ≈ | T4 | 1 | 2 | ≈ | 30 | 31 | MON | ≈ | SUN | |
| 1 | 3 | 1 | 1 | | 0 | 0 | 1 | | 0 | 0 | 1 | | 0 | 0 |
| 2 | 5 | 1 | 2 | | 1 | 1 | 1 | | 1 | 0 | 1 | | 0 | 0 |
| 3 | 1 | 0 | 1 | | 0 | 0 | 1 | | 0 | 0 | 0 | | 0 | 0 |
| ≈ | | | | | | | | | | | | | | |
| 15 | 6 | 1 | 1 | | 3 | 1 | 0 | | 1 | 3 | 1 | | 2 | 0 |

| RESOURCE | SAME |
|---|---|
| | |

| JOB | SAME |
|---|---|
| | |

| USER | RESOURCE | SAME |
|---|---|---|
| | | |

| USER | JOB | SAME |
|---|---|---|
| | | |

| USER | RESOURCE | JOB | SAME |
|---|---|---|---|
| | | | |

F I G. 3 1 A (1) WITHOUT ACCUMULATION, LATEST OCCURRENCE

| USER | RESOURCE | JOB | TYPE OF INFORMATION | FRE-QUEN-CY | DATE 1 | 2 | 3 | 4 | 5 | ... | 31 | RE-PORT | NG |
|---|---|---|---|---|---|---|---|---|---|---|---|---|---|
| PROF2 | P100.ALIB | AJOB | ACCUMULATIVE | 0 | 0 | 0 | 0 | 0 | 0 | ... | 0 | 0 | 0 |
| PROF2 | P100.ALIB | AJOB | LATEST | 5 | 0 | 5 | 0 | 0 | 0 | ... | 0 | 0 | 0 |

ADDING RECORD (2) ACCUMULATED, LATEST OCCURRENCE

| USER | RESOURCE | JOB | TYPE OF INFORMATION | FRE-QUEN-CY | DATE 1 | 2 | 3 | 4 | 5 | ... | 31 | RE-PORT | NG |
|---|---|---|---|---|---|---|---|---|---|---|---|---|---|
| PROF2 | P100.ALIB | AJOB | ACCUMULATIVE | 250 | 10 | 12 | 8 | 2 | 10 | ... | 8 | 0 | 0 |
| PROF2 | P100.ALIB | AJOB | LATEST | 5 | 0 | 5 | 0 | 0 | 0 | ... | 0 | 0 | 0 |

← ADDING COUNT (3) ACCUMULATED, LATEST OCCURRENCE NOT DETECTED

| USER | RESOURCE | JOB | TYPE OF INFORMATION | FRE-QUEN-CY | 日 1 | 2 | 3 | 4 | 5 | ... | 31 | RE-PORT | NG |
|---|---|---|---|---|---|---|---|---|---|---|---|---|---|
| PROF2 | P100.ALIB | AJOB | ACCUMULATIVE | 250 | 10 | 12 | 8 | 2 | 10 | ... | 8 | 0 | 0 |
| PROF2 | P100.ALIB | AJOB | LATEST | 0 | 0 | 0 | 0 | 0 | 0 | ... | 0 | 0 | 0 |

F I G. 3 1 B

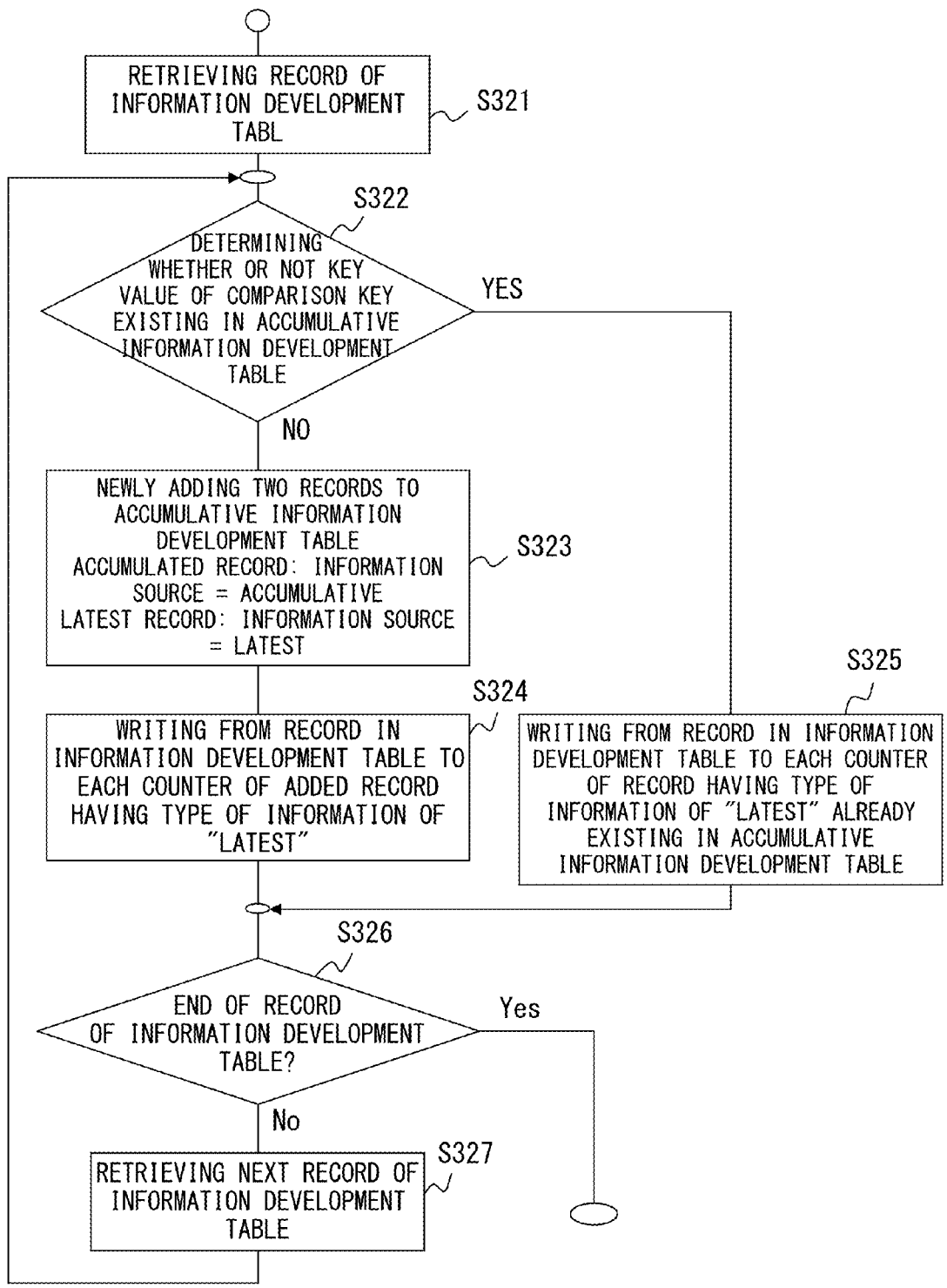
F I G. 3 2

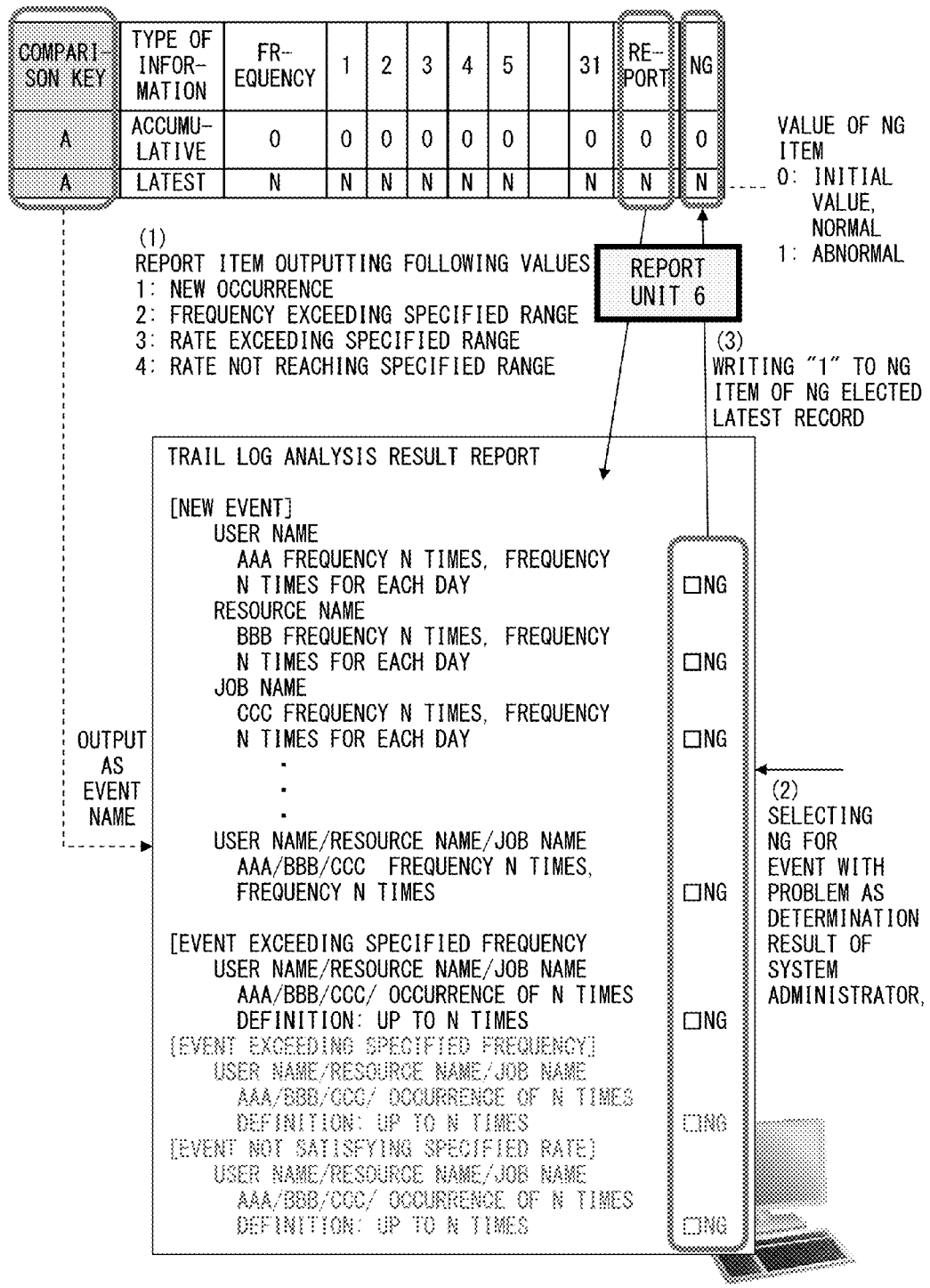
F I G. 3 5

ACCUMULATIVE INFORMATION DEVELOPMENT TABLE (USER/RESOURCE/JOB)

| USER | RESOURCE | JOB | TYPE OF INFORMATION | DIRECT OPERATION | FREQUENCY | 1 | 2 | 3 | 4 | 5 | ... | 31 | REPORT | NG |
|---|---|---|---|---|---|---|---|---|---|---|---|---|---|---|
| YAMAMOTO | FILEA | ORDERPRO | ACCUMULATIVE | 0 | 320 | 10 | 8 | 12 | 15 | 3 | ... | 8 | 0 | 0 |
| YAMAMOTO | FILEA | ORDERPRO | LATEST | 0 | 0 | 0 | 0 | 0 | 0 | 0 | | 0 | 0 | 0 |
| TANAKA | FILEA | ORDERPRO | ACCUMULATIVE | 0 | 280 | 8 | 7 | 5 | 10 | 5 | | 3 | 0 | 0 |
| TANAKA | FILEA | ORDERPRO | LATEST | 0 | 0 | 0 | 0 | 0 | 0 | 0 | | 0 | 0 | 0 |
| TANAKA | FILEA | EDTFILE | ACCUMULATIVE | 0 | 0 | 0 | 0 | 0 | 0 | 0 | | 0 | 0 | 0 |
| TANAKA | FILEA | EDTFILE | LATEST | 1 | 0 | 0 | 0 | 0 | 0 | 0 | | 0 | 1 | 1 |

WRITING COMMAND NAME OF DIRECT OPERATION

USER LIMITING DEFINITION

USER=TANAKA
COMMAND=EDTFILE

OPERATION PROHIBIT INFORMATION REFLECTION UNIT 7

F I G. 3 7

(1) NORMAL EVENT (NG ITEM VALUE = 0)

| COMPARISON KEY | TYPE OF INFORMATION | FREQUENCY | 1 | 1 VALID/UP COUNTER | 2 | 2 VALID/UP COUNTER | 3 | 3 VALID/UP COUNTER | ... | 31 | 31 VALID/UP COUNTER | REPORT | NG |
|---|---|---|---|---|---|---|---|---|---|---|---|---|---|
| | | | | | | | | | DATE | | | | |
| A | ACCUMULATIVE | x | x1 | N | x2 | N | x3 | N | | x31 | N | O | O |
| A | LATEST | (y) | y1 | 1 | y2 | 1 | O | O | | y31 | O | N | (O) |

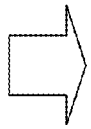

| COMPARISON KEY | TYPE OF INFORMATION | FREQUENCY | 1 | 1 VALID/UP COUNTER | 2 | 2 VALID/UP COUNTER | 3 | 3 VALID/UP COUNTER | ... | 31 | 31 VALID/UP COUNTER | REPORT | NG |
|---|---|---|---|---|---|---|---|---|---|---|---|---|---|
| | | | | | | | | | DATE | | | | |
| A | ACCUMULATIVE | x+y | x1+y1 | N+S | x2+y2 | N+S | x3 | N | | x31 | N | O | O |
| A | LATEST | O | O | O | O | O | O | O | | O | O | O | O |

*S: RECORDED NUMBER OF CYCLES

COUNT ACCUMULATION ↓
CLEAR ↓

F I G. 3 9 A

ANALYSIS DEFINITION INFORMATION

| DEFINITION ITEM | VALUE |
|---|---|
| COMPARISON KEY | USER, RESOURCE, JOB |
| COMPARISON ZONE | XXX |
| COMPARISON KEY VALUE | XXX、XXX |
| SPECIFIED FREQUENCY | NNN |
| SPECIFIED RATE(%) | NNN |

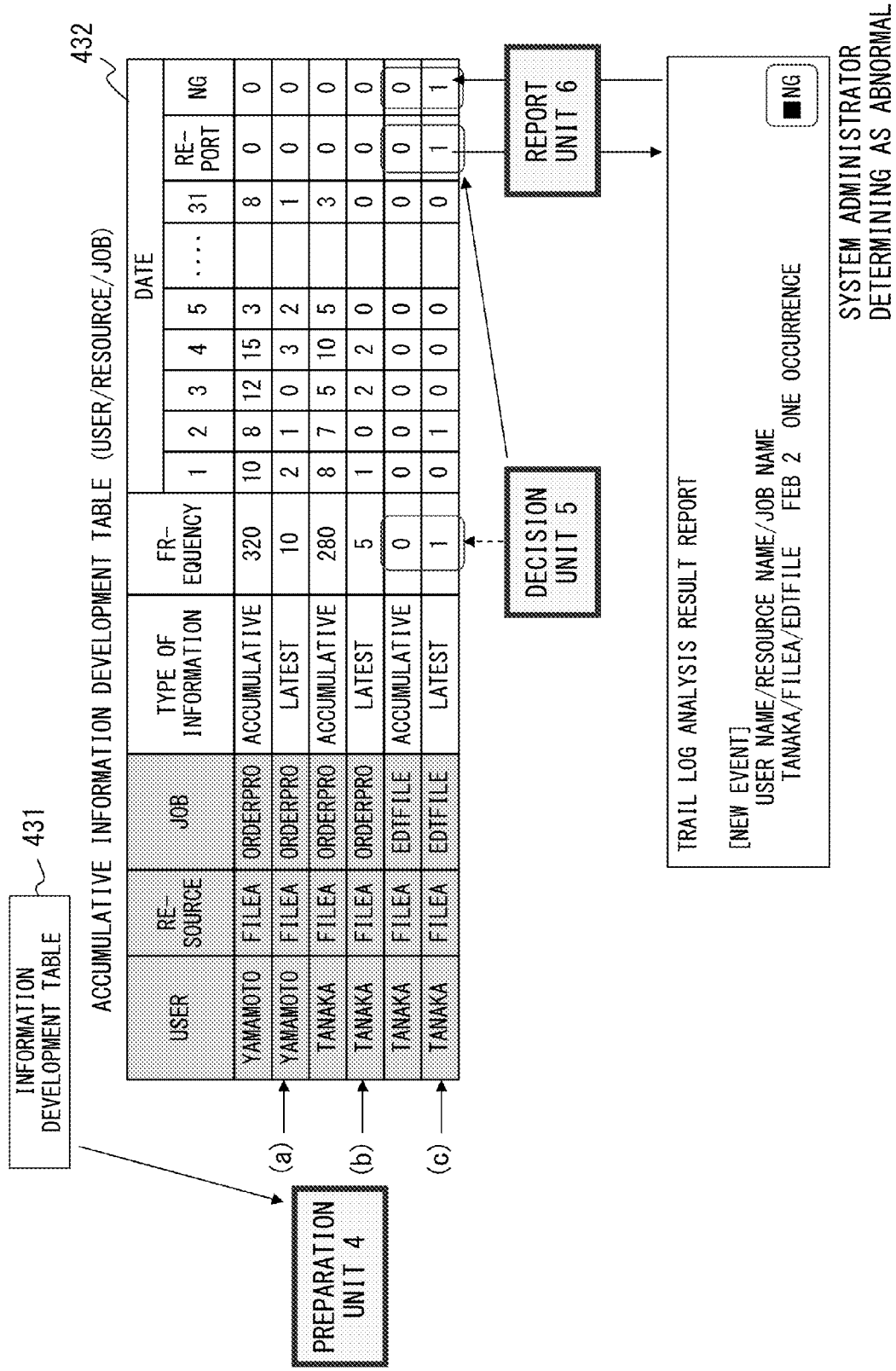
F I G. 43 B

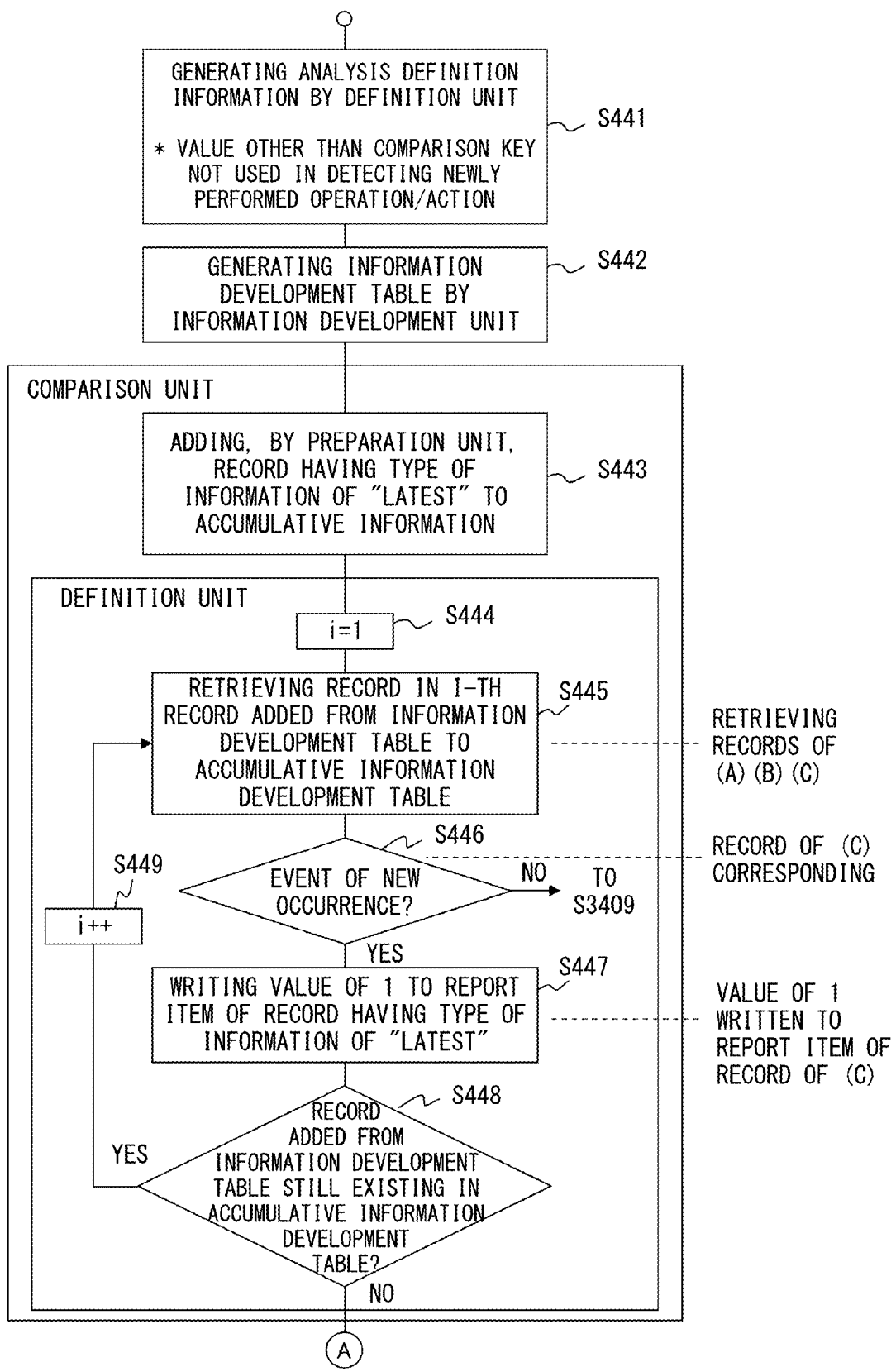
F I G. 4 4 A

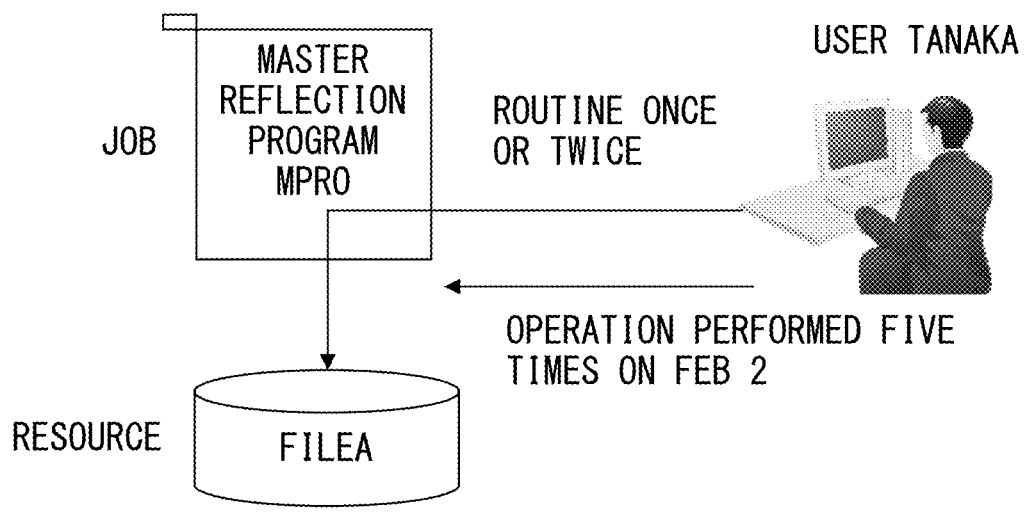
F I G. 4 5

ANALYSIS DEFINITION INFORMATION

| DEFINITION ITEM | VALUE |
|---|---|
| COMPARISON KEY | USER, RESOURCE, JOB |
| COMPARISON ZONE | ALL DAYS |
| COMPARISON KEY VALUE | RESOURCE=FILEA, JOB=MPRO |
| SPECIFIED FREQUENCY | 2 |
| SPECIFIED RATE(%) | NNN |
| ⋮ | |

INFORMATION DEVELOPMENT TABLE (RESOURCE/JOB) 471

| RE-SOURCE | JOB | FRE-QUENCY | DATE | | | | | |
|---|---|---|---|---|---|---|---|---|
| | | | 1 | 2 | 3 | 4 | 5 | ... 31 |
| FILEA | MPRO | 40 | 1 | 5 | 2 | 1 | 1 | 1 |

TRAIL LOG TO BE ANALYZED 470

→ INFORMATION DEVELOPMENT UNIT 2 (a) →

PREPARATION UNIT 4

F I G. 4 7 A

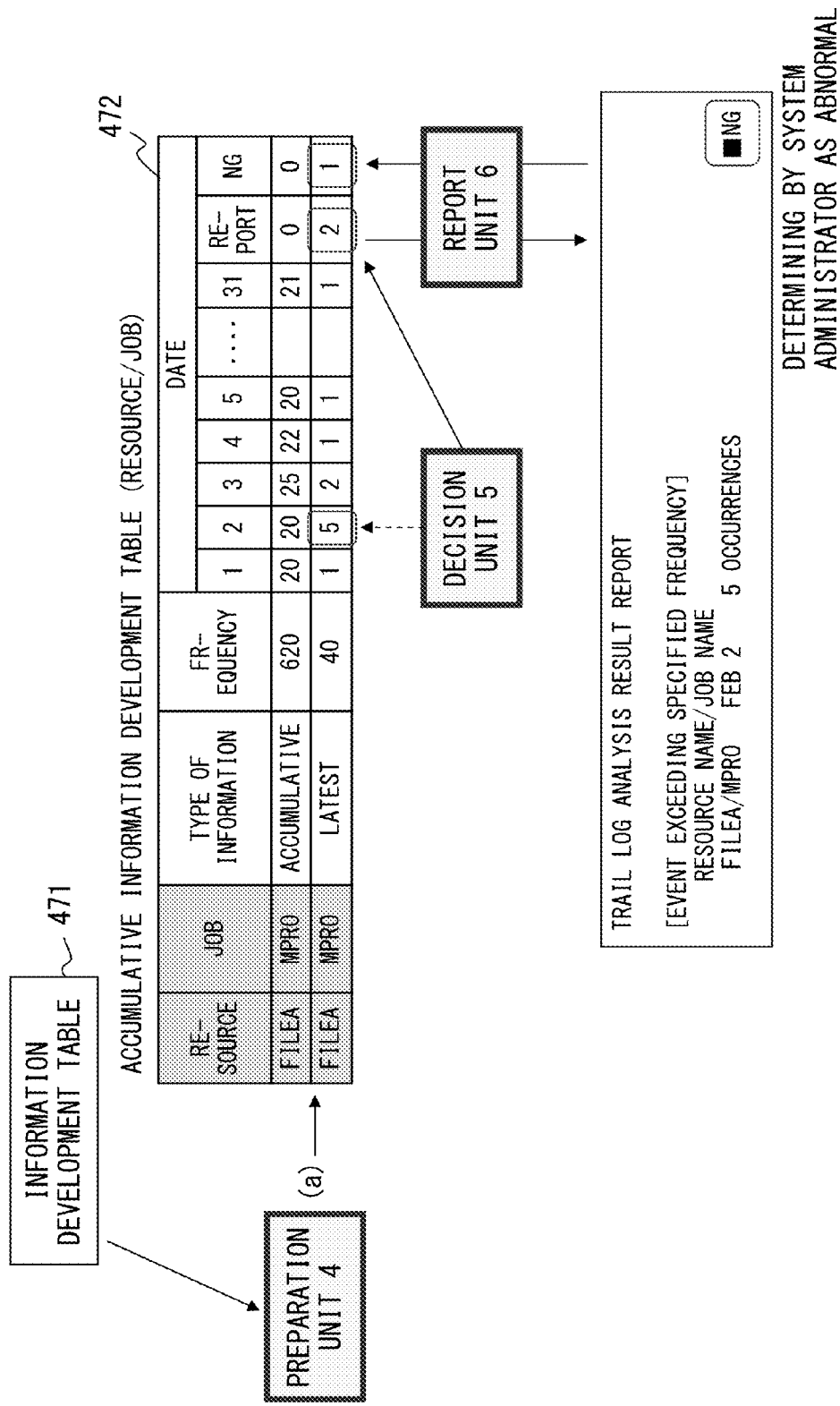
F I G. 47B

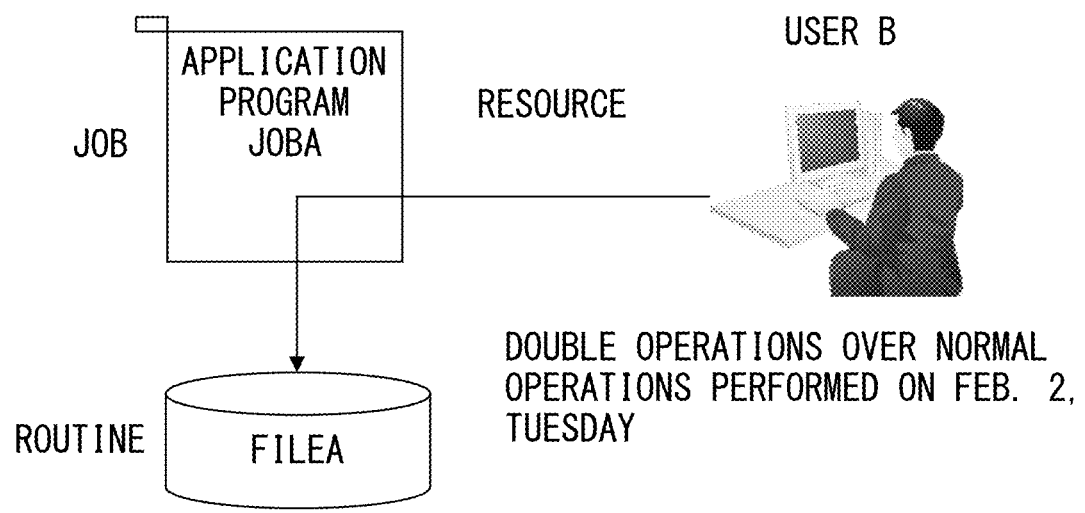
F I G. 4 9

ANALYSIS DEFINITION INFORMATION

| DEFINITION ITEM | VALUE |
|---|---|
| COMPARISON KEY | USER, RESOURCE, JOB |
| COMPARISON ZONE | ALL DAYS OF WEEK |
| COMPARISON KEY VALUE | RESOURCE = FILEA, JOB= JOBA |
| SPECIFIED FREQUENCY | — |
| SPECIFIED RATE(%) | 70~130 |
| ⋮ | |

501

F I G. 5 0

INFORMATION DEVELOPMENT TABLE (USER/RESOURCE/JOB)

511

| | USER | RE-SOURCE | JOB | FRE-QUEN-CY | DAY OF WEEK |||||||||||||
|---|---|---|---|---|---|---|---|---|---|---|---|---|---|---|---|---|
| | | | | | SUN-DAY | SUN-DAY AS VALID | MON-DAY | MON-DAY AS VALID | TUES-DAY | TUES-DAY AS VALID | WEDNES-DAY | WEDNES-DAY AS VALID | THURS-DAY | THURS-DAY AS VALID | FRI-DAY | FRI-DAY AS VALID | SATUR-DAY | SATUR-DAY AS VALID |
| (a) | A | FILEA | JOBA | 35 | 5 | 1 | 5 | 1 | 5 | 1 | 5 | 1 | 5 | 1 | 5 | 1 | 5 | 1 |
| (b) | B | FILEA | JOBA | 39 | 5 | 1 | 4 | 1 | 10 | 1 | 5 | 1 | 5 | 1 | 5 | 1 | 5 | 1 |

PREPARATION UNIT 4

INFORMATION DEVELOPMENT UNIT 2

510

ANALYSIS TARGET TRAIL LOG

F I G. 5 1 A

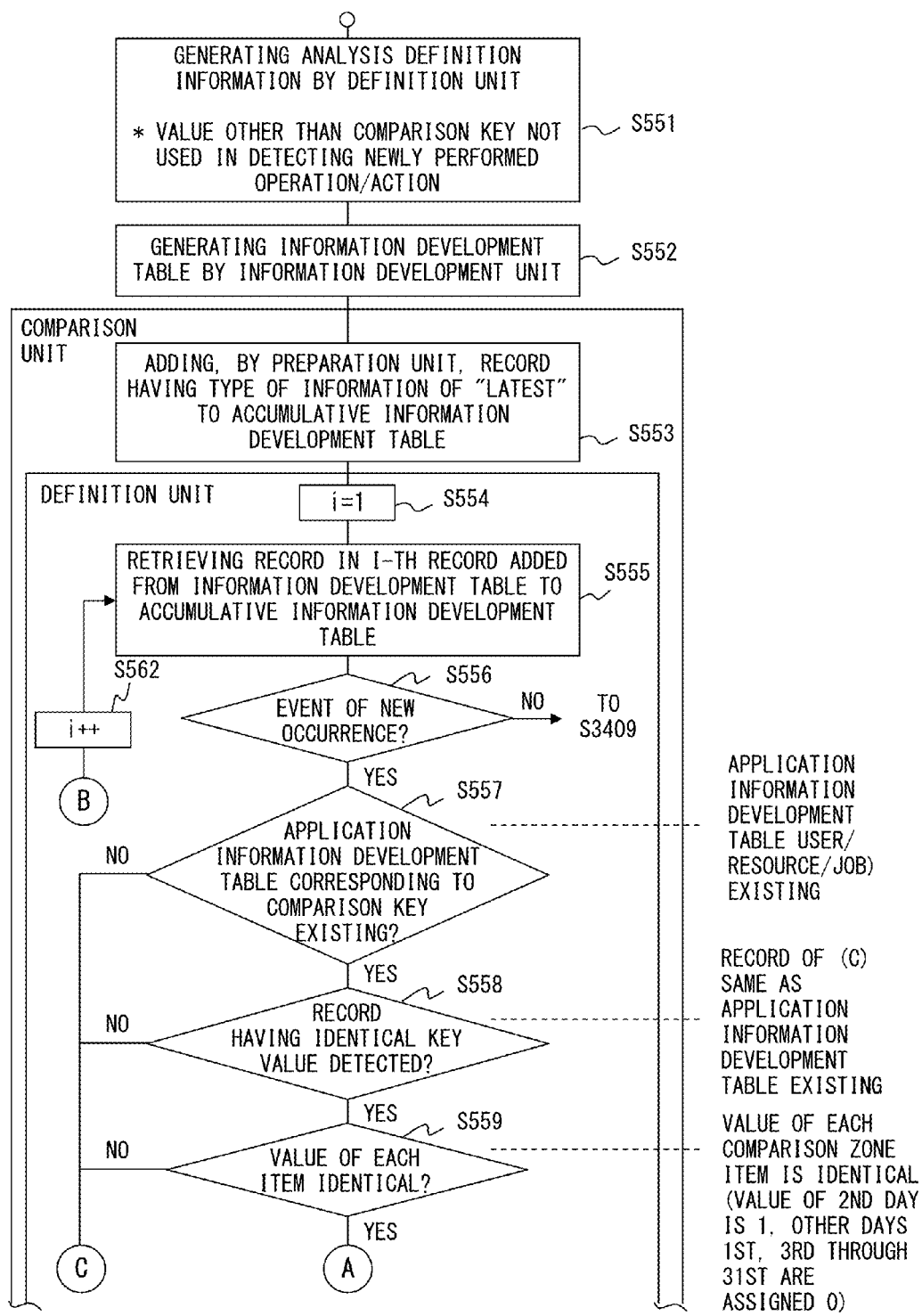
F I G. 5 5 A

ANALYSIS DEFINITION INFORMATION

| DEFINITION ITEM | VALUE |
|---|---|
| COMPARISON KEY | USER, RESOURCE, JOB |
| COMPARISON ZONE | ALL DAYS OF WEEK |
| COMPARISON KEY VALUE | ALL KEYS |
| SPECIFIED FREQUENCY | NNN |
| SPECIFIED RATE (%) | 70~130 |
| ⋮ | |

561

F I G. 5 6

TRAIL LOG ANALYSIS SYSTEM, MEDIUM STORING TRAIL LOG ANALYSIS PROGRAM, AND TRAIL LOG ANALYSIS METHOD

CROSS-REFERENCE TO RELATED APPLICATION

This application is a continuation application of International PCT Application No. PCT/JP2010/061210 which was filed on Jun. 30, 2010.

FIELD

The present invention is (embodiments described herein are) related to the technology of analyzing the trail log collected from an information system.

BACKGROUND

The "trail log" in an information system is a record of all operations and actions in the information system, and refers to the information as a record of all system actions such as a user authentication record, a user operation record, a system administrator operation record, a record of the operations of an application program, etc.

In an information system, there has conventionally been the well-known technology of detecting a fraudulent operation etc. from a collected trail log. The technology is to extract the user information (by determination from a login ID) and error information (for example, an unsuccessful login operation etc.) in a system from a latest collected trail log and add up the number of errors to detect a fraudulent operation. There has been the following problem with the technology of detecting a fraudulent operation only from the latest collected trail log.

Since the contents of an application change every day, a fraudulent operation is not easily detected only from the latest collected trail log.

Since a correct operation depends on each date, each day of week, each time zone, etc, a fraudulent operation is not easily detected only from the latest collected trail log.

Thus, it is difficult to determine a fraudulent operation only from the latest collected trail log, and only a limited fraudulent operation is detected.

On the other hand, there is also a following fraudulent operation detecting technique. That is, a specified fraudulent operation pattern or a specified correct operation is entered in a system to detect a fraudulent operation by performing pattern matching with the latest collected trail log.

A trail log is a large volume of data including a number of information items. The trail log is a large volume of various types of information with the background of the use situation of an information system which changes every day. With the above-mentioned large volume of data, there is a restriction on the number of patterns entered corresponding to fraudulent operations for the large volume of data. Therefore, a pattern of a fraudulent operation has been entered by restricting the entry to the types of operations only on the access to important information (file), or a pattern of a fraudulent operation has been entered by roughly restricting the entry to the copy of a file, the transmission of mail, etc. In addition, in the systems above, it is also important to re-enter a pattern depending on the use situation of an information system which varies every day.

DOCUMENTS OF PRIOR ART

Patent Document

Patent Document 1: Japanese Laid-open Patent Publication No. 2009-20812
Patent Document 2: Japanese Laid-open Patent Publication No. 2007-148946
Patent Document 3: Japanese Laid-open Patent Publication No. 2005-322261
Patent Document 4: Japanese Laid-open Patent Publication No. 2005-515391

As described above, there are the following problems with the conventional technology of detecting a fraudulent operation from a trail log in an information system. First, in the method of determining a fraudulent operation from the latest collected trail log only, a fraudulent operation may be restrictively detected. Furthermore, in the method of entering in advance a fraudulent operation pattern and a correct operation pattern and acquiring pattern matching with the latest collected trail log to detect a fraud, it is difficult to completely enter all patterns, thereby causing limitations. Furthermore, although the conventional technology may detect a fraudulent operation, it is not confirmed in, for example, an information system whether or not a normal operation is performed (the correctness of a system action) by executing a specified application program etc. with specified timing.

SUMMARY

An aspect of an embodiment provides a trail log analysis system having an information development unit, an accumulation unit, and a comparison unit. The information development unit generates an information development table from a trail log to be analyzed. The information development table records the event occurrence number counted for each time zone corresponding to an event occurrence time recorded in a trail log for each combination of comparison targets which are a subject, a target, and an action in a trail log of an information system. The accumulation unit generates an accumulative information development table by accumulating the information development table corresponding to the trail logs containing previously and latest collected trail logs to be analyzed. The comparison unit compares the information development table with the accumulative information development table, and outputs a comparison result.

Another aspect of the embodiment provides a program used to direct an information processing device to perform an information developing step, an accumulating step, and a comparing step.

The information developing step generates an information development table from a trail log to be analyzed. The accumulating step generates an accumulative information development table by accumulating the information development table corresponding to the trail logs containing previously and latest collected trail logs to be analyzed. The comparing step compares the information development table with the accumulative information development table, and outputs a comparison result.

A further aspect of the embodiment also provides a method used by an information processing device according to the program.

The embodiments of the present invention may detect a fraudulent operation, an abnormal action, etc. more correctly in more detail from a trail log of an information system. Furthermore, a high-speed process is performed to detect a fraudulent operation, an abnormal action, etc. by comparing data expressed in numbers as an event occurrence number for a large volume of trail log to be analyzed and accumulative trail log. Since the previous normal trail log is compared with the latest acquired trail log to be analyzed, it is confirmed without fail whether or not a fraudulent operation, an abnormal action, normally performed operation and action are performed. Furthermore, since a fraudulent operation etc. is detected by comparing the accumulative information with the latest collected information, an entry operation by an administrator etc. for a fraudulent operation pattern, an abnormal action pattern, etc. is not requested.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 is an example of data of a trail log;

FIG. 2 is a configuration of an information development table;

FIGS. 3A and 3B are a configuration of an accumulative information development table;

FIGS. 4A through 4C are an explanatory view of an information development table and an accumulative information development table;

FIG. 9 is a flow of a definition unit 1;

FIG. 10 is an example of a trail log analysis definition input screen;

FIG. 11 illustrates the data structure of an analysis definition information 12;

FIGS. 12A and 12B are an explanatory view of the outline of the process of an information development unit 2;

FIG. 17 illustrates the flow of the writing process of the information development table (user/resources) in the process flows of the information development unit 2;

FIG. 26 illustrates the flow of the writing process of the application information development table (job) in the process flow of the application information development unit 3;

FIG. 31A is an explanatory view (1) of the outline of the process of a preparation unit 4 in a comparison unit 9;

FIG. 31B is an explanatory view (2) of the outline of the process of a preparation unit 4 in a comparison unit 9;

FIG. 32 is an explanatory view of the process flow of the preparation unit 4 in the comparison unit 9;

FIG. 35 is an explanatory view of the outline of the process of a report unit 6;

FIG. 37 is an explanatory view of the outline of the process of an operation prohibit information reflection unit 7;

FIG. 39A is an explanatory view (1) of the outline of the process of an accumulation unit 8;

FIG. 41 is an example of analysis definition information according to the embodiment 2;

FIG. 43A is an explanatory view (1) of the outline of the process according to the embodiment 2;

FIG. 43B is an explanatory view (2) of the outline of the process according to the embodiment 2;

FIGS. 44A and 44B illustrate the process flow according to the embodiment 2;

FIG. 45 is an explanatory view of an operation etc. according to the embodiment 3;

FIG. 46 is an example of analysis definition information according to the embodiment 3;

FIG. 47A is an explanatory view (1) of the outline of the process according to the embodiment 3;

FIG. 47B is an explanatory view (2) of the outline of the process according to the embodiment 3;

FIG. 49 is an explanatory view of an operation etc. according to the embodiment 4;

FIG. 50 is an example of analysis definition information according to the embodiment 4;

FIG. 51A is an explanatory view (1) of the outline of the process according to the embodiment 4;

FIGS. 55A and 55B illustrate the process flow according to the embodiment 5;

FIG. 56 is an example of analysis definition information according to the embodiment 4;

DESCRIPTION OF EMBODIMENTS

Figure 4A:
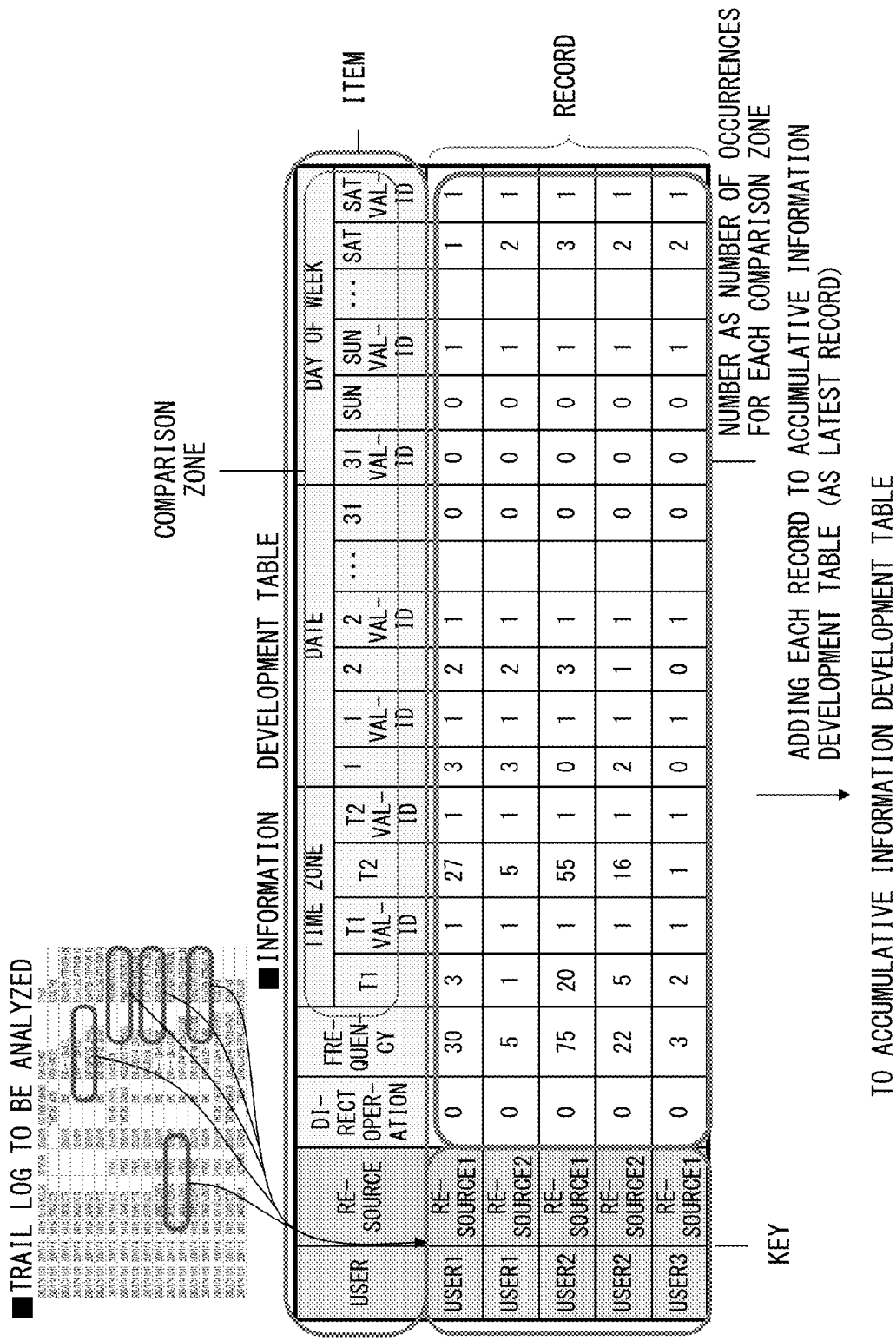

The embodiments are described below in detail with reference to the attached drawings.

First, the embodiment 1 is described with reference to FIGS. 2 through 40. A general-purpose system configuration is described according to the embodiment 1. Then, the embodiments 2 through 6 are described with reference to FIGS. 41 through 58. The system configuration and the system operation according to the embodiments 2 through 6 are described concretely based on the embodiment 1.

Embodiment 1

In the description of the embodiment 1, the process of a trail log is described, and then the system configuration for realizing the described trail log analyzing process is described.

In the present embodiment, a fraud etc. is detected by comparing the latest collected trail log in which a fraudulent operation, an abnormal action, etc. are to be detected with the previously accumulated trail log during the normal operation. However, a simple comparison is not performed. According to the present embodiment, the information in the latest collected trail log (trail log to be analyzed) is developed with the number of occurrences of operations and actions expressed in numbers for each comparison zone having different operation contents of the information system, and the resultant information is recorded. "Each comparison zone" refers to the distinction of timing for comparison in, for example, time zone, date, day of week, etc. The trail log is recorded by generating an information development table in a database. Then, it is determined whether or not there is a fraudulent operation or an abnormal action by comparing the information development table corresponding to the trail log to be analyzed (hereafter referred to as an information development table) with the accumulated information development table corresponding to the previously collected trail log in a normal operation (hereafter referred to as an accumulative information development table).

Thus, since the number of occurrences expressed in numbers is compared in the present embodiment, the process of detecting a fraud etc. may be performed in a high speed. In addition, since normal operations and actions are accumulated in an accumulative information development table, and used as the information about normal operation and action, the operation performed by a person to enter an operation pattern of a correct operation as performed in a prior art is not requested.

The information development table and the accumulative information development table are described with reference to FIGS. 2, 3, and 4.

Figure 2:
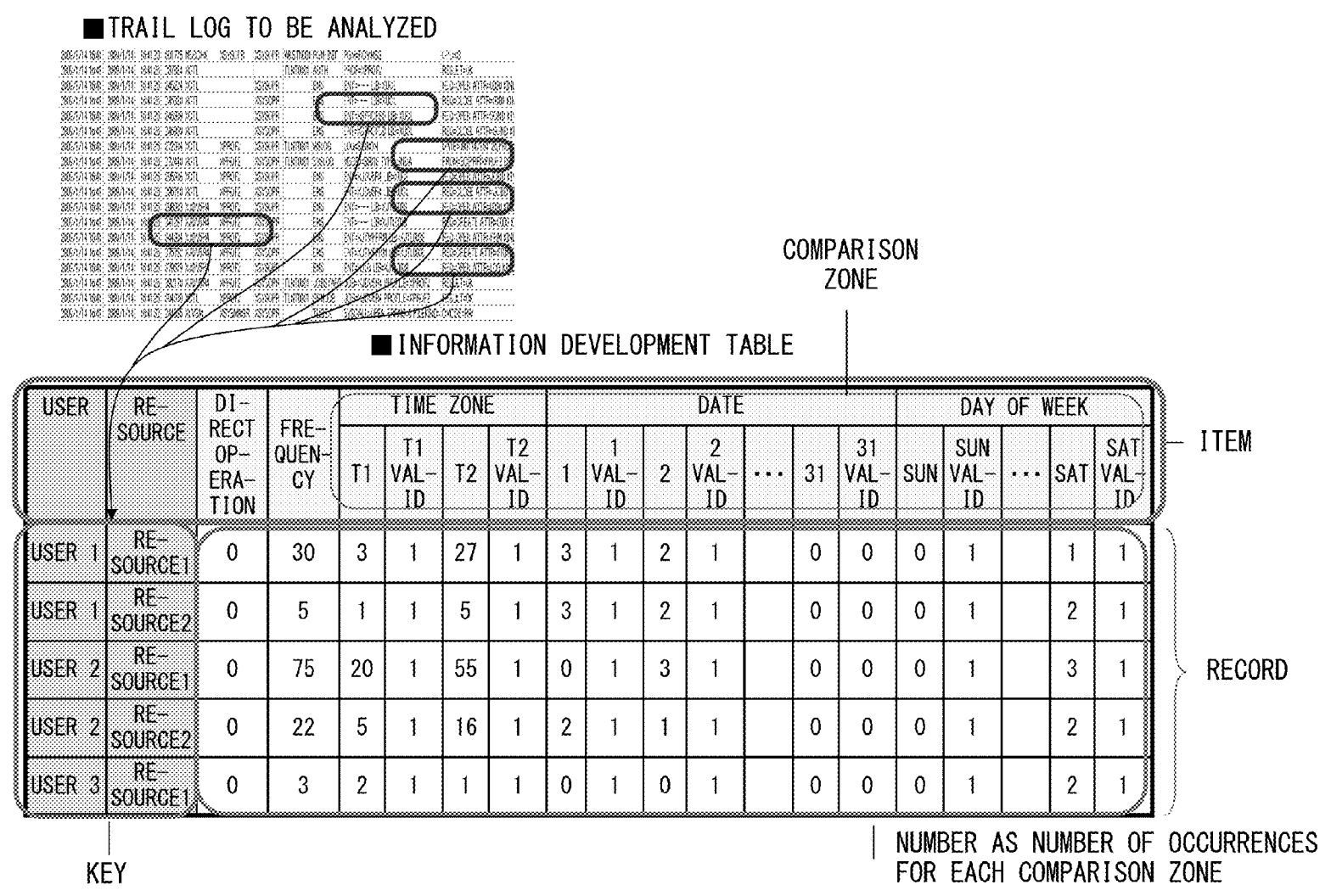

First, as illustrated in FIG. 2, an information development table is generated from the trail log to be analyzed. The generating method is described later in detail. The information development table is configured from the item part, the key part, and the record part as illustrated in FIG. 2.

The item part has item names including a key, a direct operation, a number of times, and comparison zones such as a time zone, a date, a day of week, etc.

In addition, for example, when a fraud is to be determined based on the subject (who), the target (what), and the action (what is done), the determination is made according to the information about the "user", "resources", and "job" described in the trail log. These pieces of information are called comparison keys according to the present embodiment. As illustrated in FIG. 2, a combination of the comparison keys is listed in the key part of the information development table.

The record part has a record, for each comparison zone, of the number of times of an event (an event refers to a record of an operation or an action corresponding to a comparison key in the records of operations and actions of the trail log to be analyzed) corresponding to the combination of comparison keys existing in the trail log to be analyzed. One record includes the occurrence number of times of events for each comparison zone corresponding to the combination of comparison keys in the record part.

That is, an event corresponding to the "user" and the "resources" as comparison keys is searched for in the trail log to be analyzed. If there is the event, a record is generated in the information development table using the event as a key value of the information development table, and the event occurrence number is recorded.

Furthermore, the item of each record is generated depending on the comparison zone. When the comparison zone is defined by the "time zone", the item of each time zone is generated. When the comparison zone is defined by the "date", an item from one of the first day through thirty-first day is generated. When the comparison zone is defined by the "day of week", an item is generated by each day of week.

Thus, each record of the information development table stores the accumulated number of occurrences of each comparison zone item. That is, the column of the time zone T1, T2, . . . , the date such as the 1st, 2nd, 3rd, . . . , the day of week such as Mon., Tue., Wed., . . . of each record is a counter for storing the counted number of occurrences. Furthermore, the column next to the count value of T1, T2, 1st, 2nd, Mon., Tue., etc. indicates the validity of the value (T1 as valid, T2 as valid, 1 as valid, 2 as valid, Sun. as valid, Sat. as valid, etc.).

As described above, the information development table is configured by a combination of a subject (who), a target (what), an action (what is done) as comparison keys. When there is an event corresponding to the combination of the comparison keys in the analysis target trail log information, the number of occurrences is counted and recorded for each comparison zone (time zone, date, day of week, etc.) corresponding to the occurrence time of the event.

FIGS. 3A and 3B are an accumulative information development table. The accumulative information development table has substantially the same configuration as the information development table, but a "type of information" a "UP counter", a "report", an "NG", etc. are newly added as items of each record.

The "type of information" stores the information indicating an accumulated record or a record corresponding to the latest collected trail log to be analyzed. FIGS. 3A and 3B illustrate the combination of comparison keys "user 1" and "resource 1" in the first and second lines. In the first line, the type of information is "accumulated", and the accumulated previous records are stored. In the second line, the type of information is "latest", and the information is latest added to the accumulative information development table as a record corresponding to the trail log to be analyzed. In the accumulative information development table, the first line is compared with the second line, and it is determined whether or not there is a fraudulent operation or an abnormal action.

In the accumulative information development table, the column indicating whether or not the values T1, T2, etc. in the information development table are valid is used as a "validity column" or a "UP counter". That is, in the current record which indicates "latest" as the type of information, the column is used as indicating that the counter as the item value is valid. In the case of the accumulated record in which the type of information is "accumulation", it is used as an "UP counter". The "UP counter" is to record the accumulation frequency when each valid item of the latest normal record is accumulated in the accumulated record. For example, when the records for three months are accumulated in the accumulated record as normal records, the date (1st, 2nd, 3rd, . . . ) of each month occurs once in each month. Therefore, it occurs three times in three months. Accordingly, in the UP counter indicating the date as the comparison zone, the UP counter refers to 3 count up. In the case of the day of week, the day of week in each month occurs four or five times. Therefore, it occurs 12 or 13 times depending on each month in the calendar. Accordingly, in the UP counter of the day of week as the comparison zone, the UP counter refers to 12 or 13 count up. The value of the UP counter is used, for example, when the occurrence rate of an event is compared with the specified rate. It is described later in detail.

The "report" is to record the comparison result of the record indicating "accumulated" as the type of information and the record corresponding to the latest collected trail log to be analyzed (the record indicating "latest" as the type of information). For example, assume that the value of 0 indicates an initial value. Also assume that the value of 1 indicates an event that has latest occurred, the value of 2 indicates that the occurrence number of an event exceeds a specified range in a record corresponding to the trail log to be analyzed, the value of 3 indicates that the rate of the occurrence of an event which is requested based on the record corresponding to the trail log to be analyzed has exceeded the specified range, and the value of 4 indicates that the rate has not reached a specified value. The specified frequency and the specified rate are described later again.

"NG" refers to a determination result of a system administrator. For example, the value of 0 indicates an initial value and a normal condition, and the value of 1 indicates an abnormal condition determined by the system administrator.

FIGS. 4A through 4C illustrate the comparison between the information development table and the accumulative information development table.

As illustrated in FIGS. 4A through 4C, the information development table generated from the trail log to be analyzed is added to the accumulative information development table for comparison with the accumulative information development table. The addition is made so that the record of the information development table may be inserted into the next line after the combination of the same comparison key as the combination of the comparison key of the accumulative information development table. That is, the combination of the comparison keys "user 1" and "resource 1" refers to the records in the first and second lines and the combination of the comparison keys "user 1" and "resource 2" refers to the records in the third and fourth lines. The records subsequent to those in the fifth line configure an accumulative information development table as a pair of the similarly accumulated record and the latest compared record.

Figure 5:
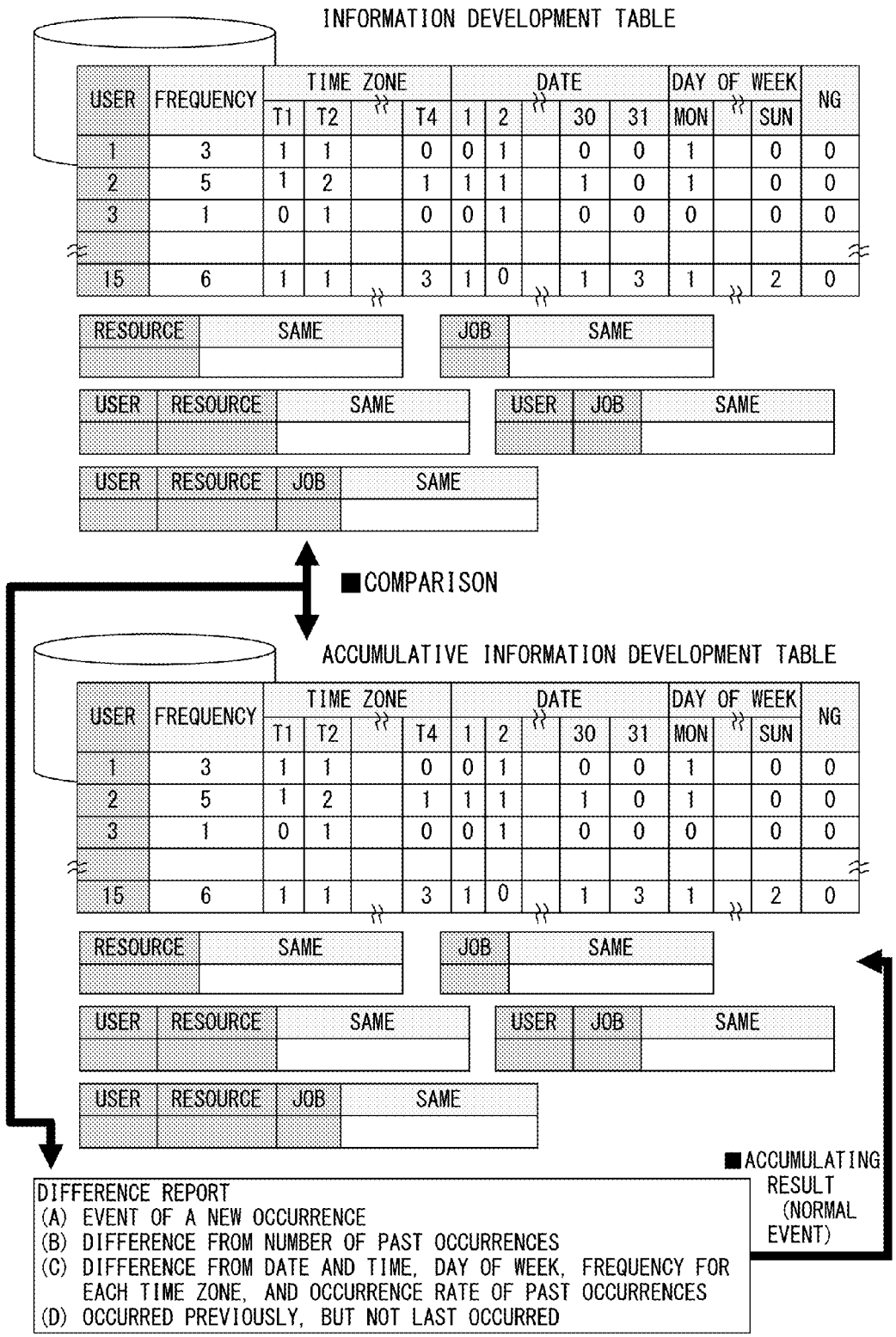
FIG. 5 illustrates the concept of the process of comparing the information development table with the accumulative information development table.

When the preparation for the comparison, that is, adding the information development table to the accumulative information development table, is completed, the difference is determined by comparing the items of the record indicating the accumulated events and the record indicating the latest event. As a result of the comparison, reports such as a) whether or not an event is a newly occurred event, b) a difference from the frequency in the past, c) a difference from the past date and time and day of week, in the frequency for each time zone and occurrence rate, d) an abnormal event such as no occurrence of an event which occurred in the past, etc. are output (FIG. 5).

The comparison result is recorded as follows in (a), (b), and (c) in the accumulative information development table illustrated in FIGS. 3A and 3B.

In the report item in (a), the comparison result between the record indicating the accumulated events and the record indicating the latest event is recorded. The following meanings are assigned to the respective values.

Value 0: initial value
Value 1: new occurrence
Value 2: frequency exceeding specified range
Value 3: rate exceeding specified range
Value 4: rate not reaching specified range In the NG item in (b), recorded is the result of the determination by the administrator after checking the report output. The following meanings are assigned to the respective values.

Value 0: initial value and normal condition
Value 1: abnormal condition (c) Each UP counter has a record of accumulation frequency when each valid item of the latest normal record is accumulated.

Thus, according to the present embodiment, the number of occurrences of an event is compared with each other for each comparison zone to detect a fraud, thereby realizing a high-speed process. In addition, since a comparison result between the information development table and the accumulative information development table is output as a report, the system administrator may easily confirm whether or not the system action is correctly performed.

When it is determined from the determination result of the system administrator that the information about the latest acquired trail log to be analyzed is correct, each value of the information development table is accumulated in the accumulative information development table (FIG. 5). Thus, the accumulated information development table is used in the next and subsequent comparisons.

As described above, a fraudulent operation etc. may be detected using a trail log to be analyzed in the present embodiment. Described next in detail is the configuration of the trail log analysis system for realizing the above-mentioned analysis of the trail log.

Figure 6:
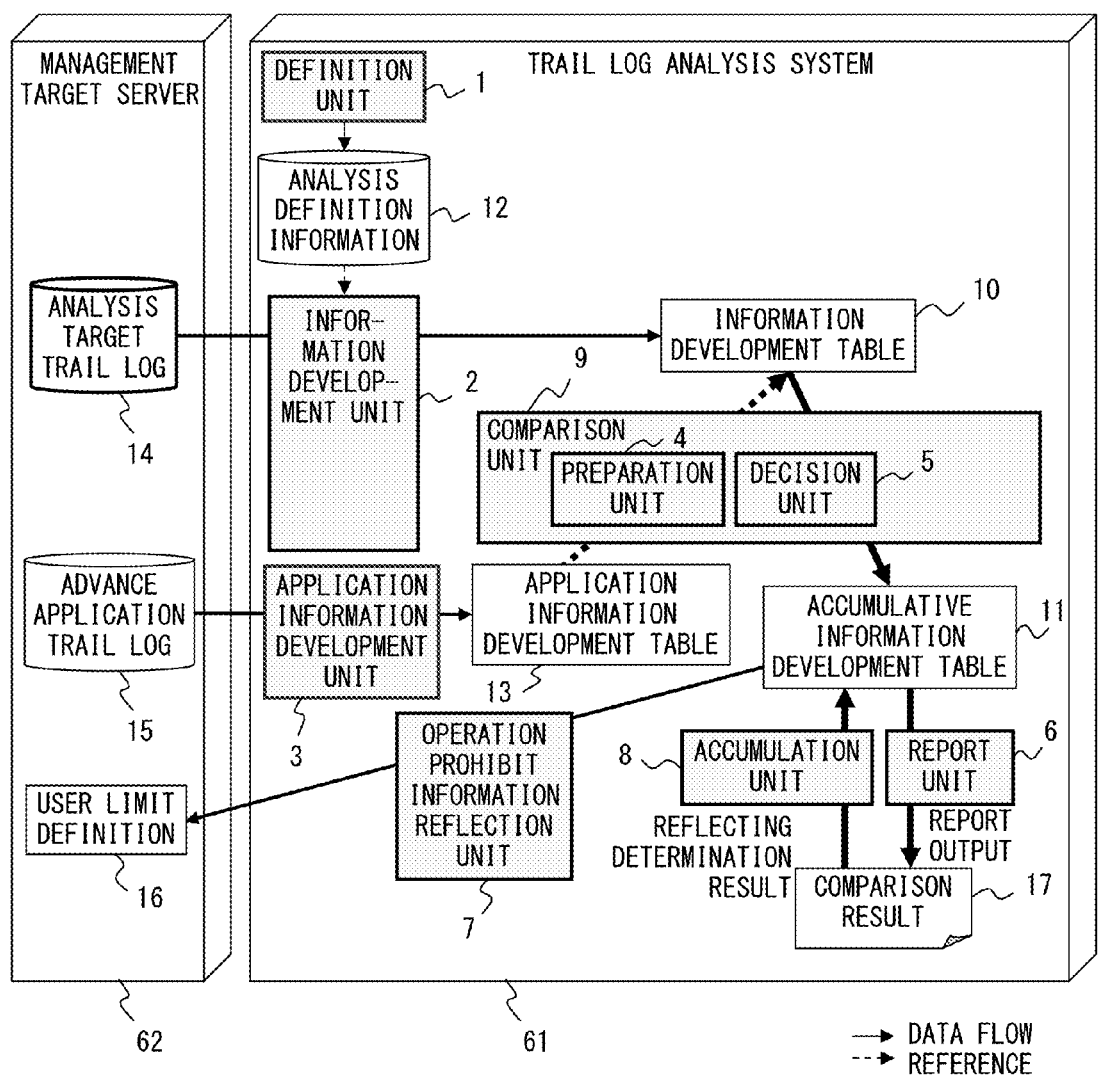
FIG. 6 is a configuration of a trail log analysis system according to the embodiment 1.

FIG. 6 is the configuration of the trail log analysis system according to the present embodiment.

In FIG. 6, a management target server 62 and a trail log analysis system 61 is described as separate systems, but may be configured in the same system.

The trail log analysis system 61 includes a definition unit 1, an information development unit 2, an application information development unit 3, a report unit 6, an operation prohibit information reflection unit 7, an accumulation unit 8, and a comparison unit 9.

The comparison unit 9 further includes a preparation unit 4 and a decision unit 5.

The definition unit 1 performs the process for allowing the trail log analysis system to store necessary information as analysis definition information 12 for analyzing an analysis target trail log 14 and reporting an abnormal event.

The information development unit 2 performs the process of generating an information development table 10 from the analysis target trail log 14.

The application information development unit 3 performs the process of generating an advance application trail log 15 which applies in advance for an operation not specifically performed normally (irregular operation) and an application information development table 13 based on directly specified operation information.

The comparison unit 9 compares the information development table 10 with the accumulative information development table 11. The preparation unit 4 in the comparison unit 9 adds the information development table 10 as the latest record to the accumulative information development table 11. The decision unit 5 in the comparison unit 9 determines the difference by comparing the value of the accumulated record about the accumulated evens with the value of the latest record about the latest event for each comparison zone item in the accumulative information development table 11 to which the contents of the information development table 10 are added. An operation event or an action event that has newly occurred or an event that is out of a specified frequency or a specified rate or range is assumed as an abnormal event, a fraud, etc., and is recorded in the report item of the latest record.

The report unit 6 outputs an event recorded as an abnormal event in the report item to a report 17. The system administrator determines based on the report result whether or not the operation or the action is normal, and in the case of a fraudulent operation or an abnormal action, it is recorded in the NG item of the latest record.

The operation prohibit information reflection unit 7 retrieves an abnormal event recorded in the NG item of the accumulative information development table 11, and adds the definition to a user limit definition 16 for prohibition of the operation on the management target server 62. The user limit definition 16 is referenced by an existing system operation prohibit function. For example, when a user performs a similar operation, the system operation prohibit function refers to the user limit definition 16 so that the operation is not performed.

The accumulation unit 8 reflects the value of each item of the latest record which is determined as a normal event on the value of each record of the accumulative information development table 11.

Figure 7:
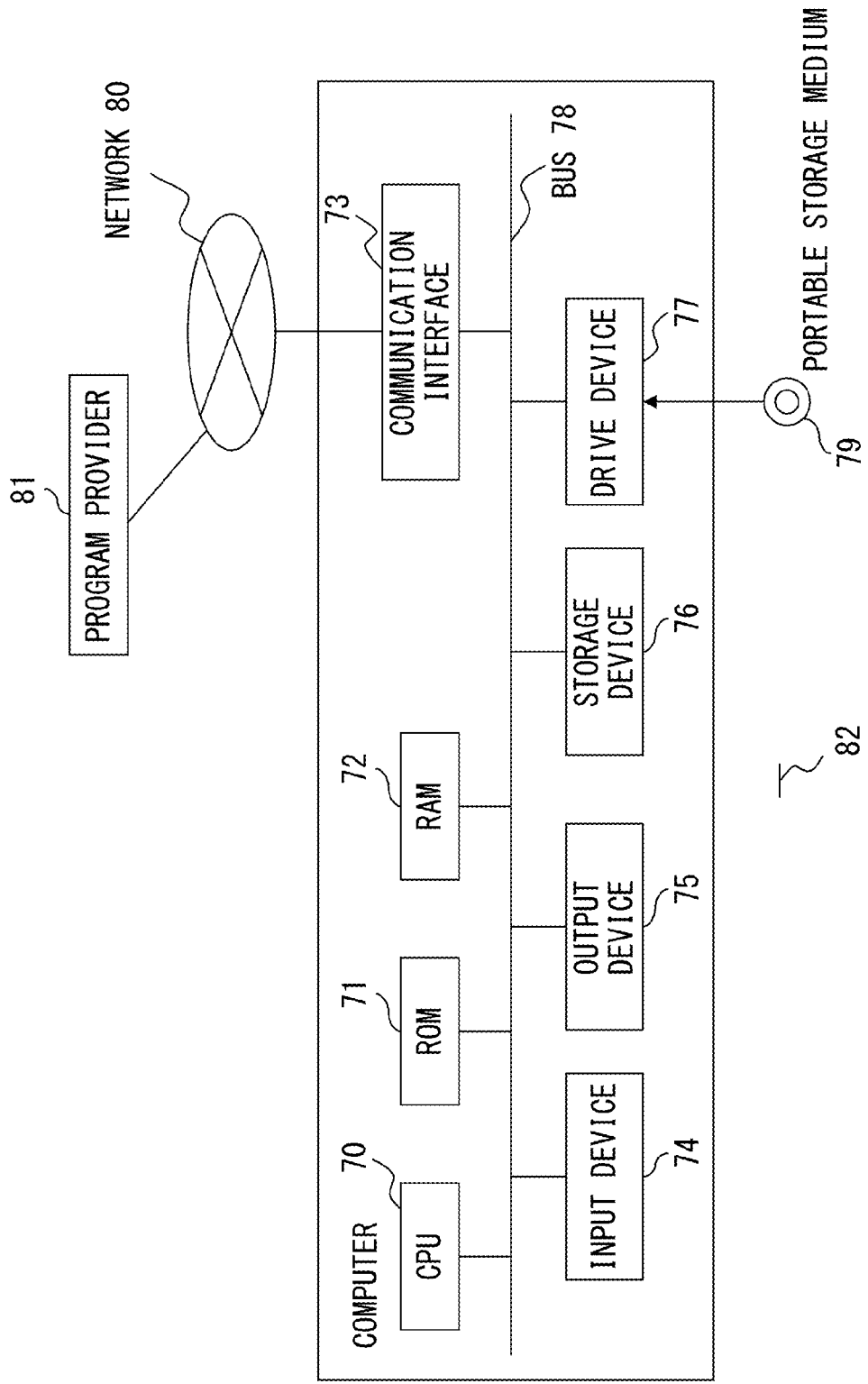
FIG. 7 is a configuration of an information processing device for realizing the trail log analysis system according to the embodiment 1.

The trail log analysis system 61 and the management target server 62 illustrated in FIG. 6 are realized by the information processing device of the hardware configuration as illustrated in FIG. 7.

An information processing device 82 in FIG. 72 includes a central processing unit (CPU) 70, read only memory (ROM) 71, random access memory (RAM) 72, a communication interface 73, an input device 74, an output device 75, a storage device 76, and a drive device 77 for a portable storage medium 79. Each of these components provided for the information processing device 82 is interconnected to one another through a bus 78.

The information processing device 82 is connected to a network 80 through the communication interface 73. The network 80 is any network such as a local area network (LAN), the Internet, etc.

The CPU 70 loads a program into the RAM 72, and executes the program using the RAM 72 as a working area, thereby allowing the information processing device 82 as the trail log analysis system 61. That is, the CPU 70 functions as the trail log analysis system 61 by realizing the process flow described later according to the program. In this case, for example, the data storage unit for the information development table 10, the accumulative information development table 11, the application information development table 13, etc., may be realized by the RAM 72, but may also be realized by both of the RAM 72 and the storage device 76.

The program may be stored in advance in the ROM 71 or the storage device 76, and also may be provided from a program provider 81 through the network 80, and stored in the storage device 76. Otherwise, it may be stored in the portable storage medium 79, loaded from the portable storage medium 79 set in the drive device 77 into the RAM 72, and executed by the CPU 70. As the portable storage medium 79, various types of storage media such as an optical disk, a magneto optical disk, a magnetic disk, non-volatile memory, etc. including a compack disc (CD), a digital versatile disk (DVD), etc. may be used.

The input device 74 is a pointing device such as a mouse etc. and a keyboard. The output device 75 is a display device such as a liquid crystal display etc. The storage device 76 may be a magneto optical disk such as a hard disk device etc. or a storage device of any other type.

As described above, the trail log analysis system 61 of the present embodiment is configured by an information processing device. The trail log analysis system 61 according to the present embodiment is described below in detail.

Figure 8:
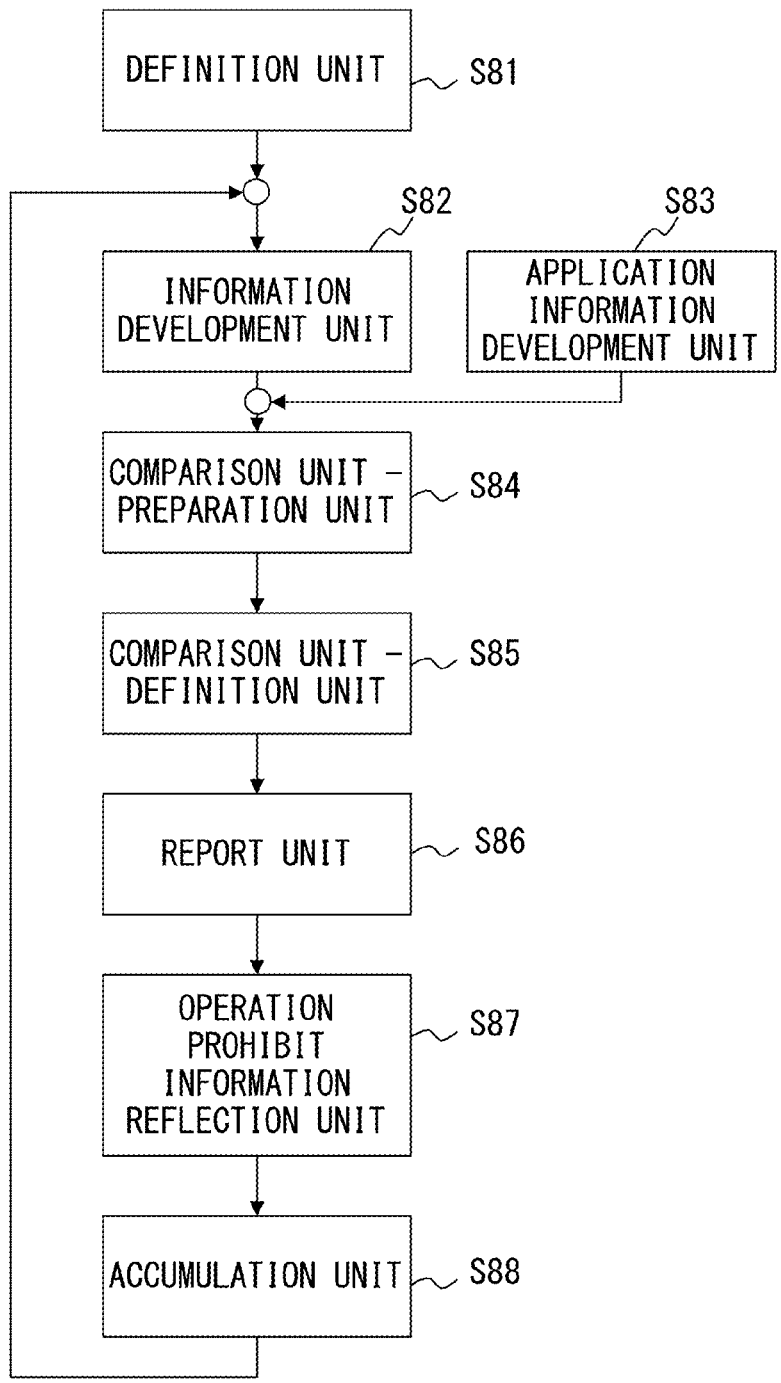
FIG. 8 is the entire flow of the trail log analysis system according to the embodiment 1.

FIG. 8 is the entire flow of the trail log analysis system 61 illustrated in FIG. 6. Each step of S81 through S88 in FIG. 8 corresponds to each processing unit of the trail log analysis system 61 illustrated in FIG. 6.

First, the process by the definition unit 1 is performed in S81. When the system administrator etc. performs the operation of defining and entering the necessary information for outputting a fraudulent or abnormal event as a report in advance, the definition unit 1 performs the process for storing the information as the analysis definition information 12.

Next, the process by the information development unit 2 is performed in S82. The information development unit 2 generates the information development table 10 by counting the number of occurrences of each event for each comparison zone item and expressing it in numbers based on the analysis target trail log 14 and the analysis definition information 12.

In S83, when there is an advance application trail log etc., the process by the application information development unit 3 is performed. The application information development unit 3 generates the application information development table 13 based on the advance application trail log 15 and the directly specified operation information.

Next, the process by the preparation unit 4 in the comparison unit 9 is performed in S84. The preparation unit 4 performs the process of adding the information development table 10 as the latest record to the accumulative information development table 11.

Next, the process by the decision unit 5 in the comparison unit 9 is performed. The decision unit 5 determines a difference between the accumulated record indicating the accumulative information and the latest record indicating the information corresponding to the latest trail log by comparing the values for each comparison zone item on the accumulative information development table 11 to which the contents of the information development table 10 are added.

Next, the process by the report unit 6 is performed in S86. The report unit 6 performs the process of outputting an event recorded as an abnormal event in the report item to the report 17. The system administrator determines based on the report result whether or not the operation or action is normal. If it determines an abnormal operation, the operation is recorded in the NG item of the latest record.

Next, the process by the operation prohibit information reflection unit 7 is performed in S87. The operation prohibit information reflection unit 7 retrieves the record for which "NG" has been recorded in the NG item of the accumulative information development table 11, and the definition of the corresponding operation is added to the user limit definition 16 as a prohibiting operation to the management target server 62.

Next, the process by the accumulation unit 8 is performed in S88. The accumulation unit 8 performs the process of reflecting the value of each item of the latest record on the value of each record of the accumulative information development table 11.

The analysis of one trail log is performed by the process in S82 through S88. The process of analyzing the next trail log is performed again back in S82.

The entire flow of the system according to the present embodiment is described above with reference to FIG. 8, and the operation of each unit is described below with reference to a more detailed flowchart etc.

First, the process of the definition unit 1 in S81 is described below with reference to FIGS. 9 through 11.

FIG. 9 is a flowchart of the definition unit 1. First, in S91, the trail log analysis definition input screen is displayed on the screen of the trail log analysis system 61. FIG. 10 is an example of the screen. The necessary information such as a comparison key, a comparison zone, a comparison key value, a specified frequency, a specified rate, etc. to analyze a trail log may be input by a system administrator on the screen. In S92, the system administrator inputs the information on the screen as illustrated in FIG. 10, thereby setting necessary information to analyze a trail log. Then, the information input in S93 is stored as the analysis definition information 12 in the system.

FIG. 11 illustrates the data structure of the analysis definition information 12. The data structure of the analysis definition information 12 has the form of a table in which a definition item is associated with a corresponding value. Each definition item is described in (a) through (e) below. To "compare" is to compare an event of the information development table 10 with an event of the accumulative information development table 11.

(a) A "comparison key" refers to the information based on which a comparison is made. Its value may be a "user", a "resource", a "job", etc., and a plurality of values may be selected. The type of the comparison key depends on the system.

(b) A "comparison zone" refers to the information about the comparison zone for comparison of the number of occurrences of a comparison key. It has items of a date, a day of week, a time zone, etc. In the case of a date, the subsequent specified frequency or specified rate may be specified for each date, and all days (1st through 31st) are equally compared, the "all days" may be specified. Also in the case of the day of week, the subs specified frequency and rate may be specified for each day of week, or "all days of week" may be specified if all days of week, that is, Sundays through Saturdays, are equally compared. In the case of a time zone, the starting time and the ending time are specified. A plurality of time zones may be specified.

(c) A "comparison key value" is specified when the specified frequency or rate is compared in the comparison zone for each comparison key value. For example, it is set when the user A the frequency at which the user A accesses the resource FILEA in the job JOB1 is to be compared with the specified frequency, and the specified frequency is not set for other user, resource, or job. That is, it is specified when the comparison value is different for each comparison key value. When the comparison is made for all comparison key values with the same specified frequency and rate, the comparison key value may be omitted.

(d) A specified frequency of an operation or action for each comparison zone is specified with a comparison key value. For example, when frauds are reported ten times or more, "10" is specified. When specification is omitted, the determination of a fraudulent operation etc. based on the specified frequency is not performed.

(e) A specified rate of an operation or action for each comparison zone is specified with a comparison key value. The rate refers to the ratio of the frequency of each comparison zone in the past accumulated trail log with the frequency of each comparison zone of accumulated trail logs. For example, if an event of an accumulated trail log in a day occurs 100 times and an event of the latest trail log to be analyzed in a day occurs 80 times, then the rate is 80%. That is, the specified rate refers to the estimation of the latest number of occurrences as a normal range with respect to the number of occurrences for each previously accumulated comparison zone. If it is omitted, the determination of the specified rate as an abnormal condition is not made.

The definition items of the analysis definition information are described above in (a) through (e). In the analysis definition information 12, the comparison key (a) is first defined in the table, and subsequently the comparison key value (c), the specified frequency (d), and the specified rate (e) are repeatedly defined for each comparison zone (b).

The definition unit 1 is described above. Next, the information development unit 2 in S82 illustrated in FIG. 8 is described with reference to FIGS. 12 through 21.

First, the outline of the process of the information development unit 2 is illustrated in FIGS. 12A and 12B. The information development unit 2 generates the information development table 10 from the analysis target trail log 14.

An example of the analysis target trail log 14 is illustrated in FIG. 12A. In FIG. 12B, some examples of generated information development tables 10 are illustrated.

First, the information development unit 2 refers to the analysis definition information 12, and determines a table generated from a "comparison key" and a "comparison zone of the analysis definition information 12". That is, for example, when the "user", the "resource", and the "job" are set as "comparison keys", the following seven tables are generated as the information development table 10.

Information development table (user)
Information development table (resource)
Information development table (job)
Information development table (user/resource)
Information development table (user/job)
Information development table (resource/job)
Information development table (user/resource/job)

In addition, when a "day" is set as a "comparison zone", the comparison zone part is a table having items of 1st through 31st of each month (28th or 30th depending on the each month).

When a table to be generated is determined, each line of the analysis target trail log 14 is sequentially read from the top, and recorded to the record of the corresponding table. For example, the first line in FIG. 12A includes "Feb. 1, 2009", "08:10:20", "XCTL", " ", "AUTH", and "PROF=PROF1", respectively for the date, time, job name, user, log type, and main data. In the case of the log type "AUTH", a record is stored on the information development table (user). In this case, the use by the user "PROF1" on the date "1st" is counted as once. Afterwards, when the use by the same user is logged, the corresponding number of counted. The item "frequency" at which the number of times is counted is also counted.

The line 4 of the trail log to be analyzed in FIG. 12A includes "Feb. 1, 2009", "08:22:12", "DJOB", "PROF1", "WSLOG", " ", and "SVEFILE JUCHUPF. BLIB" respectively as the date, time, job name, user, log type, main data, and auxiliary data. The log type "WSLOG" indicates that the user has directly performed the operation. Whether or not an operation is a direct operation may be determined depending on whether or not a command is specified in an auxiliary data item. In this example, the user "PROF1" has saved the file "JUCHUPF. BLIB". In this case, the records corresponding to a corresponding comparison keys (user, resource, job) or a combination of comparison keys are stored. That is, as illustrated in FIG. 12B, since a record "PROF1" has been generated in the information development table (user), the items of the date "1" and "frequency" are counted. In addition, since the record "JUCHUPF.BLIB" has not been generated on the information development table (resource), the record "JUCHUPF. BLIB" is newly generated, and the date "1" and the value of item "frequency" are set to 1. Similarly, records are stored for other tables.

Furthermore, the line 8 of the trail log to be analyzed in FIG. 12A sequentially includes "Feb. 1, 2009", "10:10:20", "BJOB", "ARAO", "RDB", "FL=P200. ALIB" are the date, time job name, user, log type, and main data. The log type "RDB" indicates the access to the database. In this case, the corresponding comparison key (user, resource, job) or the records corresponding to the combination of comparison keys are recorded on all seven types of information development tables. That is, since a record "ARAO" has not been generated on the information development table (user), the record "ARAO" is generated, and the date "1" and the value of the item "frequency" are set to 1. Since the record "P100. ALIB" is recorded on the information development table (resource), the date "1" and the value of the item "frequency" are counted.

Thus, the information development unit 2 processes each line of the analysis target trail log 14, and generates one or more information development tables 10.

Figure 13A:
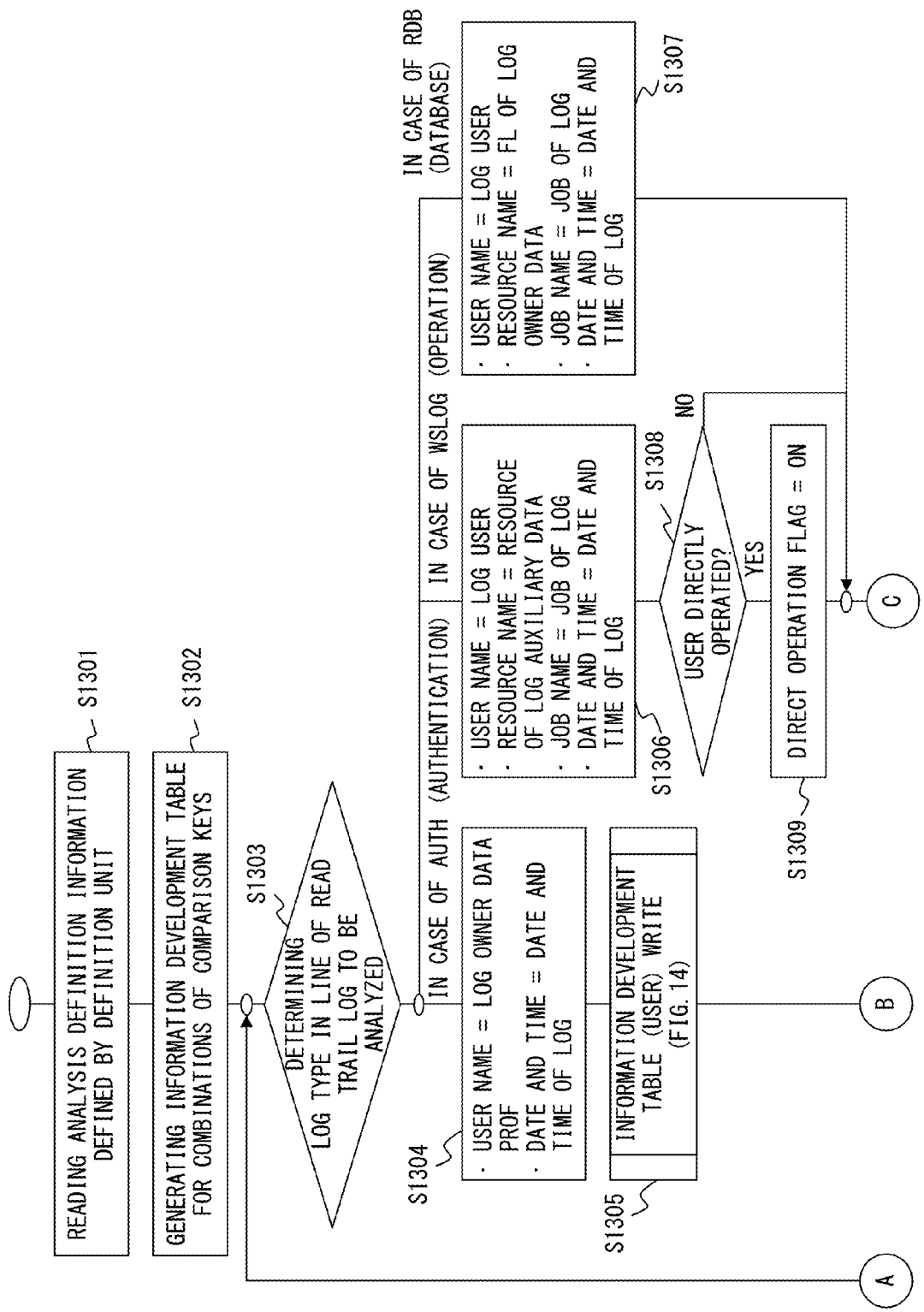
FIG. 13A is a view (1) of the process flow of the information development unit 2.
Figure 13B:
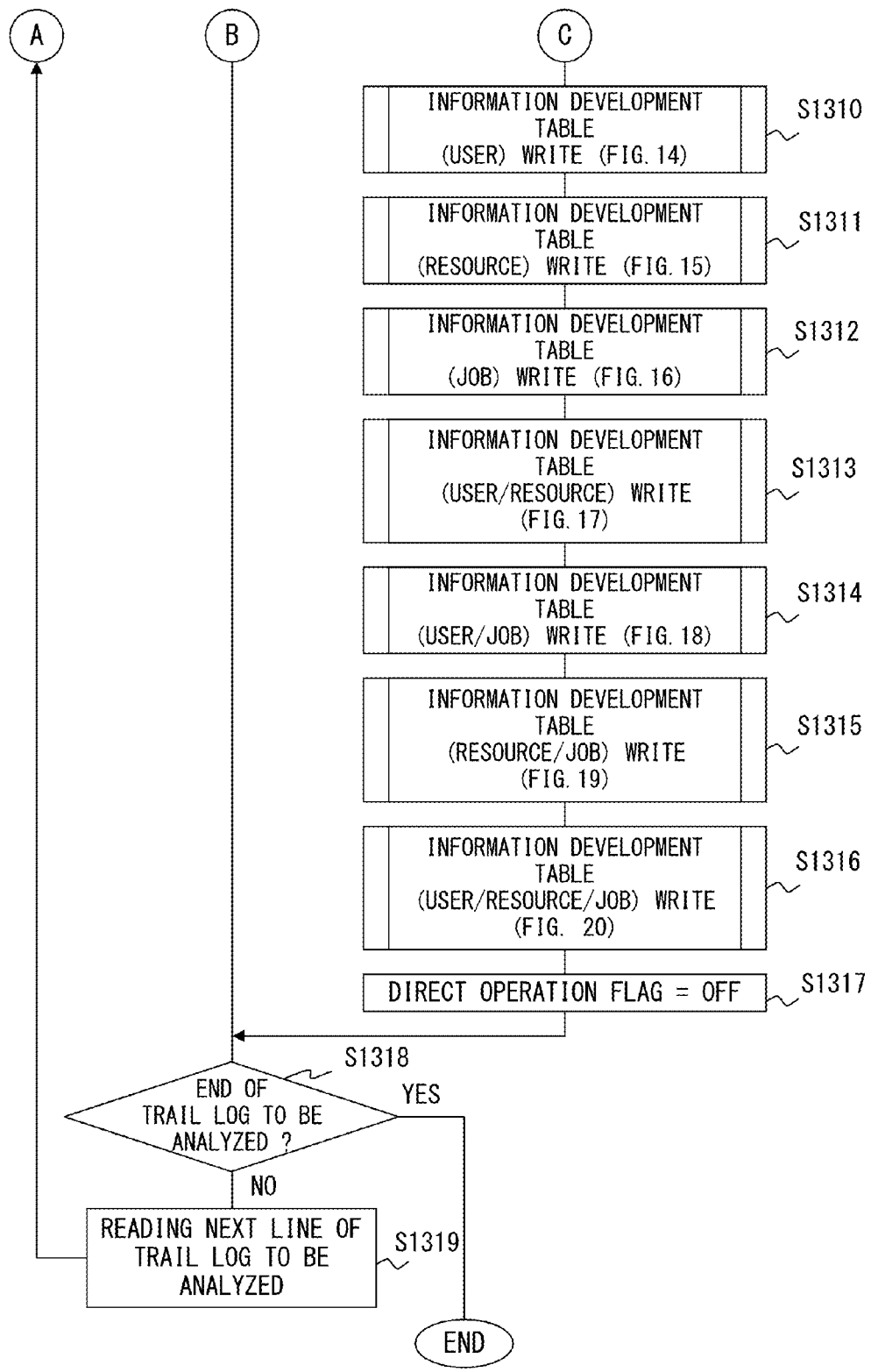
FIG. 13B is a view (2) of the process flow of the information development unit 2.

FIG. 13 is a flowchart of the information development unit 2.

First, in S1301, the analysis definition information 12 defined by the definition unit 1 is read. Next, in S1302, the information development table for the combination of comparison keys is generated from the comparison key defined in the analysis definition information 12.

Next, each line of the trail log to be analyzed is processed in S1303 through S1317.

First, one line (corresponding to an event) is read from the trail log to be analyzed read in S1303, and the log type is determined. When the log type is "AUTH" (authentication), control is passed to S1304. When the log type is "WSLOG" (operation), control is passed to step S1306. When the log type is "RDB" (database), control is passed to step S1307.

In S1304, the "user name"="PROF of main data", and "date and time"="date and time of log". Next, in S1305, the writing process is performed on the information development table (user). The writing process on the information development table is described later with reference to FIGS. 14 through 20.

When control is passed from S1303 to S1306, that is, when the log type is "WSLOG" (operation), the processes in S1308 through S1317 are performed. First, in S1306, the "user name"="user name of log", the "resource name"="resource of auxiliary data of log", the "job name"="job of log", the "date and time"="date and time of log" are set. Next, in S1308, it is determined whether or not the user has performed a direct operation. As described above, in the case of the direct operation, since a command is recorded in the auxiliary data of the log, a determination is made by the command. If YES, control is passed to step S1309. If NO, control is passed to step S1310. In S1309, a direct operation flag is set in the ON state. Then, control is passed to step S1310.

When the type of the log is WSLOG, it indicates that all combinations of comparison keys are detected. Therefore, all of seven types of information development tables are generated. Accordingly, the writing process is performed on all information development tables. That is, in S1310, a write is made to the information development table (user). Similarly, in S1311, a write is made to the information development table (resource). In S1312, a writing process is made to the information development table (job). In S1313, a write is made to the information development table (user/resource). In S1314, a write is made to the information development table (user/job). In S1315, a write is made to the information development table (resource/job). In S1316, a write is made to the information development table (user/resource/job). FIGS. 14 through 20 are referenced about the writing process of the information development table, and described later.

Then, in F1317, the direct operation flag is changed to OFF, and control is passed to step S1318.

When control is passed from S1303 to S1307, that is, when the log type is "RDB" (database), the following process is performed. First, in S1307, the "user name"="user name of log", the "resource name"="FL of main data of log", the "job name"="job of log", the "date and time"="date and time of log" are set. Then, as with the case in the log type "WSLOG", the processes in S1310 through S1317 are performed.

When control is passed from S1317 to S1318, it is determined whether or not the process has been performed up to the last line. If YES, the process terminates. If NO in S1318, control is passed to S1319, and the next line of the trail log to be analyzed is read, thereby returning control to S1303.

The writing process of the information development table in S1305 and S1310 through S1316 is explained with reference to FIGS. 14 through 20.

A write to the information development table is performed for each combination (each type of information development table) of comparison key. Each operation is identical, and different only in target key. Therefore, it is described in detail with reference to FIG. 14, and the detailed explanation in FIGS. 15 through 20 is omitted here.

Figure 14:
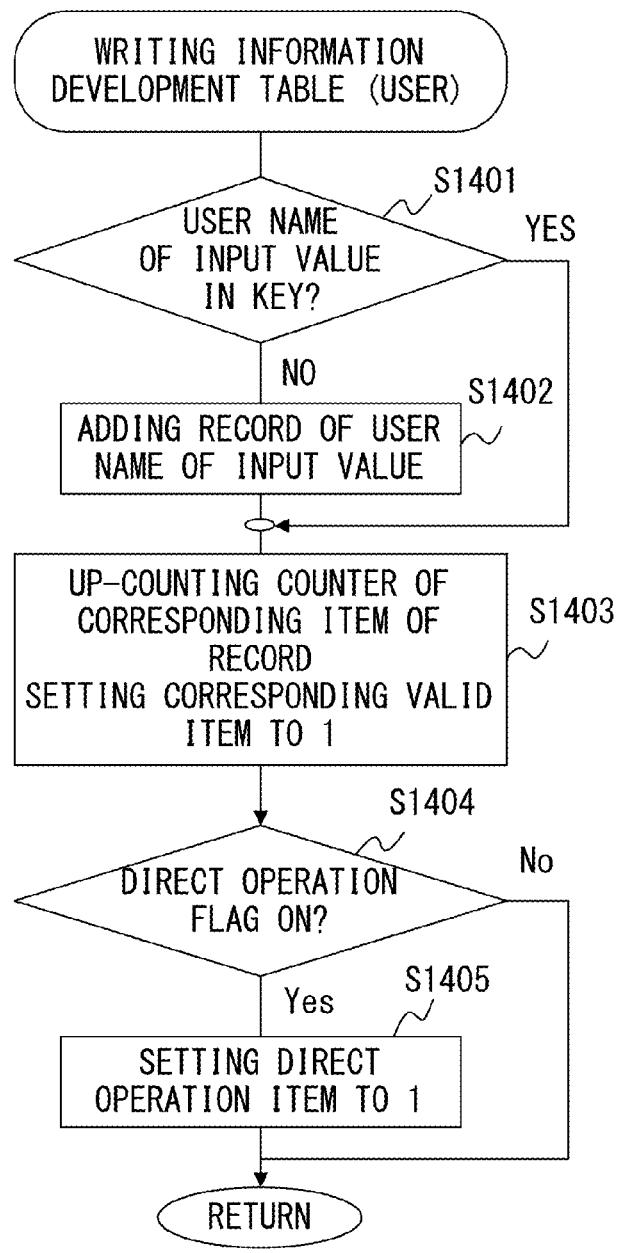
FIG. 14 illustrates the flow of the writing process of an information development table (user) in the process flow of the information development unit 2.

First, in S1401 in FIG. 14, it is determined whether or not there is a user name (user name acquired in S1304) as an input value of the comparison key on the information development table. If YES, control is passed to S1403. If NO, control is passed to S1402. In S1402, the record of a user name of the input value is newly added to the table. Then, control is passed to step S1403.

Figure 21:
FIG. 21 is an explanatory view of a valid item of the information development table.

In S1403, the counter of the corresponding item of the record is counted. In addition, the corresponding valid item is set to 1. The valid item is explained with reference to FIG. 21. An item set as to whether or not each record is valid is prepared. FIG. 21 is an example of generating an information development table from the trail log of February 1 through 3 to be analyzed. In this case, the number of occurrences of an event of each day is recorded. In the adjacent item it is set as to whether or not the data is valid. For example, there is an item "1 valid" next to the date "1". When the counter of the date "1" is counted, the item "1 valid" is set as valid (value of 1), thereby indicating that the value of the counter is valid. In FIG. 21, the value of 0 of the valid item is 0 on the date other than February 1 through 3, and that the values of the items on and after the date of 4th are invalid. Thus, by including a valid item in the information development table, the frequency at which a comparison of invalid comparison zones (0 count) is made may be reduced when specified frequencies and specified rates are compared for each comparison zone. Furthermore, invalid data is not accumulated.

In S1404, it is determined whether or not the direct operation flag is ON. If the direct operation flag is ON, control is passed to S1405, and the direct operation item of the record is set to 1. If the direct operation flag is OFF, control is returned to the next process in FIG. 13. FIG. 21 illustrates a direct operation item. The record in line 1 of the information development table illustrated in FIG. 21 indicates that the user "PROF1" has directly stored (SAVFILE) the resource "JUCHUPF.BLIB". For the operation, the value of the direct operation item of 1 is stored to indicate that the corresponding record refers to a direct operation.

Thus, in the writing process of the information development table, it is first determined whether or not there is a record having the same value as the input value on the table. If there is no such record, a new record is generated, a new record is generated. Afterwards, the counter of the item of the corresponding comparison zone of each record is counted. When the operation corresponding to the record to be counted refers to the direct operation, the value indicating the direct operation is input to the item of the direct operation.

Figure 15:
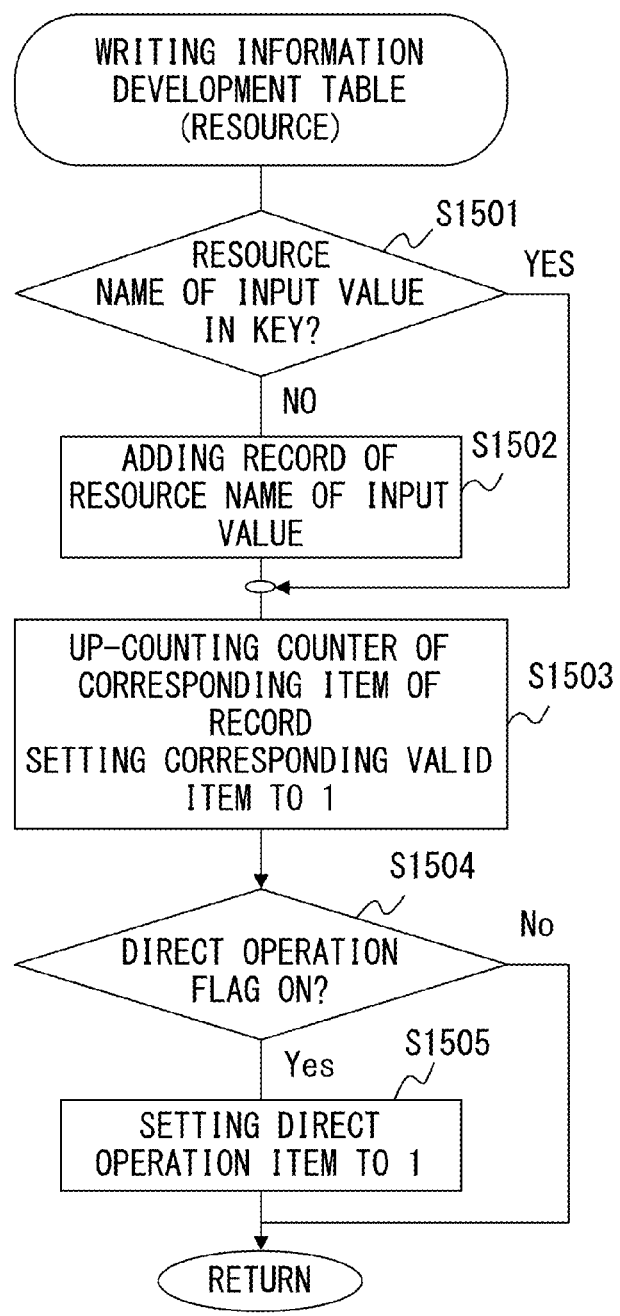
FIG. 15 illustrates the flow of the writing process of the information development table (resources) in the process flows of the information development unit 2.
Figure 16:
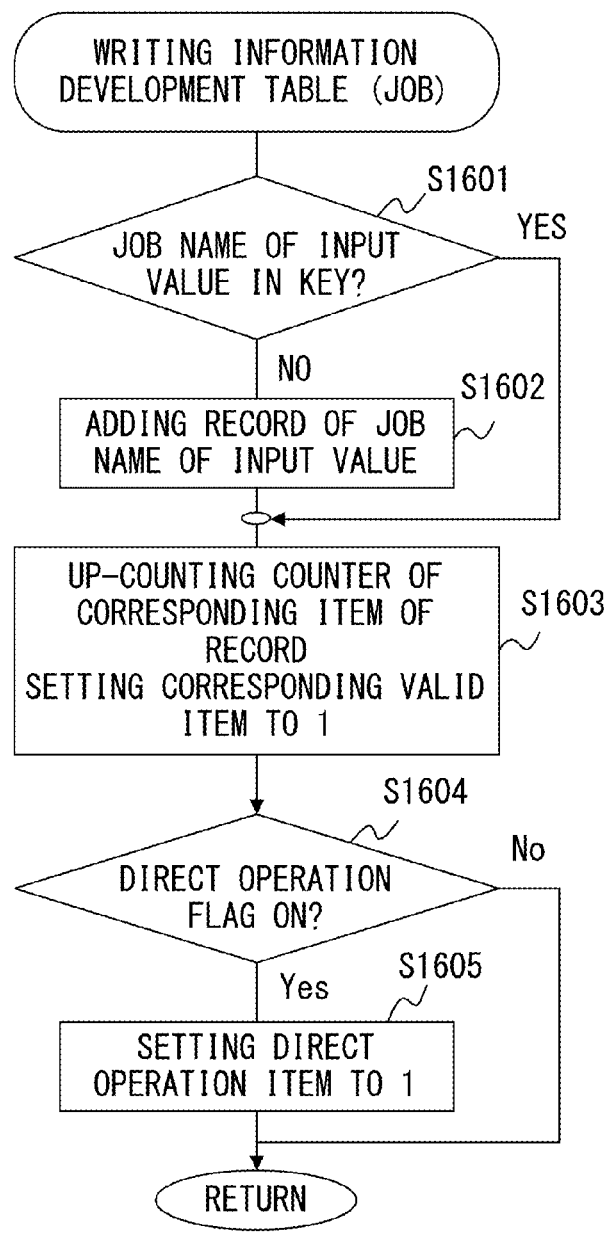
FIG. 16 illustrates the flow of the writing process of the information development table (job) in the process flows of the information development unit 2.
Figure 18:
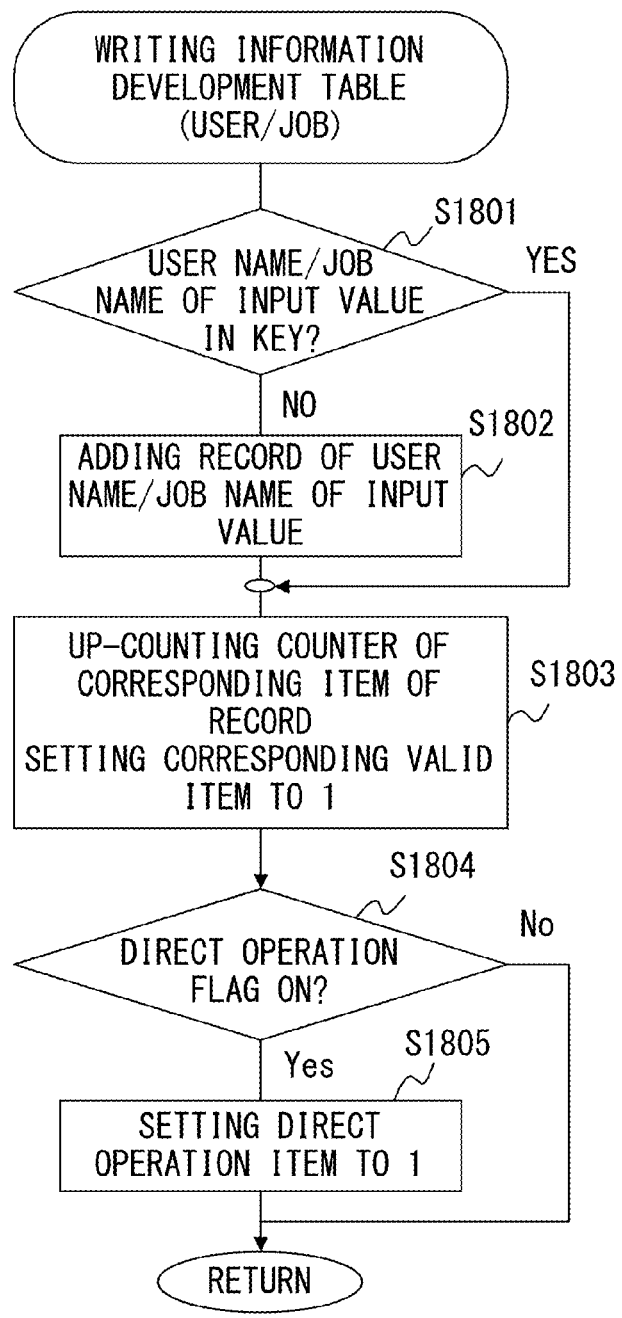
FIG. 18 illustrates the flow of the writing process of the information development table (user/job) in the process flows of the information development unit 2.
Figure 19:
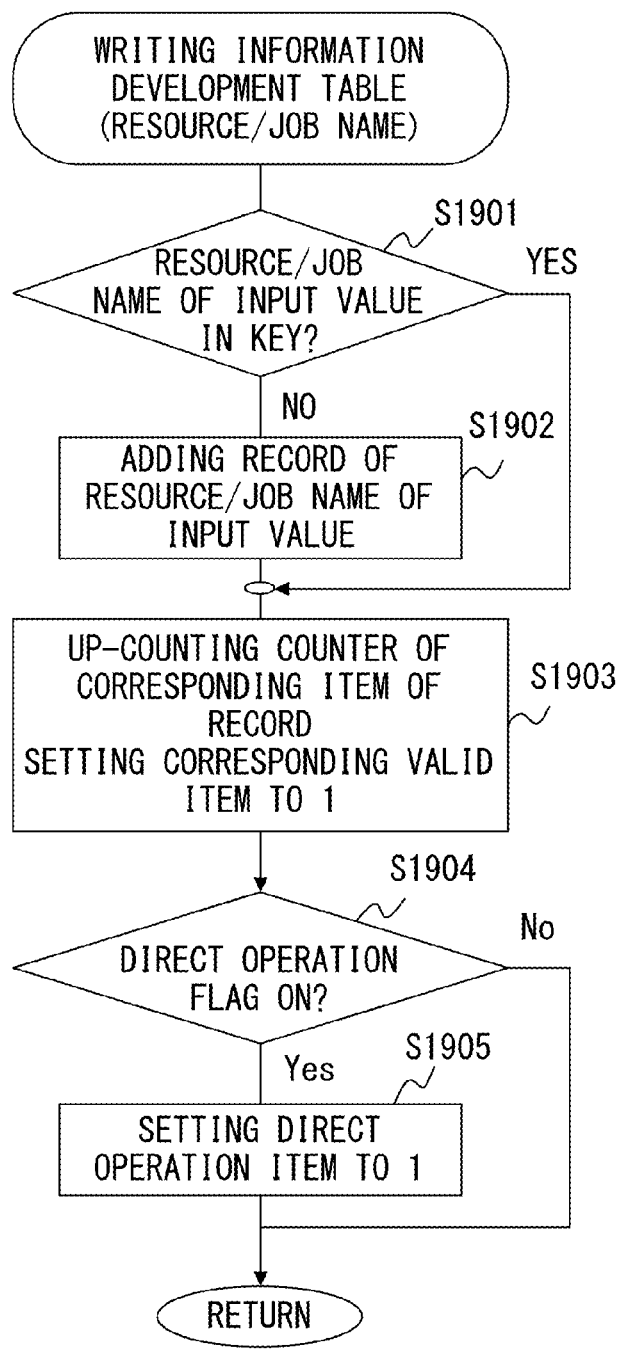
FIG. 19 illustrates the flow of the writing process of the information development table (resources/job) in the process flows of the information development unit 2.
Figure 20:
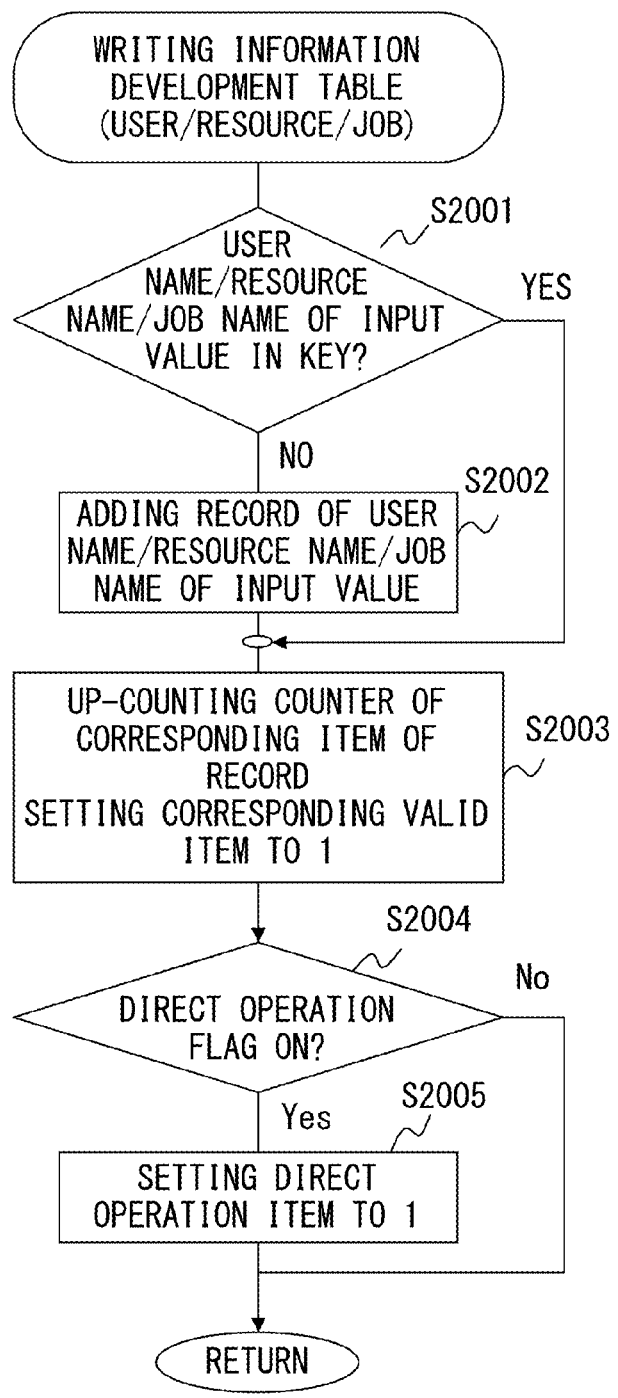
FIG. 20 illustrates the flow of the writing process of the information development table (user/resources/job) in the process flows of the information development unit 2.

Similarly, the processes in S1501 through S1505 are performed about the resource name of the input value in FIG. 15. In FIG. 16, the processes in S1601 through S1605 are performed about the job of an input value. In FIG. 17, the processes in S1701 through S1705 are performed about the user/resource of the input value. In FIG. 18, the processes in S1801 through S1805 are performed about the user/job of the input value. In FIG. 19, the processes in S1901 through S1805 are performed about the resource/job of the input value. In FIG. 20, the processes in S2001 through S2005 are performed about the user/resource/job of the input value.

As described above, the writing process of each information development table is performed according to FIG. 14 threshold 20.

The process of the information development unit 2 is described in detail with reference to FIGS. 12 through 21. Next, the process of the application information development unit 3 in S83 in FIG. 8 is described below with reference to FIGS. 22 through 30.

The application information development unit 3 is required when an operation and an action (irregular operation and action) not normally performed is applied for in advance so that the operation applied for in advance is not takes as a fraudulent or abnormal operation. The application information development unit 3 develops the information about an operation etc. applied for in advance so that that information has the same data structure as in the information development table and the accumulative information development table.

There are the following methods (1) and (2) of applying for an irregular operation etc. in advance.
(1) Using the trail log as an operation record collected previously or from another system, the corresponding portion is copied and applied for as trail log information.
(2) When a trail log corresponding to an operation or action to be applied for is not acquired, and when the corresponding operation or a comparison key (user, resource, job) corresponding to the action is known, the comparison key information, the frequency, the time, etc. are directly applied for by specifying them as a condition input.

Figure 22:
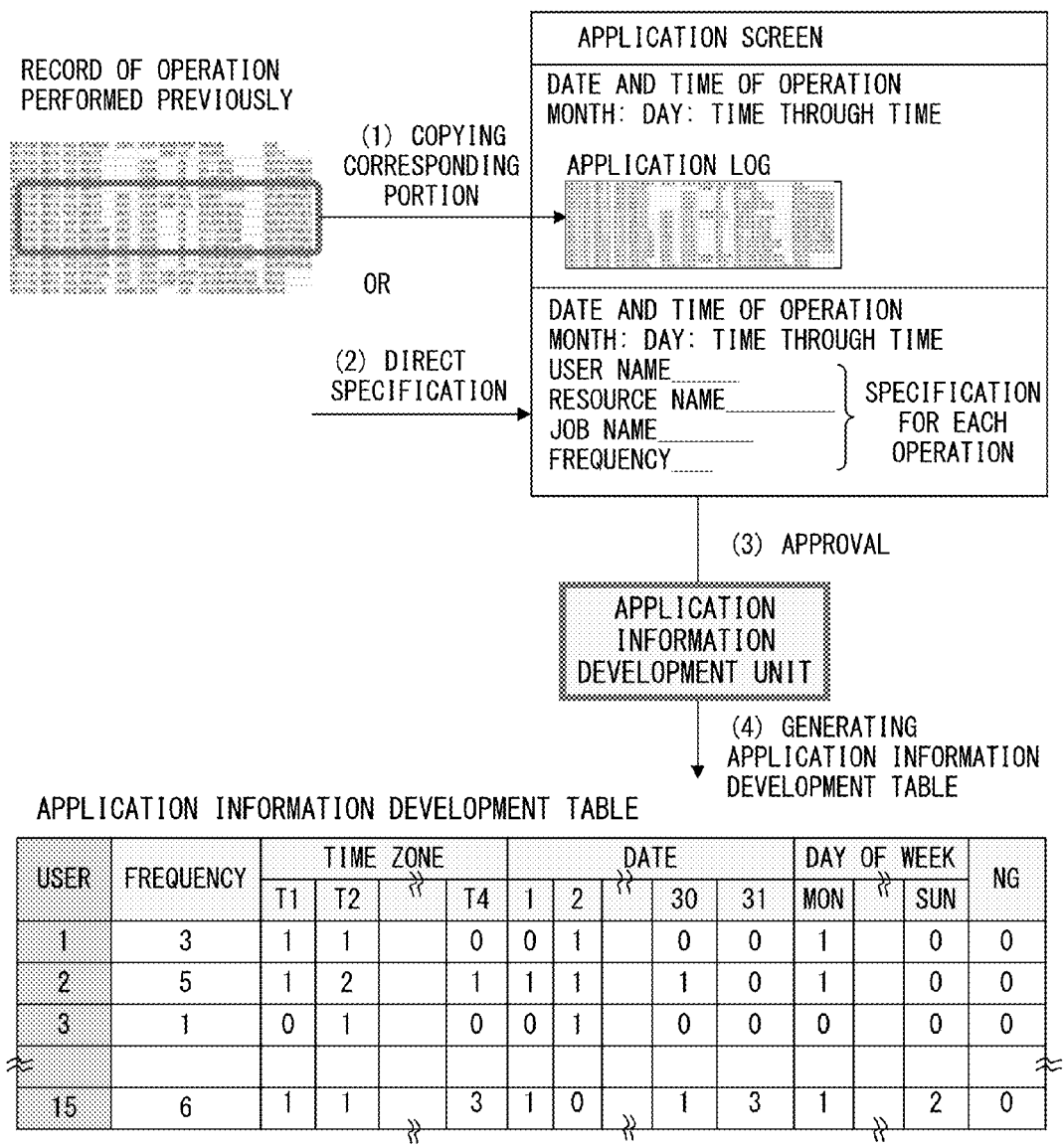
FIG. 22 is an explanatory view of the outline of the process of an application information development unit 3.

FIG. 22 illustrates the outline of (1) and (2) above.

In (1) above, the corresponding portion is copied from the previously performed operation record, and applied to the portion where the application log on the application screen is applied. Then, the working schedule time is input as the date and starting time to ending time.

In the case of the direct specification in (2) above, the working schedule time is specified as the date and starting time to ending time with a user name, a resource name, a job name, a frequency, etc.

Then, the entry contents are approved by a system administrator, and the application information development unit 3 develops the entry information to generate the application information development table 13.

Figure 23A:
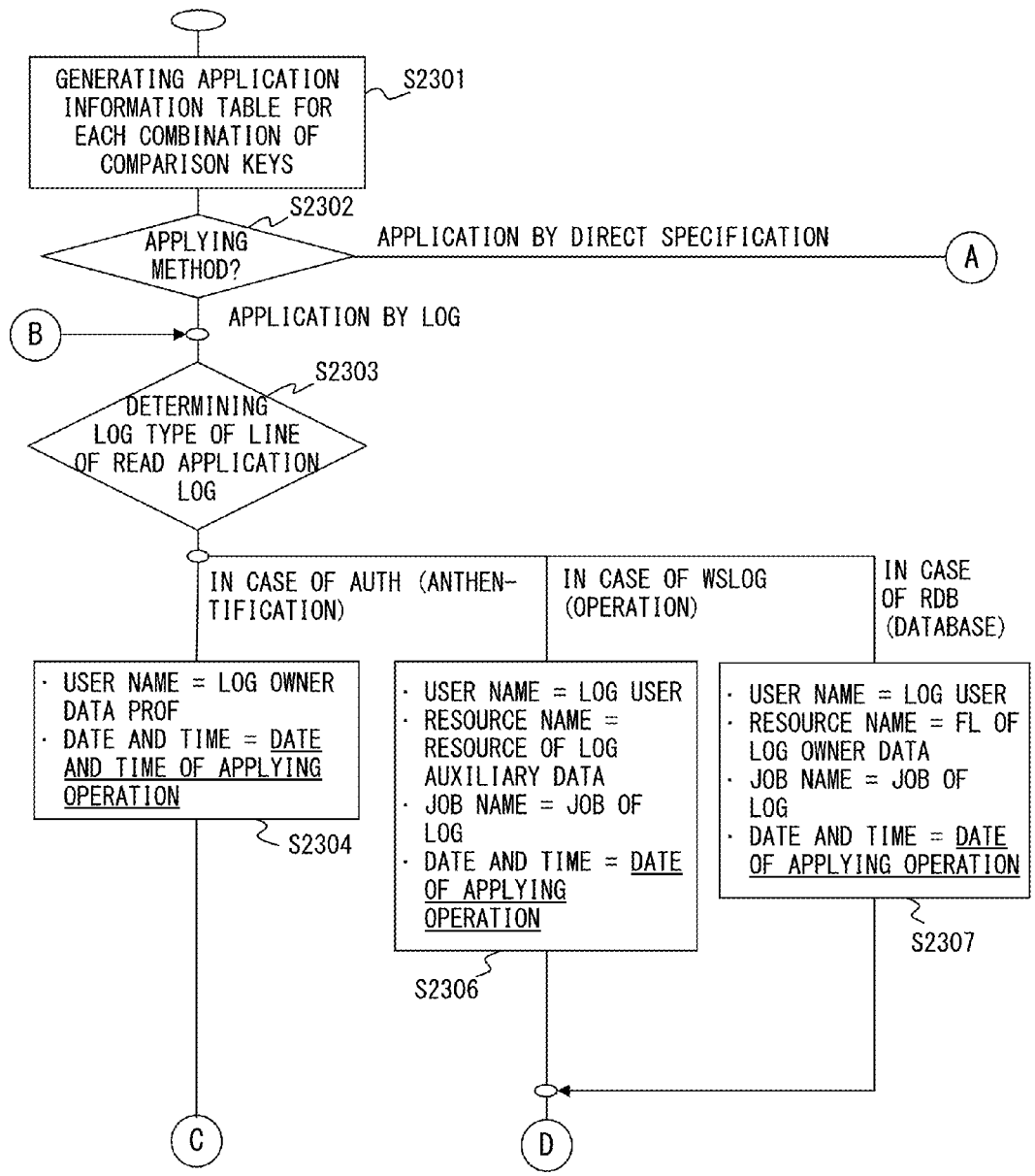
FIG. 23A is a view (1) of the flow of the application information development unit 3.
Figure 23B:
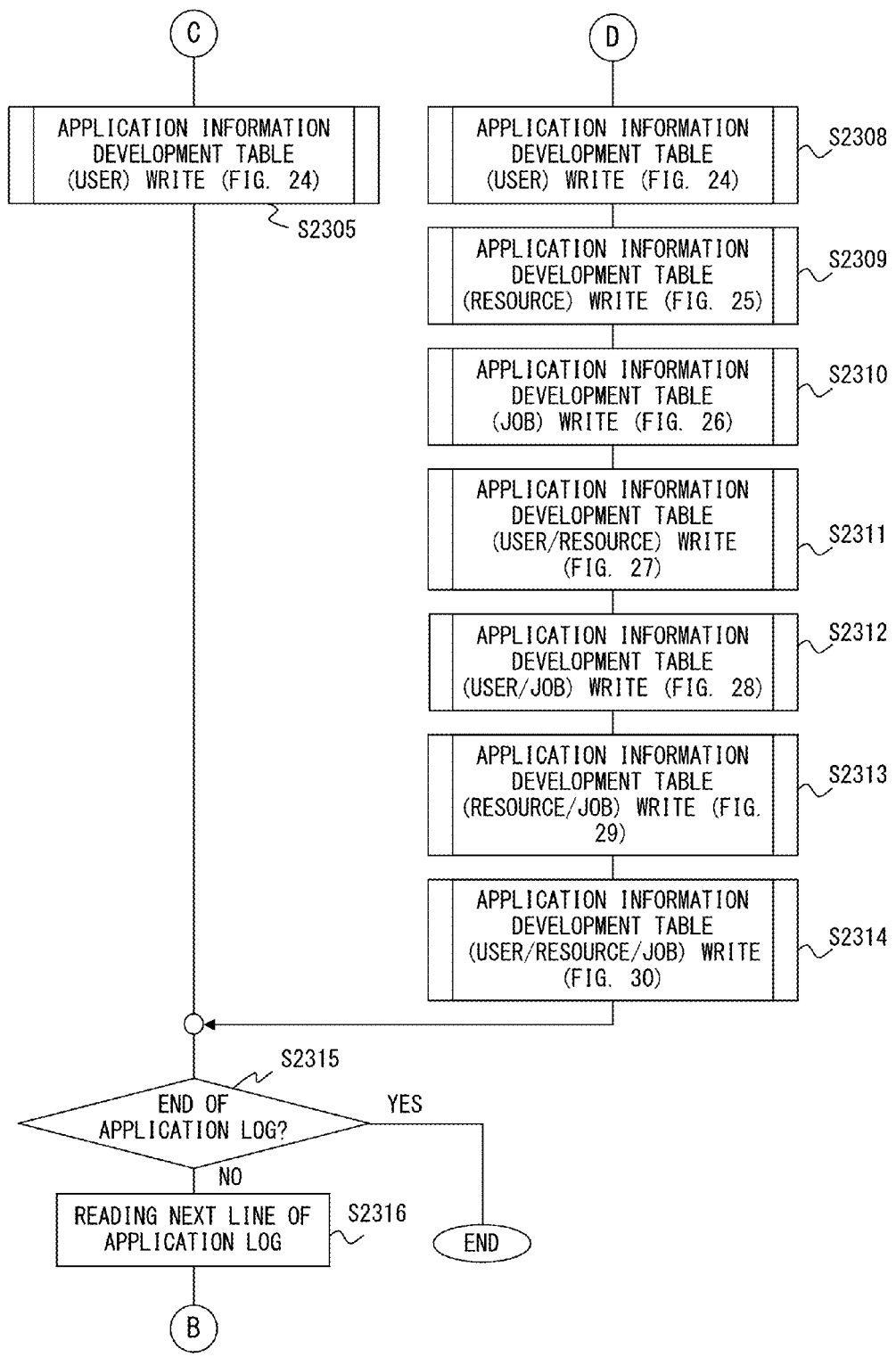
FIG. 23B is a view (2) of the flow of the application information development unit 3.
Figure 23C:
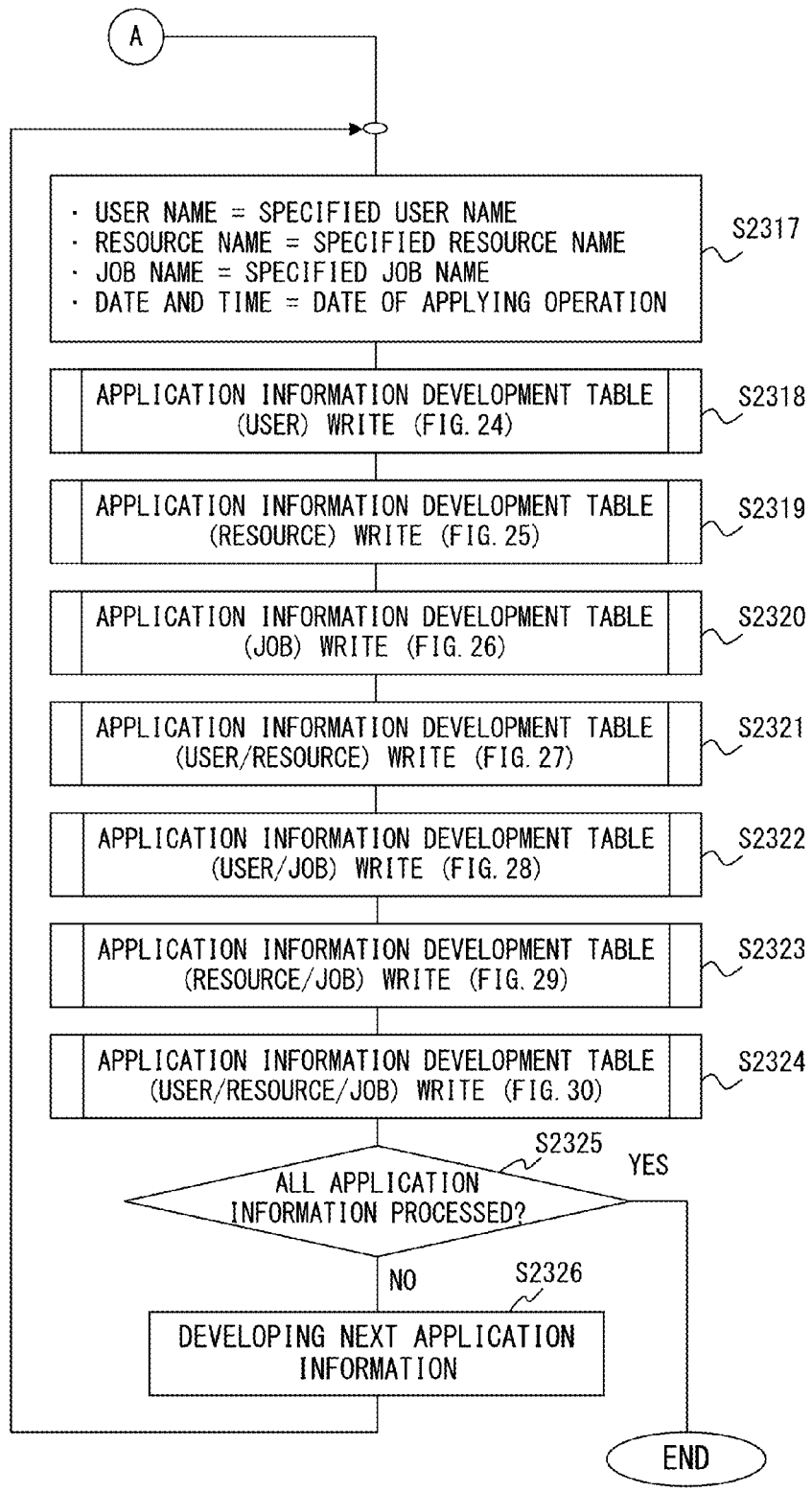
FIG. 23C is a view (3) of the flow of the application information development unit 3.

FIGS. 23A through 23C are a flowchart of the application information development unit 3.

First, as when the information development table is generated, an application information development table for each combination of comparison keys is generated. That is, when the comparison key is a "user", a "resource", and a "job", the following seven types of application information development tables are generated.

Information development table (user)
Information development table (resource)
Information development table (job)
Information development table (user/resource)
Information development table (user/job)
Information development table (resource/job)

Information development table (user/resource/job)

First, in S2301, an application information table for each combination of comparison keys is generated.

Next, the type of application method is determined in S2302. When the application method is realized by an application by a log, control is passed to S2303. When the application method is realized by an application by direct specification, control is passed to S2317.

First, the processes in S2303 through S2316 are explained for the case of the application by a log.

In the case of an application by a log, the process similar to that of the information development unit 2 is performed. The difference from the information development unit 2 is not that the date and time information is acquired from the trail log before performing the writing process on the analysis target development table in the step of acquiring an input value, but that the operation schedule time etc. input in (1) above is acquired.

First in FIGS. 23A through 23C, the log type in the line of the application log read in S2303 is determined. When the log type is "AUTH" (authentication), control is passed to S2304. When the log type is "WSLOG" (operation), control is passed to S2306. When the log type is RDB (database), control is passed to S2307.

In S2304, it is assumed that "user name" equals "PROF of main data of log", and "date and time" equals "application operation date". Next, the writing process of the application information development table (user) is performed in S2305. The writing process of each application information development table is described later with reference to FIGS. 24 through 30.

When the log type is determined as "WSLOG" (operation) in S2303, control is passed to S2306. In S2306, it is assumed that "user name" equals "log user name", "resource name" equals "log auxiliary data resource", "job name" equals "log job", and "date and time" equals "application operation date". Next, in S2308 through S2314, the writing process is performed on the application information development table. When the log type is WSLOG, it indicates that there are all combinations of comparison keys, thereby performing the writing process on all following seven types of application information development table. That is, in S2308, a write is made to the application information development table (user). Similarly, in S2309, a write is made to the application information development table (resource). Similarly, in S2310, a write is made to the application information development table (job). In S2311, a write is made to the application information development table (user/resource). In 2312, a write is made to the application information development table (user/job). In S2313, a write is made to the application information development table (resource/job). In S2314, a write is made to the application information development table (user/resource/job). The writing process of the application information development table is described later with reference to FIGS. 24 through 30.

In addition, if it is determined that the log type is "RDB" (database) in S2303, control is passed to S2307. In S2307, it is assumed that "user name" equals "log user name", "resource name" equals "log main data FL", "job name" equals "log job", and "date and time" equals "application operation date". As with the case of the log type "WSLOG", the processes in S2308 through S2314 are performed.

When control is passed from S2304 or S2314 to S2315, it is determined in S2315 whether or not the process has been performed up to the final line of the application log. If YES, the process terminates. If NO, the next line of the application log is read (S2316), thereby returning S2303.

The writing process to the application information development table in S2305 and S2308 through S2314 in FIG. 23B is respectively described below with reference to FIGS. 24 through 30.

The write to the application information development table is performed for each combination of comparison keys (for each type of application information development table). The actions are identical, but the respective target keys are different. Therefore, the application information development table (user) is described in detail with reference to FIG. 24, and the detailed description of FIGS. 25 through 30 is omitted here.

Figure 24:
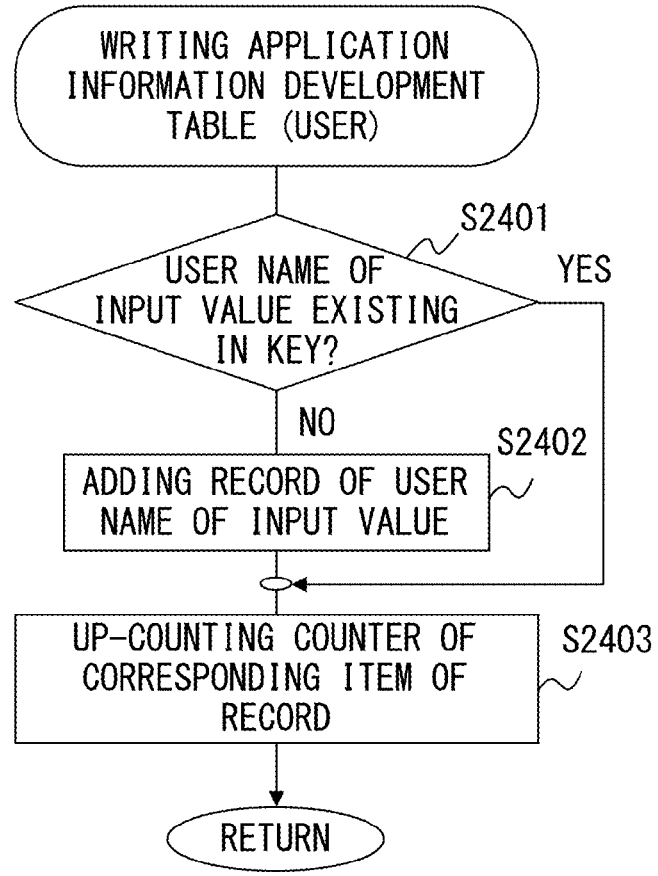
FIG. 24 illustrates the flow of the writing process of the application information development table (user) in the process flow of the application information development unit 3.

First, it is determined in S2401 in FIG. 24 whether or not there is a user name (user name acquired in S2304) of an input value in the comparison key of the information development table. If YES, control is passed to S2403. If NO, control is passed to S2402. In S2402, a record of the user name of the input value is newly added to the table. Then, control is passed to S2403. In S2403, the counter of the corresponding item of the record is counted according to the information about the date and time of the input value.

In the writing process of the application information development table, it is first determined whether or not there is a record having the value identical to the input value in the table. If NOT, a new record is generated. Then, the counter of the item of the corresponding comparison zone in each record is counted.

Figure 25:
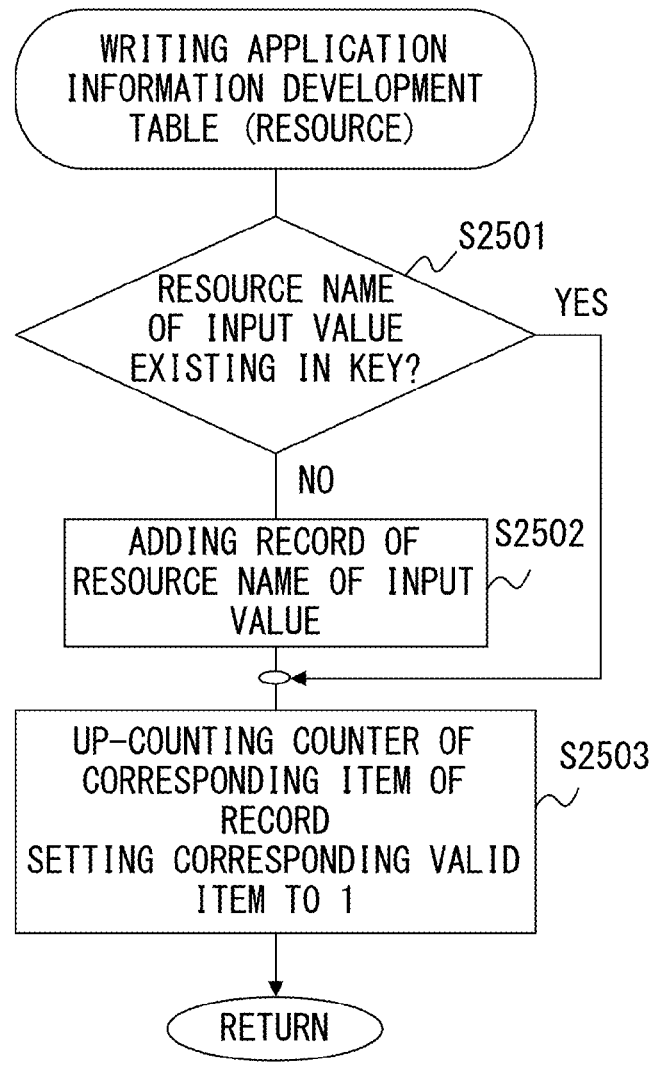
FIG. 25 illustrates the flow of the writing process of the application information development table (resources) in the process flow of the application information development unit 3.
Figure 27:
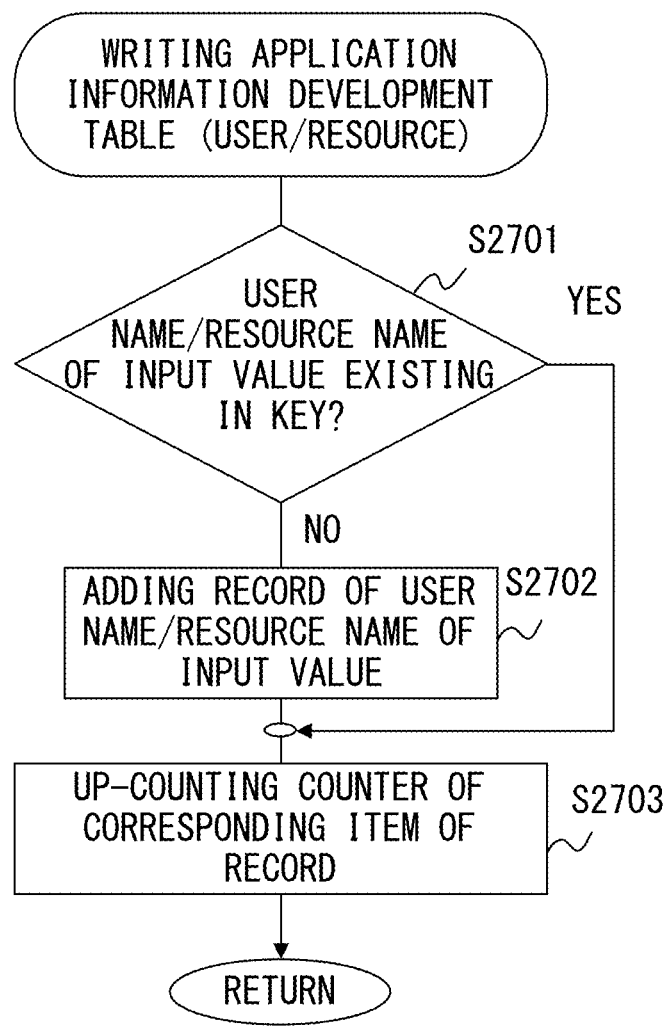
FIG. 27 illustrates the flow of the writing process of the application information development table (user/resources) in the process flow of the application information development unit 3.
Figure 28:
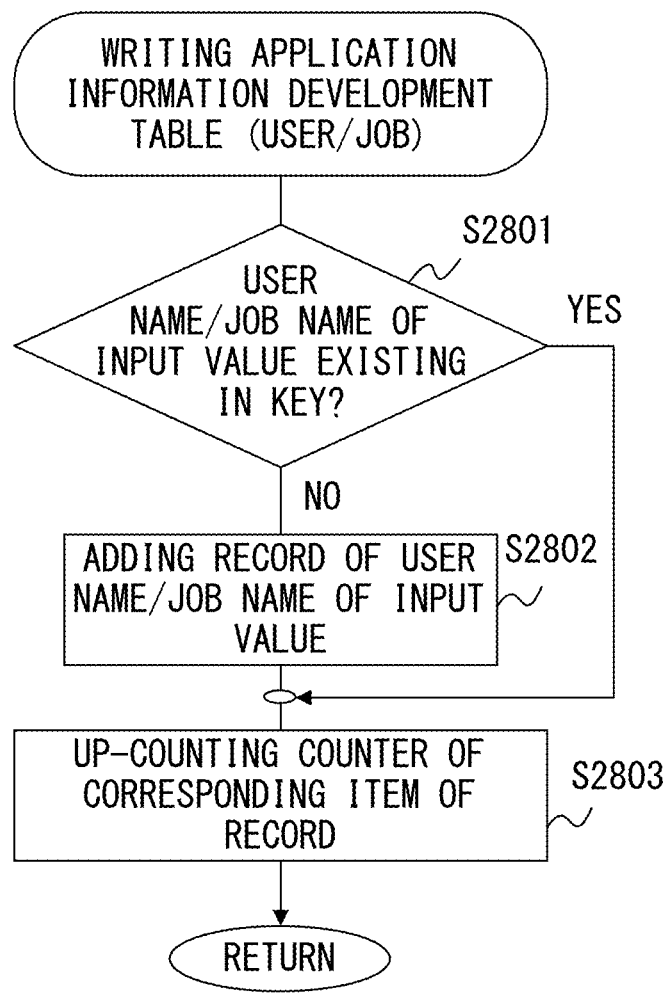
FIG. 28 illustrates the flow of the writing process of the application information development table (user/job) in the process flow of the application information development unit 3.
Figure 29:
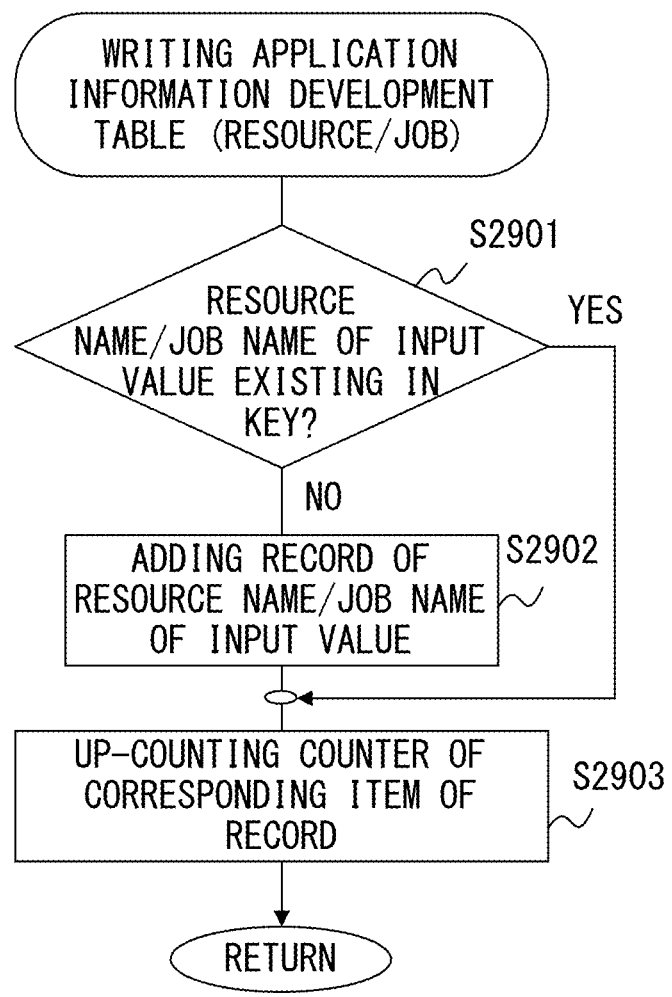
FIG. 29 illustrates the flow of the writing process of the application information development table (resources/job) in the process flow of the application information development unit 3.
Figure 30:
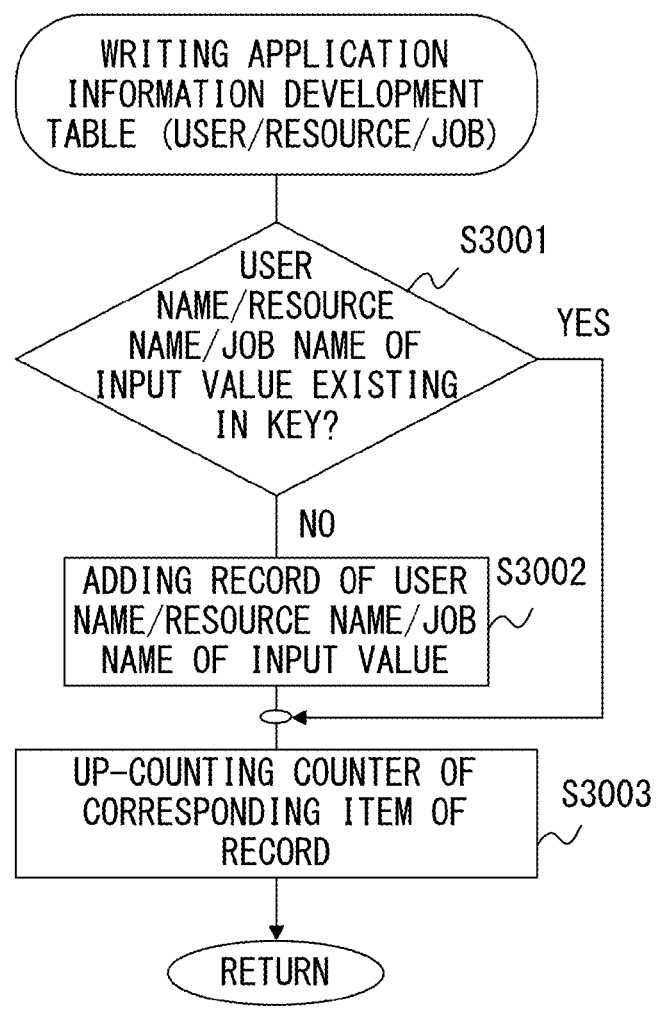
FIG. 30 illustrates the flow of the writing process of the application information development table (user/resources/job) in the process flow of the application information development unit 3.

Similarly, in FIG. 25, the processes in S2501 through S2503 are performed on the resource name of the input value. In FIG. 26, the processes in S2601 through S2603 are performed on the job of the input value. In FIG. 27, the processes in S2701 through S2703 are performed on the user/resource. In FIG. 28, the processes in S2801 through S2803 are performed on the user/job of the input value. In FIG. 29, the processes in S2901 through S2903 are performed on the resource/job of the input value. In FIG. 30, the processes in S3001 through S3003 are performed on the user/resource/job of the input value.

As described above, based on FIGS. 24 through 30, the writing process of each application information development table may be performed.

Described next is the processes in S2317 through S2326 which are performed when it is determined in S2302 that the type of the application method is an application by direct approximation.

First, in S2317, it is assumed that "user name" equals "specified user name", "resource name" equals "specified resource name", "job name" equals "specified job name" and "date and time" equals "application operation date". In S2318 through S2324, the writing process is performed on each application information development table. In S2318, a write is made to the application information table (user). In S2319, a write is made to the application information table (resource). In S2320, a write is made to the application information table (job). In S2321, a write is made to the application information table (user/resource). In S2322, a write is made to the application information table (user/job). In S2323, a write is made to the application information table (resource/job). In S2324, a write is made to the application information table (user/resource/job). Each writing process is described in FIGS. 24 through 30.

In S2325, it is determined whether or not all application information has been processed. If YES, the process is terminated. If NO, control is returned to S2317 with the process target of the next application information (S2326).

As described above, according to the flowchart in FIGS. 23A through 23C, the application information using a trail log and the application information by direct condition specification may be developed in the form of information development table.

The application information development unit 3 has been described in detail above with reference to FIGS. 22 through 30. Described next is the process of the comparison unit 9.

As illustrated in the entire condition of the system in FIG. 6, the comparison unit 9 is configured by including the preparation unit 4 and the decision unit 5. In the comparison unit 9, the preparation unit 4 first prepares for the comparison, and then the decision unit 5 performs a comparison and a determination.

First, the process of the preparation unit 4 is described in detail with reference to FIGS. 31 and 32, and then the decision unit 5 is described.

FIG. 31 is an explanatory view of the outline of the process of the preparation unit 4. The preparation unit 4 temporarily adds the information about the information development table 10 to the accumulative information development table 11 as a record so that the information development table 10 may be easily compared with the accumulative information development table 11.

Described in the following explanation is the case in which the comparison keys are "user", "resource", and "job", and the information development table and the accumulative information development table of the "user/resource/job" are used, but an identical process is performed in the case of other information development tables.

As illustrated in FIG. 31A, the preparation unit 4 performs the process of adding the information development table to the accumulative information development table.

When each record of the information development table is added to the accumulative information development table, there may be the following case.

(1) When the key value of the comparison key of the added record does not exist in the accumulative information development table.

(2) When the key value of the comparison key of the added record exists in the accumulative information development table.

(3) When a record exists in the accumulative information development table, but the key value of the corresponding comparison key does not exist in the added information development table.

(1) in FIG. 31 is a corresponding example of in the case of (1) above. In this example, the records having the values "PROF2", "P100.ALIB", and "AJOB" of the comparison keys "user", "resource", and "job" respectively are to be added to the accumulative information development table. However, since there are no combinations of "PROF2", "P100.ALIB", and "AJOB" as the values of the comparison keys in the accumulative information development table, a record is added to the accumulative information development table. In this case, two types of records, that is, "accumulative" and "latest" are generated as illustrated in (1) in FIG. 31. Then, the contents of the record of the information development table are written to the record of the type of information of "latest" in the two types of generated records. In FIG. 31, although no valid item is illustrated in each information development table, the information about the valid item is also written.

(2) in FIG. 31 is an example corresponding to the case in (2) above. In this example, the records having the values "PROF2", "P100.ALIB", and "AJOB" of the comparison keys "user", "resource", and "job" respectively are to be added to the accumulative information development table. Since there are combinations of "PROF2", "P100.ALIB", and "AJOB" as the values of the comparison keys in the accumulative information development table, the storage for a write of records of the information development table is already reserved. As illustrated in (2) in FIG. 31, the value of the counter of each record of the information development table is added to the record of the type of information "latest" which is initialized to 0 in advance.

(3) in FIG. 31 is an example corresponding to the case of (3) above. In this example, there are the records having the values "PROF2", "P100.ALIB", and "AJOB" of the comparison keys "user", "resource", and "job" respectively in the accumulative information development table, but the values do not exist in the records of the information development table. In the case of the record existing in the accumulative information development table but not existing in the information development table, each item value of the record having the type of information of "latest" remains 0 which is the initial value.

The outline of the process of the preparation unit 4 is described above. In the present embodiment, a write of the contents of the information development table to the accumulative information development table as illustrated in (1) and (2) above is adding the information development table to the accumulative information development table.

FIG. 32 is a flowchart of the preparation unit 4.

First, in S321, a record of the information development table is retrieved.

Next, it is determined whether or not there is the key value of the record retrieved in S322 in the record of the accumulative information development table. If YES, control is passed to S325. If NO, control is passed to S323.

In S323, two records are newly added to the accumulative information development table. One is a record to store an accumulated record, and the item value of the information type is "accumulative". Another record is to store the latest record, and the item value of the type of information is "latest". In S324, the record of the information development table is written to each counter of the latest record.

In S325, the record of the information development table is written to each counter of the record having the "latest" as the type of information in the accumulative information development table.

In S326, it is determined whether or not all records on the information development table have been processed. If YES, the process terminates. If NO, the next record in the information development table is retrieved in S327, and control is returned to S322.

The preparation unit 4 of the comparison unit 9 is described above with reference to FIGS. 31 and 32.

Next, the decision unit 5 of the comparison unit 9 is explained with reference to FIGS. 33 and 34.

The decision unit 5 determines the specified frequency and the specified rate entered and set with the event to be compared in the trail log to be analyzed in advance based on the accumulative information development table prepared by the preparation unit 4.

Figure 33:
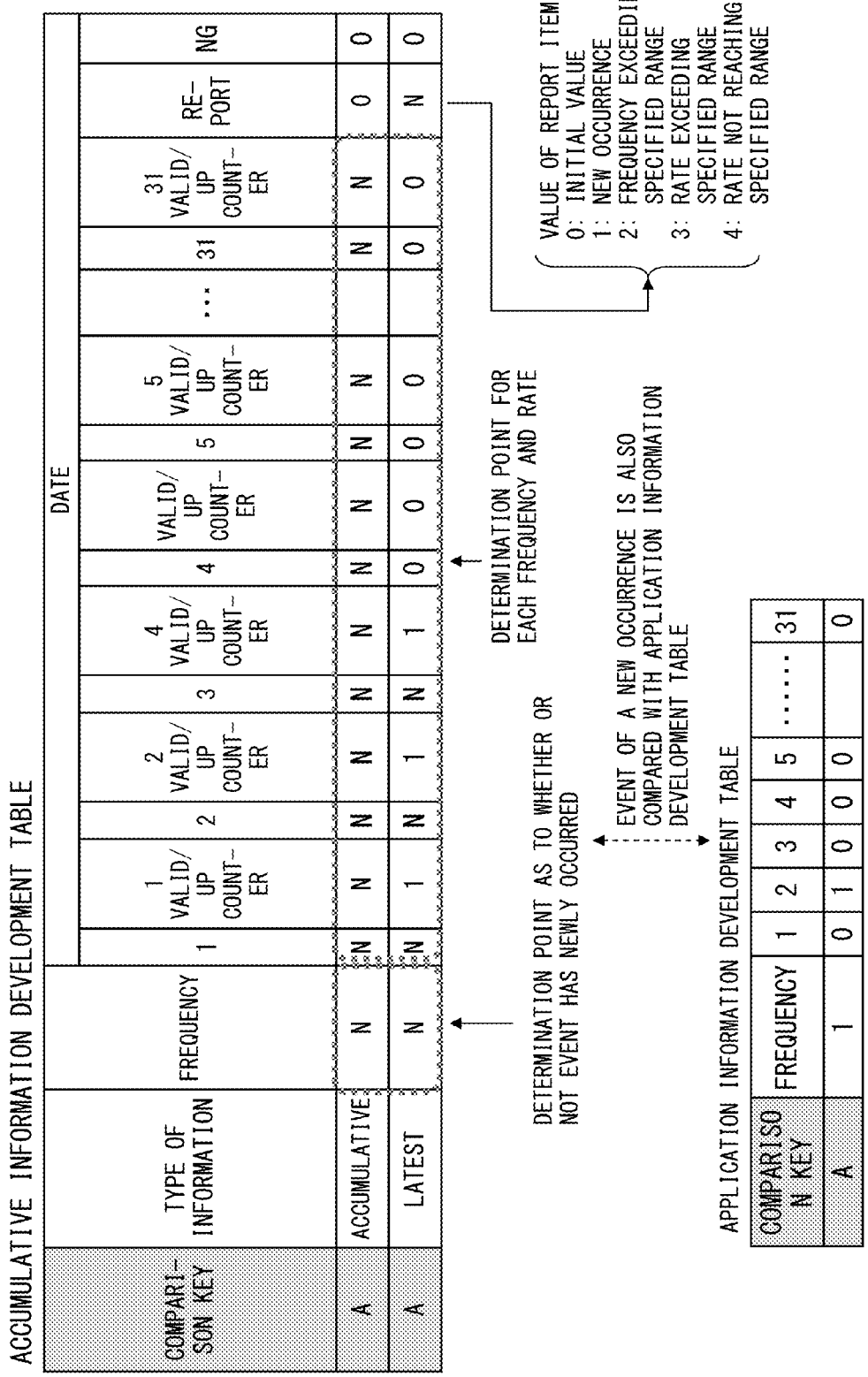
FIG. 33 is an explanatory view of the outline of the process of a decision unit 5 in the comparison unit 9.

FIG. 33 illustrates the outline of the decision unit 5.

First, a record having the same comparison key and the record having the type of information of "accumulative" and "latest" are read. Then, the record having the type of information of "accumulative" and the value of item of frequency of 0 is determined as an event which has newly occurred. The event which has newly occurred is compared with the application information development table, and it is determined whether or not the operation is an irregular operation. If it is determined that the operation is not an irregular operation, and is an event which has newly occurred, the value of 1 is written to the report item of the record having the type of information of "latest", and an event which has newly occurred is recorded.

When the record having the type of information of "accumulative" is not 0 for the item of frequency, it is not an event which has newly occurred, Therefore, it is determined whether or not the event has occurred over a specified frequency entered in advance or over a specified rate entered in advance.

The determination as to whether or not the event has occurred over a specified frequency may be determined by comparing the specified frequency defined by the analysis definition information 12 with the frequency of each comparison zone item of the record having the type of information of "latest". If it is determined that the specified frequency has been exceeded the value of 2 is written to the report item of the record having the type of information of "latest".

The determination as to whether or not an event has occurred over a specified rate is made by comparing the specified rate defined by the analysis definition information 12, the "frequency÷UP counter item value" and "value of each comparison zone item÷number of cycles" of the record having the type of information of "latest" The number of cycles refers to the value indicating how many times the item of each comparison zone has been processed as a target. For example, when the trail log to be analyzed is a log to be processed in the period of April 1 to June 30, three days in April, May, and June are detected (once since 31st day occurs only in May). Since the time zone is the same as the number of days, 91 is determined. The number of day of week is obtained by the known technology. If a trail log is collected for each week, the number of cycles of each day of week is 1. The number of cycles obtained in the decision unit 5 is stored in the memory of an information processing device, or somewhere in the accumulative information development table not illustrated in the attached drawings. The number of recorded cycles is used in the process of the subsequent accumulation unit 8. The item value of the UP counter is the value recorded by counting the value of the UP counter by the number of cycles. That is, the UP counter is the accumulation of the number of cycles, and is used in obtaining the frequency of one cycle value from the frequency of each comparison zone item of the accumulated record.

In addition, the determination of whether or not the number of occurrences of an event has reached the specified rate is made similarly as when it is determined whether or not the event has occurred over a specified rate.

As described above, when a rate over the specified rate is determined as a result of the comparison with the analysis definition information 12, the value of 3 is written to the report item having the type of information of "latest". In addition, when it is determined that the specified rate is not reached, the value of 4 is written to the report item having the type of information of "latest".

The decision unit 5 sequentially performs the above-mentioned processes on the record added in the accumulative information development table.

After determining whether or not an event has first occurred on all added records, or after a comparison with the specified frequency or the specified rate, the decision unit 5 confirms the correctness of the system action. The system action is performed by assuming that the event which has not last occurred is an abnormal event while the analysis definition information 12 includes the specification of a specified rate. The correctness confirming process may be performed at any time, or may be performed only when the specification of the definition exists. In addition, the confirmation of the correctness may be performed by a comparison of the event occurrence number with the specified frequency and specified rate. When a comparison and the determination are made by the above-mentioned specified frequency and the specified rate, the validation may be made only the event which has last occurred. An event which is to occur, but has not occurred yet (an event not included in the trail log to be analyzed) is not confirmed. The correctness confirming process is to confirm whether or not there is an event which is to occur but not has yet occurred.

Figure 34A:
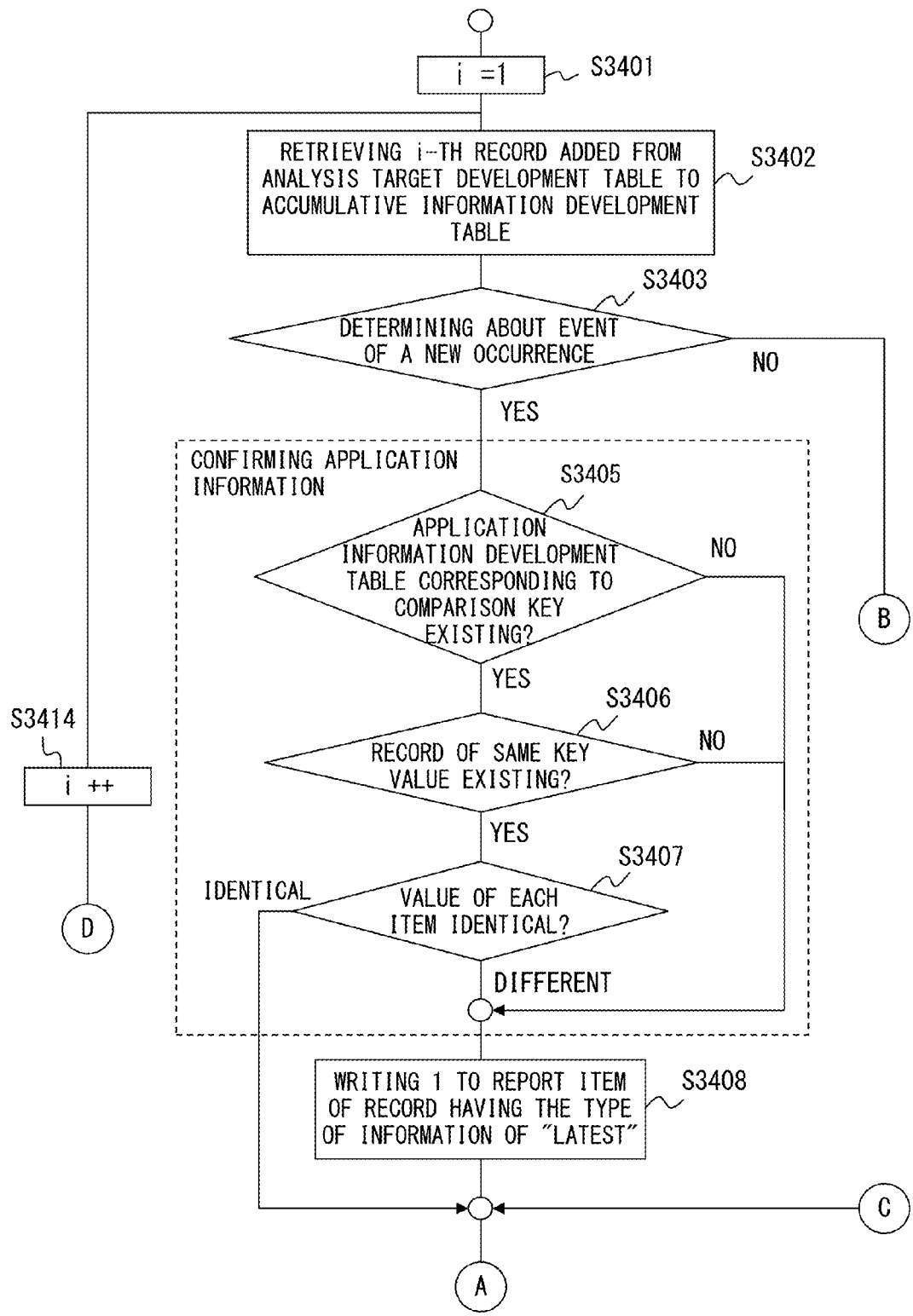
FIG. 34A is an explanatory view (1) of the process flow of the decision unit 5 in the comparison unit 9.
Figure 34B:
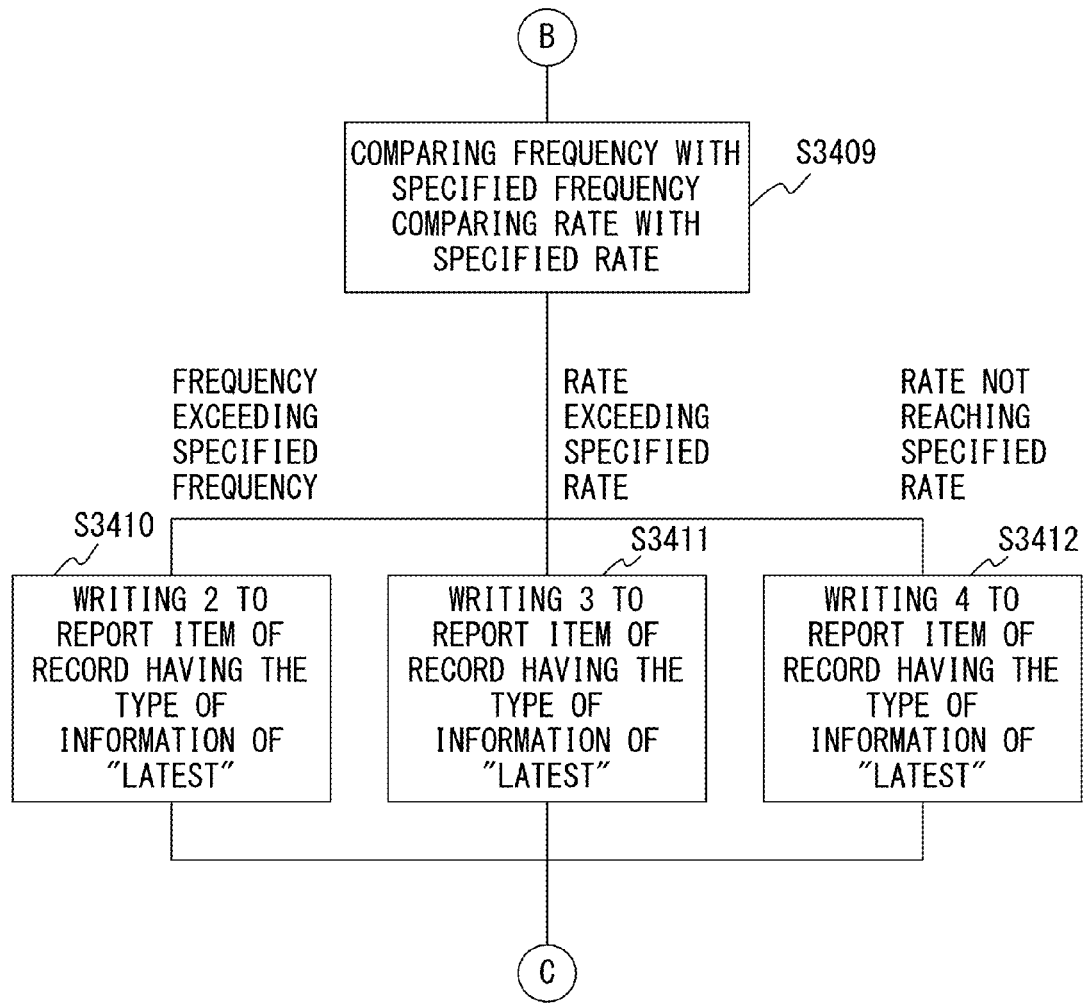
FIG. 34B is an explanatory view (2) of the process flow of the decision unit 5 in the comparison unit 9.
Figure 34C:
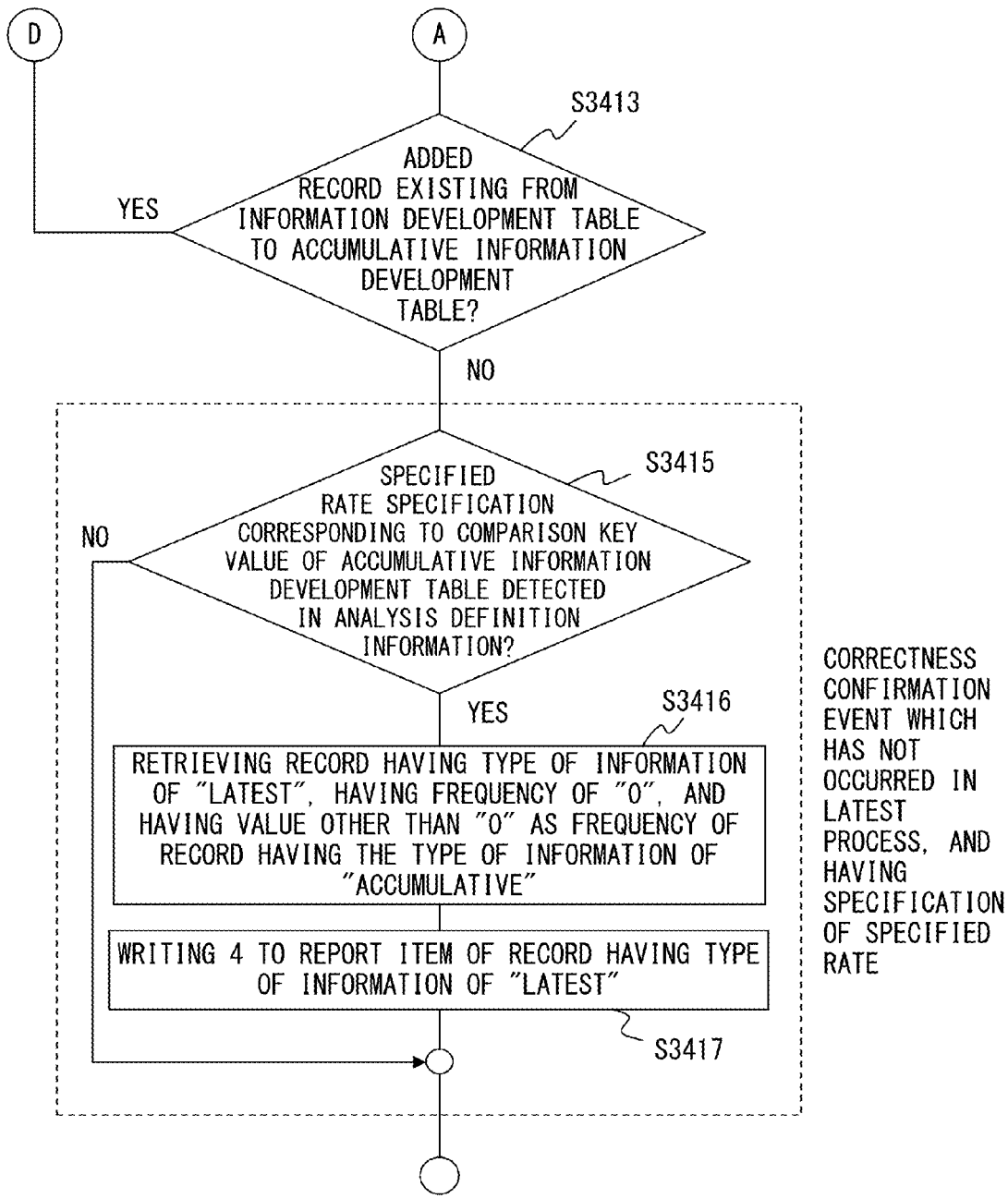
FIG. 34C is an explanatory view (3) of the process flow of the decision unit 5 in the comparison unit 9.

FIG. 34 is a process flow of the decision unit 5.

First, the index i is initialized to 1 in S3401. In S3402, the i-th record added from the analysis target development table to the accumulative information development table is read, and is set as a record being processed. Whether or not it is a record added to the accumulative information development table may be determined by confirming that it is a record having the type of information of "latest" and having a non-zero item for frequency.

Next, it is determined in S3403 whether or not the record being processed is an event which has first occurred. The determination as to whether or not it is an event which has first occurred may be performed by determining whether or not the frequency item of the record having the type of information of "accumulative" is 0. When the frequency item of the record having the type of information of "accumulative" is 0, it may be determined that the event has first occurred.

When it is determined that an event has first occurred (determined as YES in S3403), control is passed to S3405. It is determined in S3405 through S3407 whether or not the event has been entered in advance in an advance application. First, in S3405, it is determined whether or not there is an application information development table corresponding to the comparison key of the record currently being processed. For example, if the comparison key is a user (accumulative information development table (user)), it is determined whether or not there is an application information development table (user). If it is determined that there is no application information development table (NO) in S3405, control is passed to S3408. If it is determined that there is the table (YES) in S3405, then control is passed to S3406. In S3406, it is determined whether or not there is the record having the same value of comparison key of the record being processed. If it is determined that there is no such record (NO) in S3406, control is passed to S3408. If it is determined that there is the record (YES) in S3406, control is passed to S3407. In S3407, it is determined whether or not the item value of each comparison zone of a record being processed is identical. If so, it is the same as the operation event applied for in advance. Therefore, it is determined that there is no abnormal condition, and control is passed to S3413. If it is determined in S3407 that the values are different, control is passed to S3408. In S3408, the value of 1 is written to the report item of the record having the type of information of "latest" to record the event that has first occurred. Then, control is passed to S3413.

In S3403, when it is determined that the record being processed is not the event that has first occurred, control is passed to S3409. In S3409, a comparison is made between the specified frequency and the specified rate regulated in the analysis definition information 12.

As described above, the determination as to whether or not an event has occurred more frequently than the frequency specified in the analysis definition information 12 makes a comparison using the number of each comparison zone item of the record having the type of information of "latest". The determination of higher than a specified rate or of not reaching the rate is performed by comparing the "frequency÷UP counter item value" with the "number cycles÷value of each comparison zone item" of the latest record.

If the specified frequency is exceeded as a result of the comparison in S3409, the value of 2 is written to the report item of the record having the type of information of "latest" is written (S3410). If the specified rate is exceeded as a result of the comparison in S3409, the value of 3 is written to the report item of the record having the type of information of "latest" is written (S3411). If it is determined that the specified rate is not reached as a result of the comparison in S3409, the value of 4 is written to the report item of the record having the type of information of "latest" is written (S3412). After S3410, S3411, and S3412, control is passed to S3413.

In S3413, it is determined whether or not there is a record added from the analysis target development table to the accumulative information development table. If YES, the index i is incremented by 1 in S3414 and control is returned to S3402. If it is determined NO identification S3413, control is passed to S3415. In S3415 through S3417, the process of confirming the correctness of the system application is performed.

The confirmation of correctness is performed by assuming that the event not yet occurred latest be generated with the specification of a specified rate. First, in S3415, it is determined whether or not the analysis definition information 12 includes the specification of a specified rate corresponding to the comparison key value of the accumulative information development table. If NO, the process terminates. If it is determined YES in S3415, control is passed to S3416. In S3416, the record having the frequency item value of 0 of the record having the type of information of "latest", and not having the frequency item value of 0 of the record having the type of information of "accumulative" is retrieved in the accumulative information development table. In S3417, the value of 4 is written to the report item of the record (information type is "latest") retrieved in S3417, and the occurrence of an event records that the specified rate is not reached.

The processes in S3415 through S3417 are described below with reference to concrete examples. For example, assume that a specified rate is specified by "resource"="FILE", "job"="JOB" for the comparison key value of the analysis definition information 12. In this case, there is the accumulative information development table (resource/job), and the record of the key values matching the "FILE" and "JOB" in the table is to be processed. Next, in the records which have been determined as target records, those having 0 as the frequency item value of the record having the type of information of "latest", and not having 0 as the frequency item value of the record having the type of information of "accumulative" are retrieved. The retrieved records correspond to an event whose specified rate is specified but which has not last occurred. Therefore, the value of 4 (indicating an event which does not satisfy the specified rate) is written to the report item of the retrieved record having the type of information of "latest".

As described above, the process of the decision unit 5 is described with reference to FIGS. 33 and 34.

Next, the report unit 6 is described with reference to FIGS. 35 and 36. The report unit 6 is a result of the comparison by the decision unit 5. Based on the value of the report item of the accumulative information development table, an event that has newly occurred and an event out of the specified range are reported and output. The output report may be used as is as a system monitor report etc.

In addition, the system administrator determines whether or not there is a problem with the event as a result of output from the report unit 6, and the event having the problem is entered as is. The entry information is recorded by writing the value of 1 indicating an abnormal condition to the NG item of the corresponding record in the accumulative information development table. The NG item of the accumulative information development table is first initialized as the value of 0. Therefore, when a write is not made to the NG item, that is, the value is 0, it means a normal condition.

FIG. 35 illustrates the outline of the process of the report unit 6.

First, the report unit 6 retrieves all records whose report item has a value other than 0. Then, the report information depending on the value of the report item is output. (process of (1) in FIG. 35). In this case, each event name is the value of the comparison key. For example, user name/resource name/job name.

When the value of the report item is 1, it indicates that a new event has occurred. Therefore, the event name and the frequency, and the frequency of each comparison item are output. As illustrated in FIG. 35, for example, "user name AAA, frequency of N, frequency of N for each day" is output.

When the value of the report item is 2, it indicates that the number of occurrences of an event has exceeded a specified frequency. Therefore, the event name, the frequency, and the specified frequency of the analysis definition information 12 is output as a report.

When the value of a report item is 3, it indicates that the occurrence rate of an event in a certain time period has exceeded a specified rate. Therefore, the event name, the frequency (rate), and the specified rate of the analysis definition information 12 are output as a report.

When the value of the report item is 4, it indicates that the occurrence rate of an event in a certain time period does not reach a specified rate. Therefore, the event name, the frequency (rate), and the specified rate of the analysis definition information 12 are output as a report.

The thus output report is displayed on the screen as illustrated in the "trail log analysis result report" in FIG. 35 on the display device of an information processing device.

Next, the system administrator determines whether or not there is a problem with an output event. If the system administrator determines that it is the event with a problem, he or she inputs a check at the check portion of the NG of the screen to enter the event as an event with a problem (process of (2) in FIG. 35).

Afterwards, the report unit 6 writes 1 (value indicating an abnormal condition) to the NG item of the record having the type of information of "latest" on the accumulative information development table corresponding to the event specified as "NG" (process of (3) in FIG. 35). Thus, the abnormal event is entered in the system.

Figure 36:
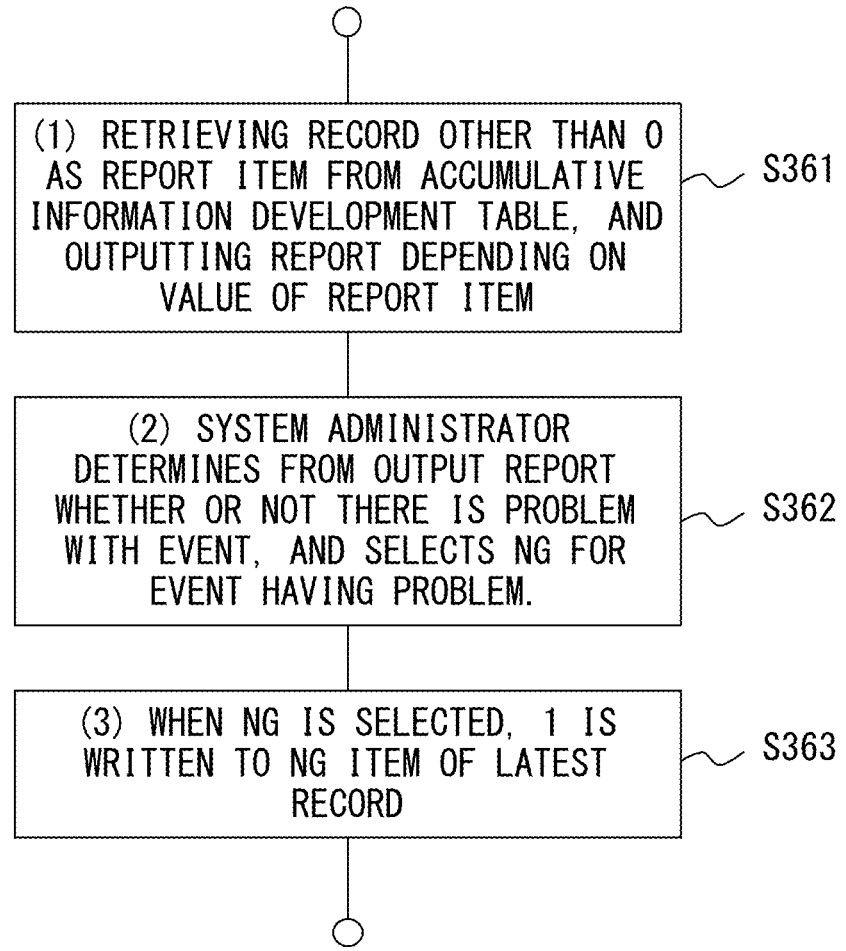
FIG. 36 is an explanatory view of the flow of the process of a report unit 6.

FIG. 36 is a process flow of the report unit 6.

First, a record having the value of the report item other than 0 is retrieved, and a report corresponding to the value of the report item is output. The value of the report item and the contents of the report to be output are described above.

Next, it is determined in S362 whether or not it is determined from the report output by the system administrator whether or not there is a problem with the event, and selects NG if there is a problem with the event.

Next, if NG is selected in S363, the value of 1 (indicating an abnormal condition) is written to the NG item of the record having the type of information of "latest" in the accumulative information development table.

The report unit 6 is described above with reference to FIGS. 35 and 36.

Next, the operation prohibit information reflection unit 7 is described with reference to FIGS. 37 and 38.

The operation prohibit information reflection unit 7 retrieves an abnormal event (having the value of 1 in the NG item) recorded in the accumulative information development table, and performs the process of adding the definition to the user limit definition 16 for prohibition of the operation of the management target server 62. The management target server 62 includes the definition about the prohibition of an operation by a user so that the user does not perform the operation by the existing user operation prohibit control function etc. The operation prohibit information reflection unit 7 is operative only when the management target server 62 which has collected a trail log includes the user limit definition 16, and the user has the function of prohibiting the operation.

FIG. 37 illustrates the outline of the process of the operation prohibit information reflection unit 7.

In the process above, the direct command operation performed by the user on the system is prohibited among the events determined as "abnormal". Whether or not the event has been operated by a direct command on the system by the user may be determined by the value of 1 stored in the item of the direct operation in the record. Therefore, the operation prohibit information reflection unit 7 first retrieves the record having the value of 1 for the item of the direct operation of the record having the type of information of "latest", and the value of for the NG item. The information about the operation corresponding to all retrieved records is entered according to the definition format of the user restriction definition used by the user restricting function provided for the management target server 62. That is, the user name and the job name of the retrieved record are written to the user restriction definition as a user and operation (command) for which the operation is restricted. In the example in FIG. 37, the operation corresponding to the record in the bottom line of the accumulative information development table is entered in the user restriction definition (user=TANAKA, command=EDITFILE). Thus, when the user TANAKA is to perform the operation of editing a file etc., the operation is forcibly prohibited and becomes inoperable.

Figure 38:
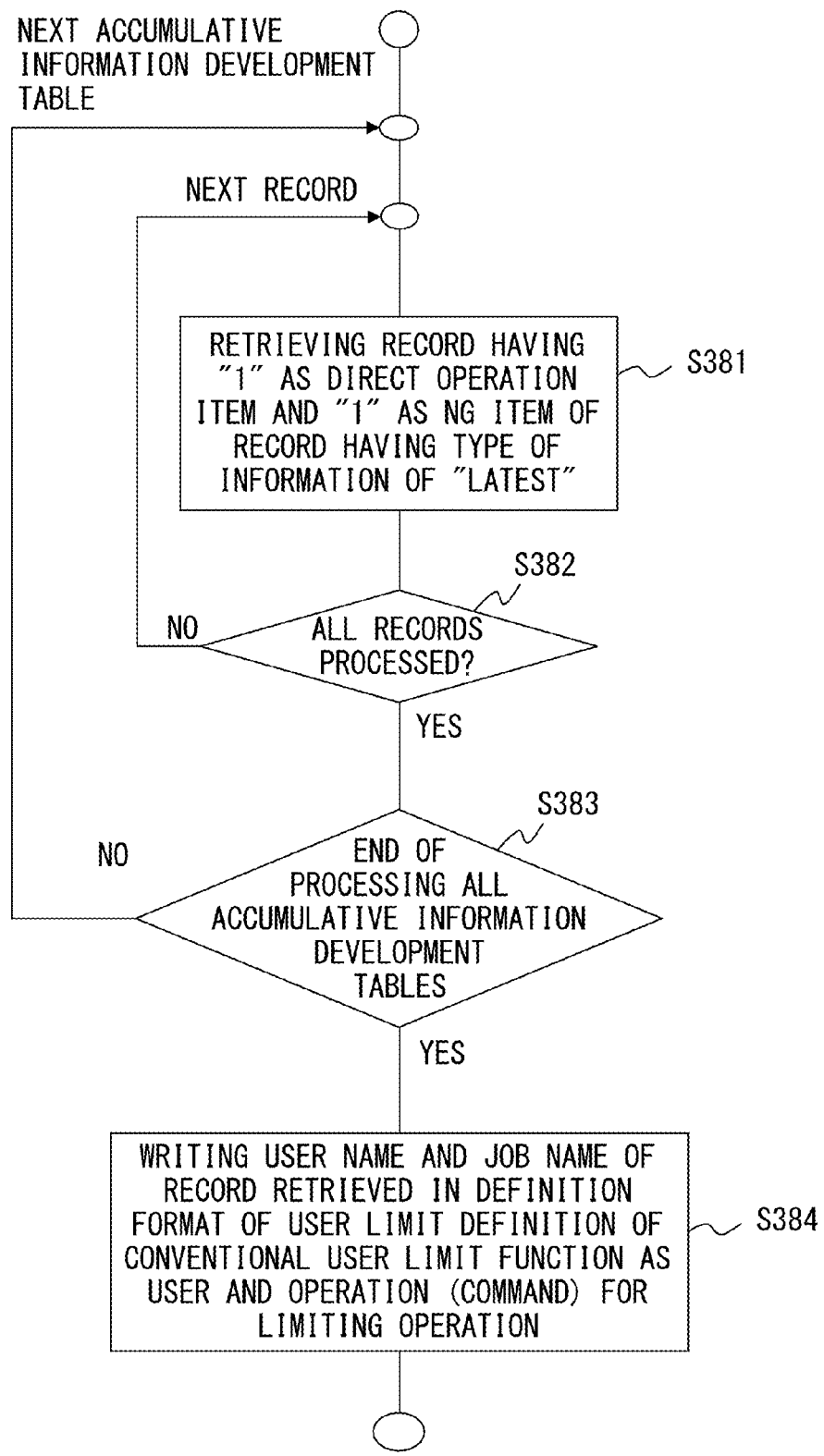
FIG. 38 is an explanatory view of the flow of the process of an operation prohibit information reflection unit 7.

FIG. 38 is a flowchart of the operation prohibit information reflection unit 7.

The operation prohibit information reflection unit 7 performs the process of checking a record on all of one or more accumulative information development tables. First, a record having the value of 1 for the direct operation item of the record having the type of information of "latest" and the value of 1 for the NG item is retrieved in S381 in a certain accumulative information development table. Then, in S382, it is determined whether or not all records in the accumulative information development table have been checked. If all records have not been checked (NO), then control is returned to S381, and the records of the accumulative information development table are sequentially checked. When the processes in S381 and S382 have been completed, the next accumulative information development table is processed. In S383, it is determined whether or not the processes of all accumulative information development tables have been completed. If not (NO), control is returned to S381. If the processes of all accumulative information development tables are completed (YES), control is passed to S384. In S384, according to the definition format of the user restriction definition of the user restricting function, the user name and the job name of the retrieved record are written as a user and an operation (command) for restriction of an operation.

The processes of the operation prohibit information reflection unit 7 are described above. Next, the process of the accumulation unit 8 is described with reference to FIGS. 39 and 40.

The accumulation unit 8 performs the process of accumulating the events excluding those determined as an abnormal event by the report unit 6, that is, the number of occurrences (counter value) of each item corresponding to a correct event in the accumulative information development table.

Figure 39B:
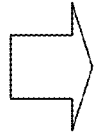
FIG. 39B is an explanatory view (2) of the outline of the process of an accumulation unit 8.
Figure 39C:
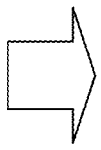
FIG. 39C is an explanatory view (3) of the outline of the process of an accumulation unit 8.

FIG. 39 illustrates the outline of the process of the accumulation unit 8.

The accumulation unit 8 performs the process of all records added to the accumulative information development table from the information development table.

In this case, difficult processes are performed depending on the following added records (1) and (2).

(1) A record determined as a normal event (2) A record determined as an abnormal event First, the process on the added record determined as a normal event is illustrated in (1) of FIG. 39.

As illustrated in (1) of FIG. 39, in the accumulative information development table, a target record added in the latest process and determined as a normal event, that is, the record having the type of information of "latest", having the frequency item value other than 0, and having the value of 0 as a NG item value, may be extracted. Since the extracted record is determined as a normal event, each counter value is added to the accumulated record.

As illustrated in (1) of FIG. 39, the item value of y1 having the date "1" of the record having the type of information of "latest" is added to the item value of x1 having the date "1" of the record having the type of information of "accumulative". Similarly, the item value of y2 having the date "2" of the record having the type of information of "latest" is added to the item value of x2 having the date "2" of the record having the type of information of "accumulative". The number of cycles S recorded in the memory etc. not illustrated in the attached drawings is added to the UP counter of the date item of "1" of the record having the type of information of "accumulative" (N+S). Similarly, the number of cycles S is added to the UP counter of the date item of "2" of the record having the type of information of "latest". Relating to the records having the dates of "3" through "31", since the column indicating whether or not the record having the type of information of "valid" is valid indicates invalidity (value of 0), the adding process is not performed. In addition, after the adding process is completed, each item value of the record having the type of information of "latest" is initialized to 0 (cleared).

Next, (2) the process to be performed on the record determined as an abnormal event is described below. As illustrated in (2) of FIG. 39, in the accumulative information development table, a target record added in the latest process and determined as an abnormal event, that is, the record having the type of information of "latest", having the frequency item value other than 0, and having the value of 1 as a NG item value, may be extracted. In this case, no process is performed, and each item value of the record having the type of information of "accumulative" is initialized to 0 (cleared).

FIG. 39 illustrates in (3) an example of the case in which there is a record in the accumulative information development table, but no record is added from the information development table in the latest process, and each item value of the record having the type of information of "latest" is 0. As illustrated in (3) of FIG. 39, since the value of each item of the record having the type of information of "latest" is 0, no process is performed.

Figure 40:
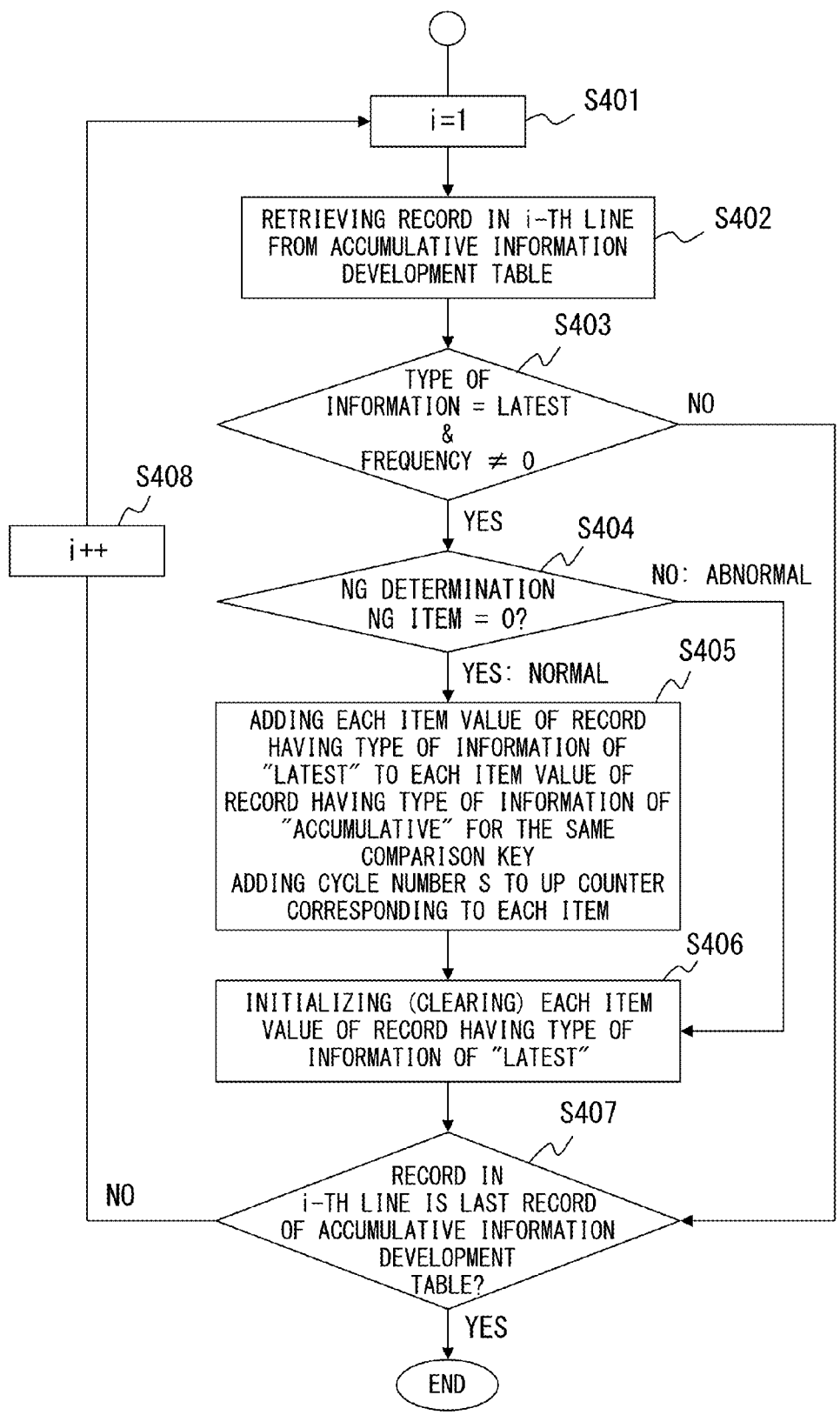
FIG. 40 is an explanatory view of the process flow of the accumulation unit 8.

The outline of the process of the accumulation unit 8 is described above. FIG. 40 is the process flow of the accumulation unit 8.

First, the index i is initialized to the value of 1 in S401.

In S402, the record in the i-th line is retrieved from the accumulative information development table. In S403, it is determined whether or not the information type item is "latest", and the frequency item value is 0. If NO, control is passed to S407. If YES, control is passed to S404. In S404, it is determined whether or not the record refers to an abnormal (NG) event. That is, the determination is made depending on whether or not the value of the NG item of the retrieved record is 0. If the value of the NG item is not 0 (NO), the event corresponding to the retrieved record is NG. Therefore, no addition is made to the accumulated record, and control is passed to S406. If the value of the NG item of the retrieved record is 0 (YES) in S404, the event corresponding to the retrieved record is not NG. Therefore, control is passed to S405 to perform the adding process to the accumulated record.

In S405, each item value of the record having the type of information of "latest" is added to each item value of the record having the type of information of "accumulative" with the same comparison key as the retrieved record. Furthermore, the number of cycles S is added to the UP counter corresponding to each item. Then, control is passed to S406.

In S406, each item value of the record having the type of information of "latest" is initialized to 0 (cleared). Then control is passed to S407.

It is determined in S407 whether or not the record in the i-th line is the last record in the accumulative information development table. If it is the last record (YES), the process terminates. If it is not the last record (NO), control is passed to S408. In S408, i is incremented by 1, and control is returned to S402.

By the flowchart illustrated in FIG. 40, the accumulation unit 8 accumulates the information corresponding to a normal log in the accumulative information development table. The embodiment 1 is described above in detail with reference to the attached drawings.

According to the present embodiment, since a large volume of trail logs to be analyzed may be compared with the past normal trail log, a more correct determination may be performed. In addition, when the comparison is made for a determination, the trail logs are not compared with one another as is, but values representing the number of occurrences of events are compared for a determination for each comparison zone, thereby realizing a high-speed process.

According to the present embodiment, not only fraudulent operations and actions, but also the correct status of normally performed operations and actions may be confirmed by comparing the past correct trail log with the last acquired trail log, thereby confirming the correctness of the system operation.

Also according to the present embodiment, the configuration of the information development table and the accumulative information development table may be changed by a definition, thereby configuring a comparison key and item according to the system to be analyzed. That is, a comparison is made for each time period, a date, a day of week which are different in operation contents, thereby flexibly performing processes according to the system to be analyzed.

In addition, the number of occurrences of the events corresponding to the trail log is accumulated according to the present embodiment, the pattern corresponding to a normal operation is discriminated from the pattern corresponding to an abnormal operation according to the accumulative information. Therefore, it is not requested to enter the pattern of a normal operation, the pattern of a fraudulent operation, etc. as with the prior art technology. In addition, the accumulative information is updated by sequentially accumulating the last acquired trail log, and it is determined whether or not operation is normal according to the accumulative information. Therefore, the reliability of the determination of a fraudulent operation and the correctness of a system operation is enhanced.

Relating to the operation of the system according to the embodiment 1, a more concrete example is described below in more detail with reference to the embodiments 2 through 6. According to the embodiment 2, the case in which a newly performed operation or action is detected as a fraud is described. According to the embodiment 3, described is the case in which a fraud etc. is detected by the specified frequency in a day with respect to a certain operation etc. Furthermore, according to the embodiment 4, described is the case in which a fraud etc. is detected by the specified rate in a day with respect to a certain operation etc. According to the embodiment 5, described is the case in which a fraud etc. is detected by the determination as to whether or not the operation is in accordance with the application information. According to the embodiment 6, described is the case in which the correctness of a system operation is determined.

Embodiment 2

Described below is the case in which a newly performed operation or action is detected as a fraud.

FIG. 41 illustrates analysis definition information 411 according to the embodiment 2.

The "comparison key" refers to "user, resource, job". The "comparison zone", "comparison key value", "specified frequency", and "specified rate" respectively refer to "XXX", "XXX, XXX", "NNN", and "NNN". Thus, when a newly performed operation or action is detected as a fraud, only a comparison key is set.

Figure 42:
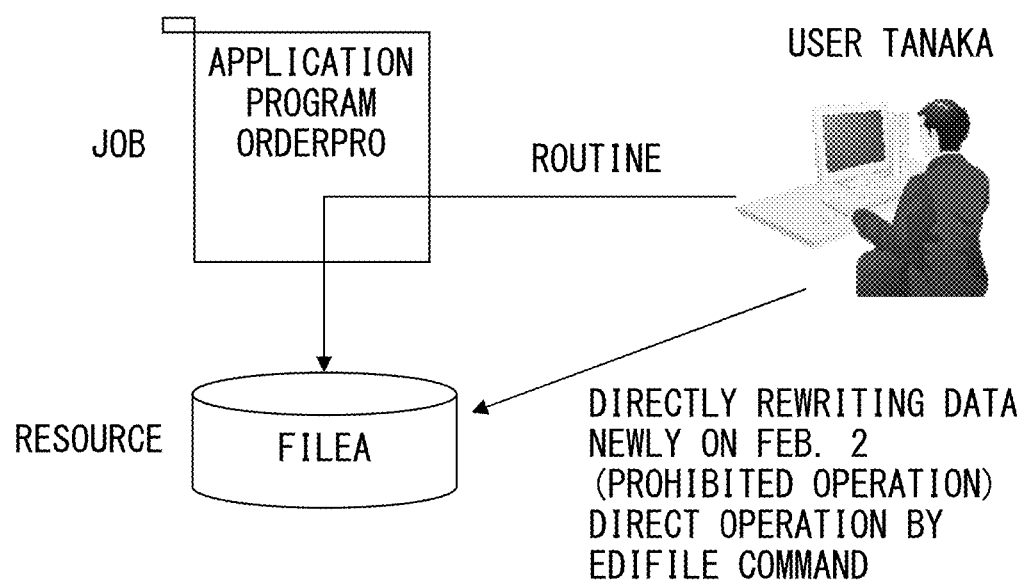
FIG. 42 is an explanatory view of an operation etc. according to the embodiment 2.

In this case, assume that the operation as illustrated in FIG. 42 is performed. That is, it is assumed that the resource of an order database=FILEA is processed only by an order application program (ORDERPRO). However, on February 2, the user TANAKA performed the process of directly rewriting FILEA by an EDTFILE command.

Figure 43A:
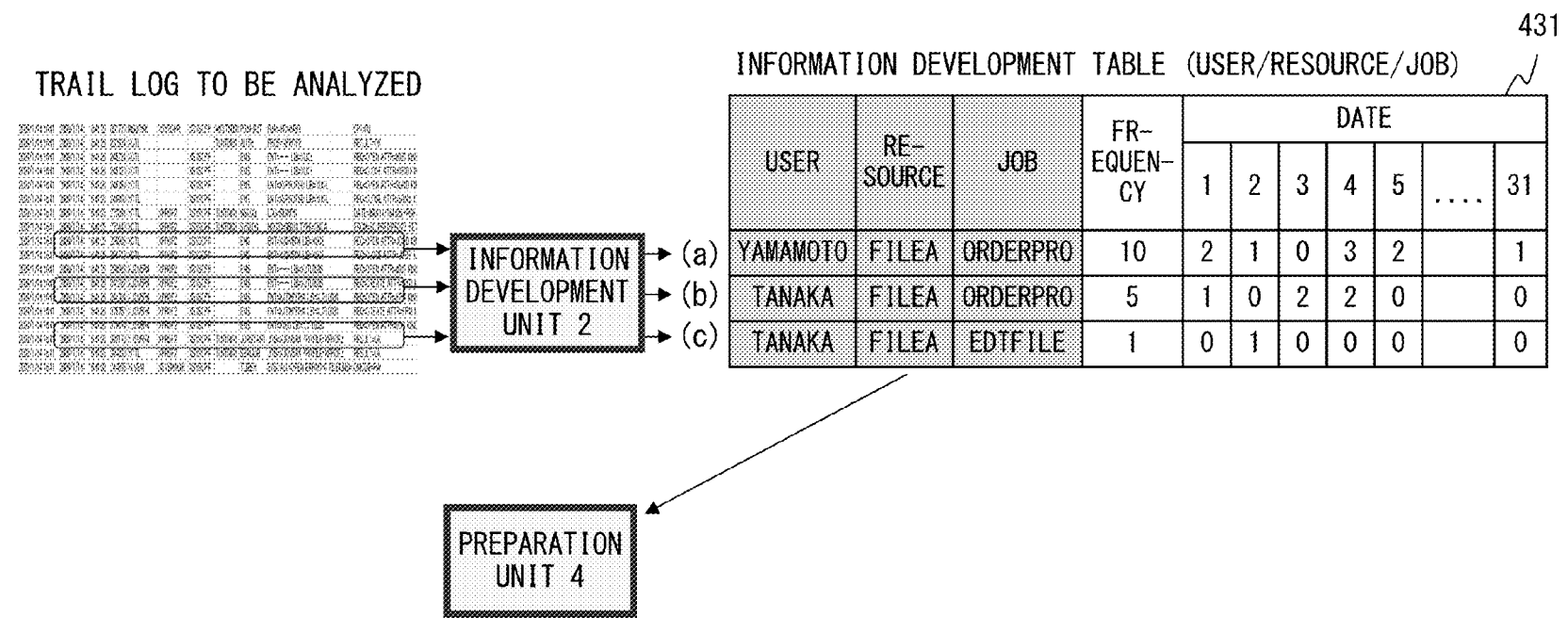

FIG. 43 illustrates the outline of the process of the trail log analysis system according to the present embodiment when the operation as illustrated in FIG. 42 is performed.

First, the information development unit 2 generates an information development table from an analysis target trail log 430. The information development table is generated for all combination of a user, a resource, and a job. However, in FIG. 43, only an information development table (user, resource, job) 431 is illustrated. In the information development table 431 in FIG. 43, the following records (a), (b), and (c) are generated.
(a) "YAMAMOT+FILEA+ORDERPRO+10+2+ . . . +1"
(b) "TANAKA+FILEA+ORDERPRO+5+1+ . . . +0"
(c) "TANAKA+FILEA+EDTFILE; 1+0+1 . . . +0"

The records (a) and (b) correspond to the event correctly operated through an application program (ORDERPRO). The record (c) indicates the value of 1 for the item of the 2nd day, which implies that the user TANAKA has directly edited the FILEA on the 2nd day.

Then, the next generated information development table 431 is added to an accumulative information development table 432 by the preparation unit 4. The records (a), (b), and (c) are added to the accumulative information development table 432 in FIG. 43.

Next, the decision unit 5 determines whether or not the event corresponds to a newly performed operation or action. That is, the record having the type of information of "accumulative" and having the value of the frequency item of 0 is determined as a newly performed operation or action. The explanation is given with reference to FIG. 43. It is determined that the record (c) of the accumulative information development table (user/resource/job) 432 is an event corresponding to the newly performed operation or action. Then, the value of 1 indicating an event corresponding to a newly performed operation or action is written to the report item of the record (c).

Next, when a value other than 0 is written to the report item of each record of the accumulative information development table (user/resource/job) 432, the report unit 6 outputs a report, and presents it to the system administrator etc. The value of 1 indicating a newly performed operation or action is stored in the record of (c) of the accumulative information development table (user/resource/job) 432 in FIG. 43. Thus, the information about the newly performed operation or action is generated, and a report is output. The system administrator determines whether or not it is an abnormal operation on the screen etc. of the information processing device, and an NG specification is input. When an NG specification is input, the report unit 6 writes the value of 1 to the NG item of the corresponding record of the accumulative information development table (user/resource/job) 432.

Figure 44B:
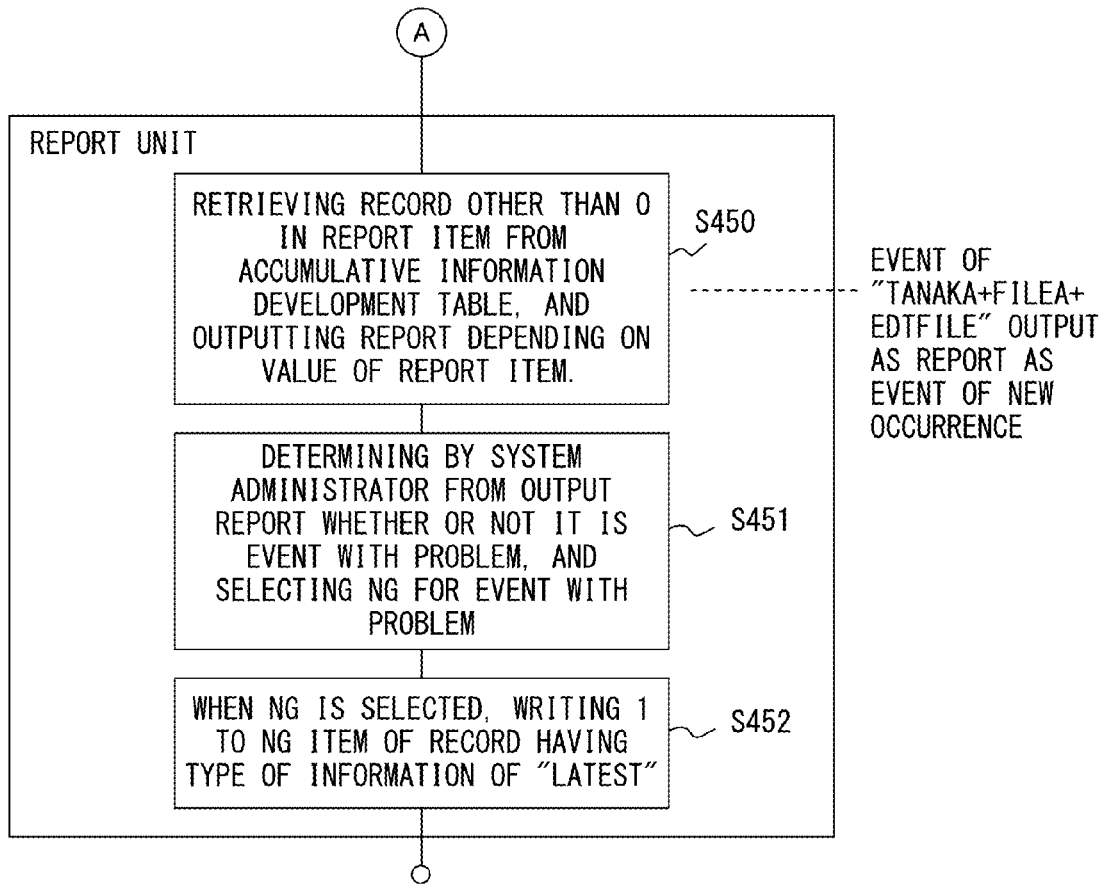

FIGS. 44A and 44B are a process flow according to the embodiment 2. The flowchart mainly illustrates the case in which the operation etc. illustrated in FIG. 42 is performed, and the detailed portion not illustrated in this flowchart is illustrated in the flowchart according to the embodiment 1.

In FIG. 44A, the definition unit 1 first generates the analysis definition information 411 in S441. In this case, it is only requested that the comparison key is set to detect the newly performed operation or action.

Next, in S442, the information development unit 2 generates the information development table 431 from the analysis target trail log 430. Refer to the flowchart of the information development unit 2 according to the embodiment 1 for detail.

Next, in S443, the preparation unit 4 adds a record having the type of information of "latest" to the accumulative information development table 432. Refer to the flowchart of the preparation unit 4 according to the embodiment 1.

Next, the decision unit 5 performs the processes in S444 through S449

In S444, the index i is initialized to 1. Next, in S445, the i-th record added from the information development table 431 is retrieved to the accumulative information development table 432. The records (a), (b), and (c) illustrated in FIG. 43 are retrieved. Next, in S446, an event of a new occurrence is determined. That is, the record including the value of 0 for the frequency item of the corresponding record having the type of information of "accumulative" is determined as an event of a new occurrence. Thus, the record (c) is determined as an event of a new occurrence. For an event not determined as event of a new occurrence in S446, control is passed to S3409 as illustrated in the flowchart of the decision unit 5 according to the embodiment 1.

Next, in S447, the value of 1 is written to the report item of the record having the type of information of "latest" for the request determined as an event of a new occurrence.

In S448, it is determined whether or not there is a record added from the information development table 431 in the accumulative information development table 432. If YES, control is passed to S449. If NO, control is passed to S450. In S449, the index i is incremented by 1, and control is returned to S445.

After S448, the processes are performed by the report unit 6. In S450, the report unit 6 retrieves a record having the value other than 0 for the report item of each record, and a report depending on the value of a report item is output.

Next in S451, a system administrator determines from the output report whether or not there is a problem with the event, and inputs NG to the event with a problem. Then, in S452, the report unit 6 writes the value of 1 to the NG item of the record having the type of information of "latest" in the accumulative information development table 432 for an NG input specified event.

The embodiment 2 is described above. According to the present embodiment, a newly performed operation or action may be detected.

Embodiment 3

Described below is the embodiment 3. The embodiment 3 is related to the case in which a fraud etc. is detected by a specified frequency in one day relating to an operation etc.

FIG. 45 illustrates the assumption of the system operation/action according to the embodiment 3.

That is, the resource of master data=FILEA is updated once or twice every day according to the master reflection application program (MPRO). However, TANAKA performs the operations five times on February 2. Since the number of operations performed TANAKA exceeds the specified frequency, it is detected as a fraudulent operation.

FIG. 46 is an example of analysis definition information 461 for detection of a fraud by a specified frequency.

The "comparison key" refers to "user, resource, job". The "comparison zone" refers to "all days" for comparison of "comparison zone" for all days. The comparison key value is "resource=FILEA, job=MPRO", and the operation for three times or more is determined as an abnormal event. Therefore, "specified frequency"="2" is specified.

FIG. 47 illustrates the outline of the process of the trail log analysis system according to the present embodiment when the system operation/action as illustrated in FIG. 45 is performed.

First, the information development unit 2 generates an information development table from an analysis target trail log 470. The information development table is generated for all combinations of a user, a resource, and a job. FIG. 47 illustrates only an information development table (resource/job) 471. In this case, the following record (a) is generated.

(a) "FILEA+MPRO+40+1+ . . . +1"

The record (a) has the value or 5 for the item of the 2nd day, which indicates that the job MPRO accessed the resource FILEA five times on February 2.

Then, the generated information development table 471 is added by the preparation unit 4 to an accumulative information development table 472. The record (a) is added to the accumulative information development table 472 in FIG. 47.

Next, the decision unit 5 determines whether or not it is an event of a new occurrence. If it is not an event of a new occurrence, a specified frequency is determined. A determination for a specified frequency is made by first determining whether or not it is an event to be determined. The determination for an event to be determined is made by checking the matching status of the comparison key etc. of the definition of the analysis definition information 461. In FIG. 46, "comparison zone" is "all days", the comparison key value is "resource=FILEA, job=MPRO". Therefore, the record (a) of the accumulative information development table (resource/job) 472 in FIG. 47 is to be determined.

Next, it is determined whether or not the value of each day (all items) has exceeded a specified frequency. In the analysis definition information 461 in FIG. 46, the specified frequency is defined as two times, and the item value of the 2nd day of the record (a) is five times, thereby exceeding the specified frequency. Thus, it is determined as an abnormal event, and the value of 2 indicating that the event has exceeded the specified frequency is written to the report item having the type of information of "latest".

Next, when the value other than 0 is written to the report item of each record of the accumulative information development table (resource/job) 472, the report unit 6 outputs a report, and presents it to the system administrator etc. The record of (a) in the accumulative information development table (resource/job) 472 in FIG. 47 stores the value of 2 indicating that the event has exceeded the specified frequency. Thus, the information about the event that has exceeded the specified frequency is generated, and is output as a report. The system administrator determines on the screen etc. of the information processing device whether or not it is an abnormal operation, and inputs an NG specification. For the event specified as NG, the report unit 6 writes the value of 1 to the NG item of the corresponding record of the accumulative information development table (user/resource/job) 472.

Figure 48A:
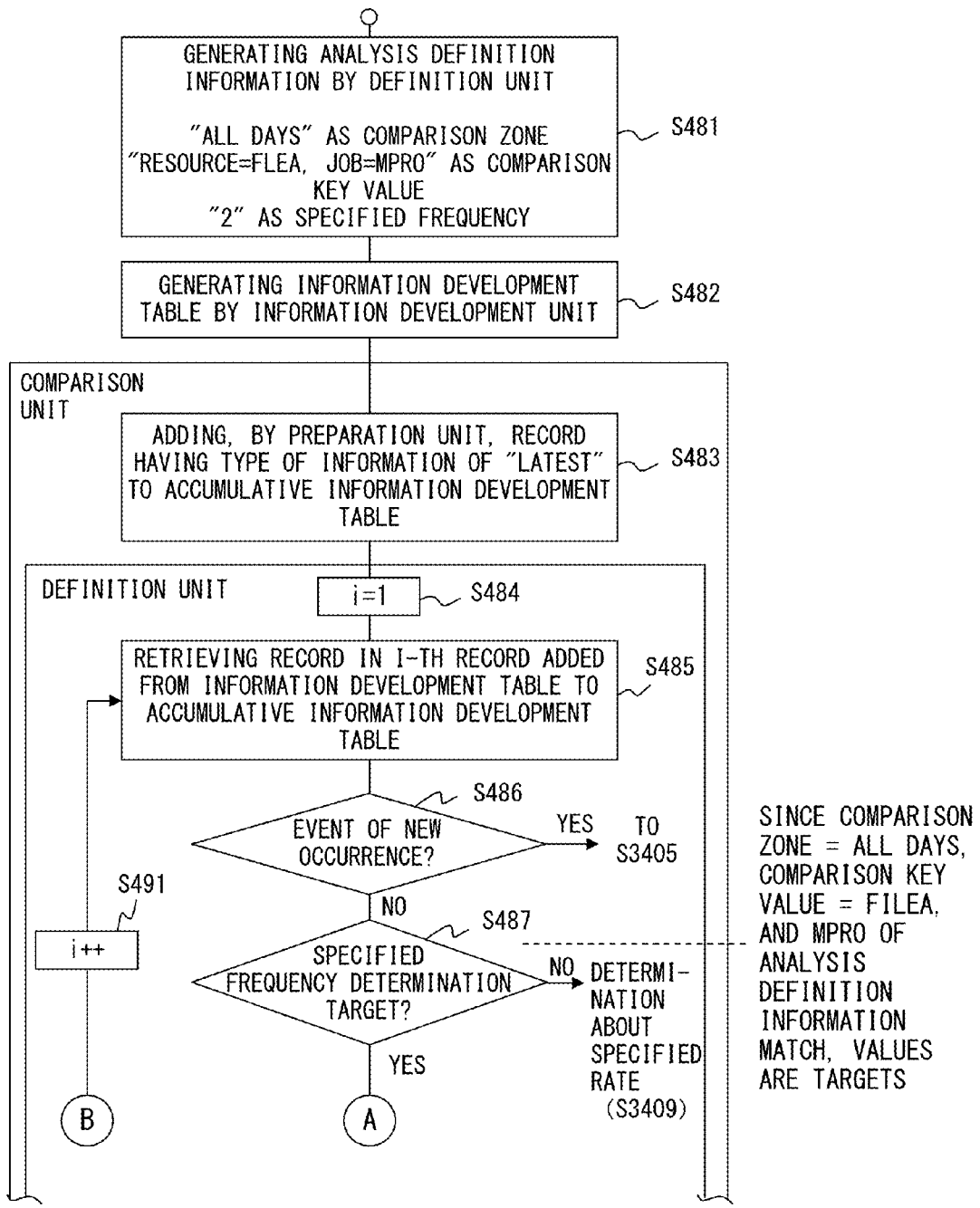
FIGS. 48A and 48B illustrate the process flow according to the embodiment 3.
Figure 48B:
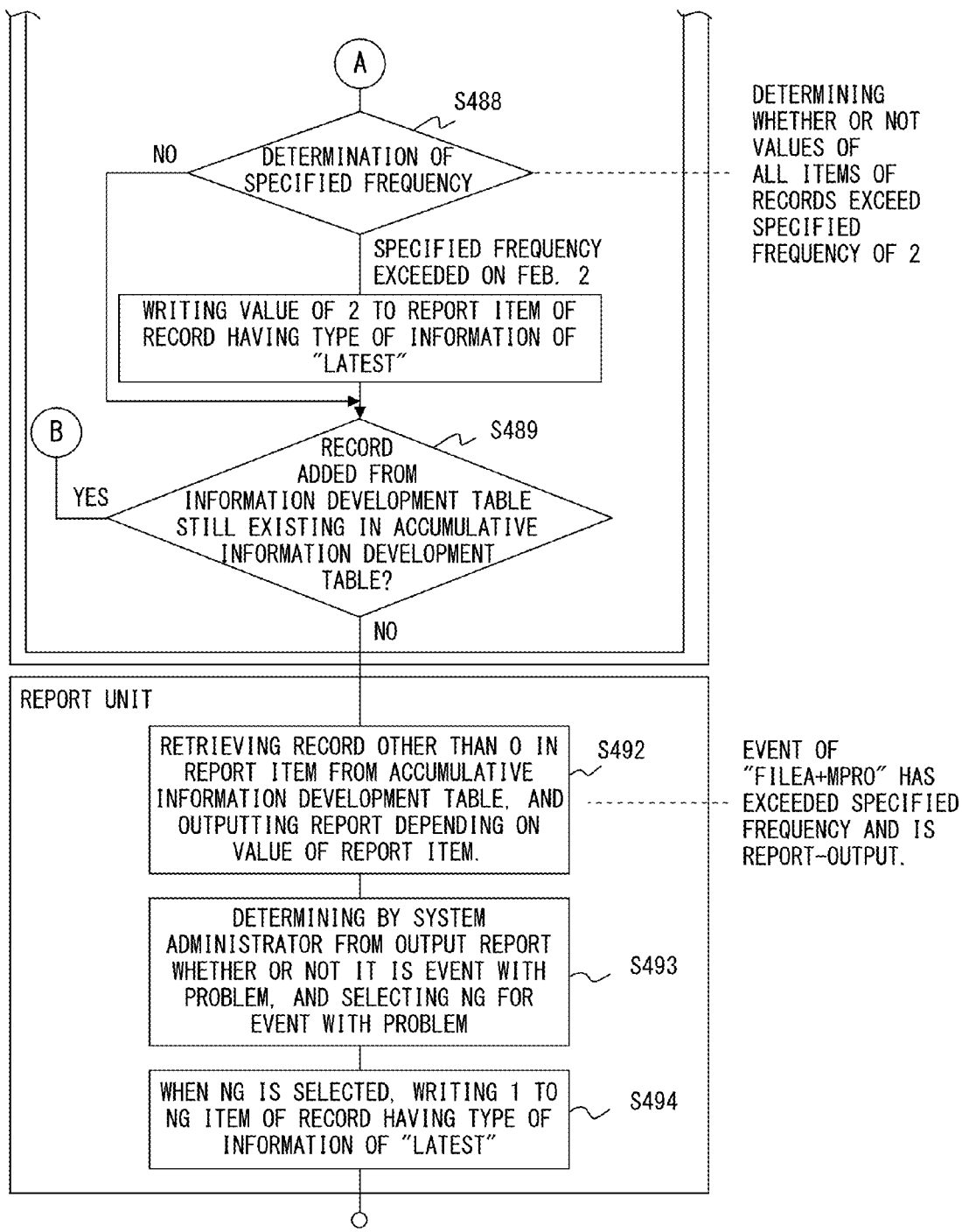

FIGS. 48A and 48B are a process flow according to the embodiment 3. The flowchart mainly illustrates the case in which the operation etc. in FIG. 47 is performed, and the detailed portion not illustrated in the flowchart is illustrated in the flowchart according to the embodiment 1.

First, in S481 in FIG. 48A, the definition unit 1 generates the analysis definition information 461. As illustrated in FIG. 46, the analysis definition information 461 including "all days" as the "comparison zone", "resource=FILEA, job=MPRO" as the "comparison key value", and "2" as the "specified frequency" is generated.

Next, in S482, the information development unit 2 generates the information development table 471. For detail, refer to the flowchart of the information development unit 2 according to the embodiment 1.

Next, in S483, the preparation unit 4 adds the record having the type of information of "latest" to the accumulative information development table 472. In this case, the record (a) "FILEA+MPRO+40+1+ . . . +1" is added. For detail, refer to the flowchart of the preparation unit 4 according to the embodiment 1.

Next, the decision unit 5 performs the processes in S484 through S491.

In S484, the index i is initialized to 1. Then, in S485, the i-th record added from the 471 is retrieved to the accumulative information development table 472. At this time, the record (a) is retrieved. Next, in S486, it is determined whether or not it is an event of a new occurrence. That is, it is determined that when the value of the frequency item of a record having the type of information of "accumulative" is 0, the record is determined as a record of a new occurrence. The record (a) does not match the condition, and is determined NO, thereby passing control to S487. When it is determined that it is an event of a new occurrence in S486, control is passed to S3405 as illustrated in the flowchart of the decision unit 5 according to the embodiment 1.

Next, in S487, it is determined whether or not it is a target of the determination for a specified frequency. If it is determined NO, another fraud detecting process is performed by comparison with a specified rate in the process in S3409 as illustrated by the flowchart of the decision unit 5 according to the embodiment 1. If the determination in S487 is YES, control is passed to S488. In S488, a determination is made for a specified frequency. In S488, it is determined whether or not the values of all items of the record has exceeded a specified frequency. In FIG. 47, the value of 5 of the item of February 2 of the record (a) exceeds the specified frequency of 2. Therefore, control is passed to S489. In S489, the value of 2 indicating that the event occurrence number has exceeded the specified frequency is written to the report item of the record.

Next, in S490, it is determined whether or not there is a record added from the information development table 471 to the accumulative information development table 472. If YES, control is passed to S491. If NO, control is passed to S492. In S491, the index i is incremented, and control is returned to S485.

After S490, the process by the report unit 6 is performed. In S492, a record having a value other than 0 for the report item of each record is retrieved from the accumulative information development table 472, and a report corresponding to the value of the report item is output.

Next, in S493, the system administrator determines from the output report whether or not it is an event with a problem, and inputs NG for an event with a problem. Then, in S494, for the event specified as NG, the report unit 6 writes the value of 1 to the NG item of the record having the type of information of "latest" of the accumulative information development table 472.

The embodiment 3 is described above. According to the present embodiment, when the event occurrence number exceeds a specified frequency, it may be detected as a fraud.

Embodiment 4

Described below is the embodiment 4. The embodiment 4 refers to the case in which a fraud etc. is detected by a specified rate in one day with respect to the frequency of an operation etc.

FIG. 49 illustrates the assumption of the system operation/action according to the embodiment 4.

The database resource=FILEA is processed by an application program (JOBA). The process is performed all day in the range of ±30% of a specified frequency. However, the user B performed an operation two times as much as the normal operation using the application program (JOBA) on Tuesday on February 2. Since the operation has been performed by the user B at higher than the specified rate, it is detected as a fraudulent operation.

FIG. 50 is an example of an analysis definition information 501 when a fraud is detected based on a specified rate.

The "comparison key" refers to "user, resource, job". The "comparison zone" refers to "all days of week" indicating that a comparison is to be made with all days of week. The comparison key value is set as "resource=FILEA, jon=JOBA", and the specified rate is set as "70% through 130%" indicating the range of 100%±30%.

Figure 51B:
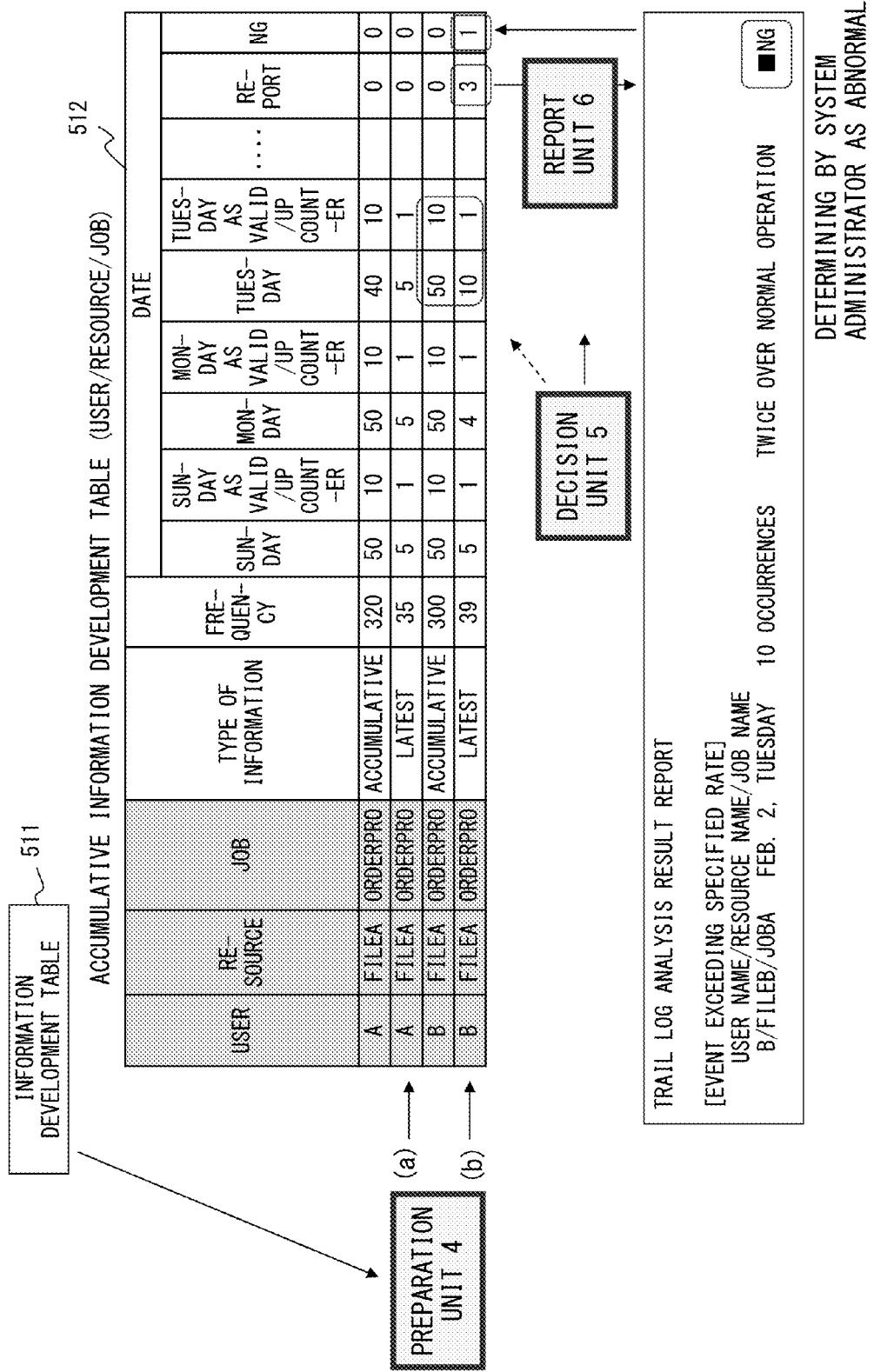
FIG. 51B is an explanatory view (2) of the outline of the process according to the embodiment 4.

FIG. 51 illustrates the outline of the process of the trail log analysis system according to the present embodiment when the system operation/action as illustrated in FIG. 49 is performed.

First, the information development unit 2 generates an information development table from an analysis target trail log 510. Although the information development table is generated on all combinations of a user, a resource, and a job, FIG. 51 illustrates only an information development table (user/resource/job) 511. At this time, the following records (a) and (b) are generated.

(a) "A+FILEA+JOBA+35+5+ . . . +1"
(b) "B+FILEA+JOBA+39+5+ . . . 1"

All item values are 5 for the generated record (a), and ±30% of the specified rate range is observed with respect to the specified frequency of 5 times. Therefore, a fraud is not detected. The "specified frequency" is described later. Relating to the record (b), the item value other than Tuesday is within ±30% of the specified rate range with respect to the specified frequency of 5 times. Therefore, no fraud is detected. However, the item value of Tuesday is "10 times", and the ratio to the specified frequency of 5 times is 200%, thereby detecting a fraud because "out of the specified rate range" is detected.

Each record of the information development table 511 as generated above is added to a accumulative information development table (user/resource/job) 512 by the preparation unit 4.

The decision unit 5 first determines whether or not it is an event of a new occurrence. It is not an event of a new occurrence, a determination for a specified frequency is made. In the determination for a specified frequency, it is first determined whether or not it is an event to be determined. The determination as to whether or not the event is to be determined is made by checking the matching status of the comparison key of the definition of the analysis definition information 501. In FIG. 50, "comparison zone" is "all days of week", and the comparison key value is "resource=FILEA, and job=JOBA". Therefore, all records in the accumulative information development table (user/resource/job) in FIG. 51 are to be determined.

Next, the decision unit 5 determines whether or not the item value of each day of week of the record having the type of information of "latest" is in the specified rate range. The determination is made as follows. First, the item value of each day of week of the record having the type of information of "accumulative" is divided by the UP counter value of each day of week to obtain a specified frequency. It is described using an example of the record (b) in FIG. 51. The item value of Tuesday of the record having the type of information of "accumulative" is 50, and the value of the UP counter is 10. Thus, the specified frequency is "5" by 50/10. For the specified frequency of 5 times, a fraud is determined by determining whether or not the item value of the record having the type of information of "latest" is in the specified rate range. The item value of Tuesday of the record (b) is "10", and it is twice the specified frequency of 5 times, that is, 200%. Therefore, it is determined that the specified range has been exceeded. The decision unit 5 writes the value of 3 indicating that the operation etc. exceeding the specified rate range has been performed to the report item for the event determined as fraudulent.

Next, the report unit 6 outputs a report when a value other than 0 is written to the report item of each record of the accumulative information development table (user/resource/job) 512, and it is presented to the system administrator etc. The value of 3 indicating that the event has exceeded the specified rate is stored in the record (b) in FIG. 51. Thus, the information about the event exceeding the specified rate is generated, and the report is output. The system administrator determines on the screen etc. of the information processing device whether or not it is an abnormal operation, and inputs an NG specification. When the NG specification is performed, the report unit 6 writes the value of 1 to the NG item of the corresponding record of the accumulative information development table (user/resource/job) 512.

Figure 52A:
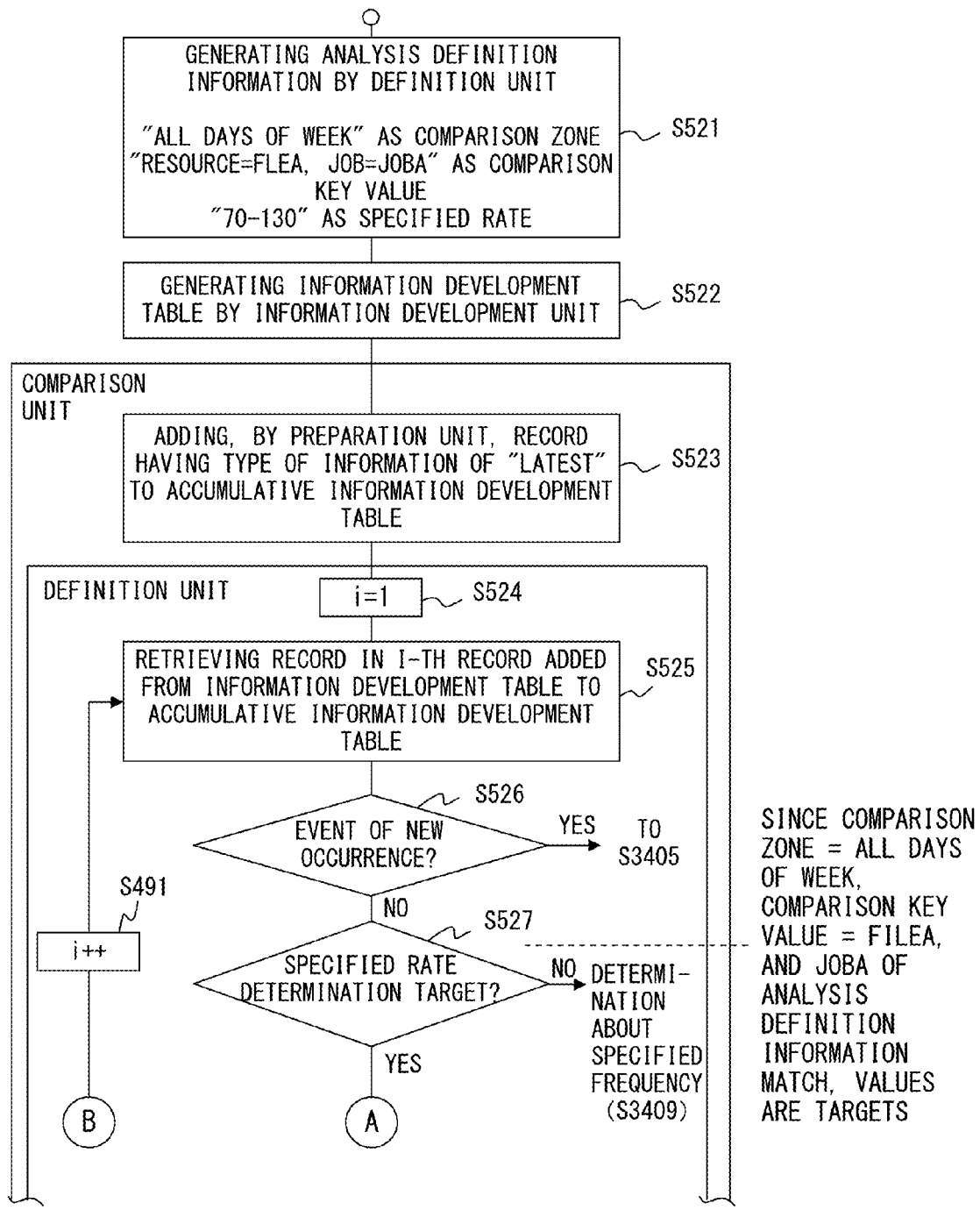
FIGS. 52A and 52B illustrate the process flow according to the embodiment 4.
Figure 52B:
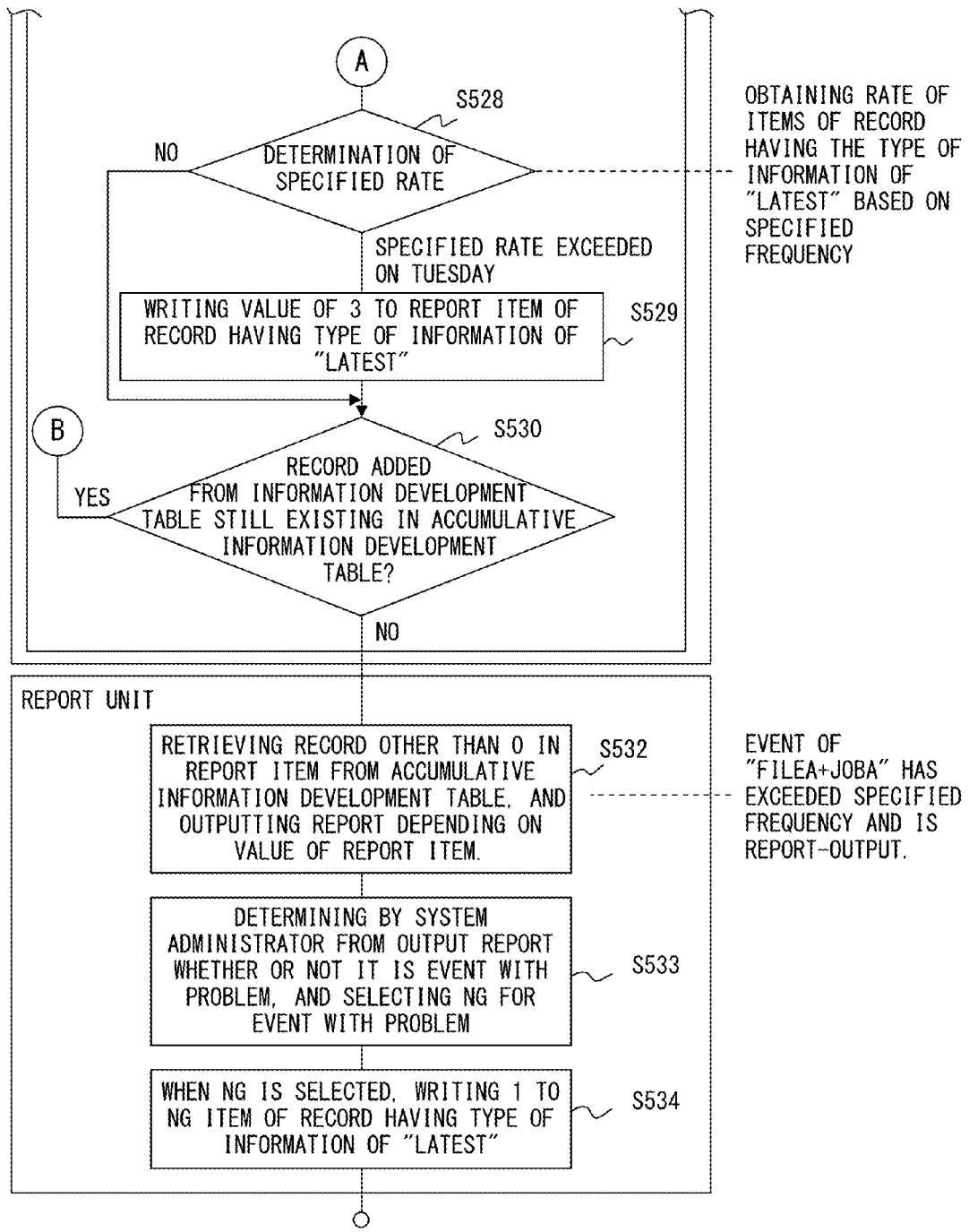

FIGS. 52A and 52B are a process flow of the embodiment 4. The flowchart mainly illustrates the case in which the operation etc. in FIG. 49 is performed, and the detailed portion not illustrated in the flowchart are illustrated in the flowchart according to the embodiment 1.

First, in S521 in FIG. 52A, the definition unit 1 generates the analysis definition information 501. As illustrated in FIG. 50, the analysis definition information 501 in which the "comparison zone" is "all days of week", and the "comparison key value" is "resource=FILEA, job=JOBA", and the "specified rate" is "70% through 130%" is generated.

Next, in S522, the information development unit 2 generates the information development table 511. For detail, the information development unit 2 according to the embodiment 1 is illustrated in the flowchart.

Next, in S523, the preparation unit 4 adds the record having the type of information of "latest" to the accumulative information development table 11. For detail, refer to the flowchart of the information development unit 2 according to the embodiment 1.

Next, the decision unit 5 performs the processes in S524 through S531.

In S524, the index i is initialized to 1. Next, in S525, the i-th record added from the information development table 511 to the accumulative information development table 512 is retrieved. The records (a) and (b) are retrieved. Next, it is determined in S526 whether or not it is an event of a new occurrence. That is, the event of the value of 0 of the frequency item of the record having the type of information of "accumulative" is determined as an event of a new occurrence. The records (a) and (b) do not satisfy the condition, and are determined NO, thereby passing control to S527. If it is determined in S526 as an event of a new occurrence, control is passed to S3405 as illustrated in the flowchart of the decision unit 5 according to the embodiment 1.

Next, in S527, it is determined whether or not a determination for a specified rate is to be made. If the determination is NO, another fraud detecting process is performed by comparison with a specified frequency in the process in S3409 as illustrated by the flowchart of the decision unit 5 according to the embodiment 1. If the determination in S527 is YES, control is passed to S528. In S528, a determination is made for a specified rate. For the determination of the specified rate, as described above, the ratio of each item value of the record having the type of information of "latest" is obtained based on the specified frequency for comparison with the specified rate. That is, the record (b) has the item value of 10 for Tuesday. When the ratio based on the specified frequency of 5 times is obtained, it is 200%. The value is out of the range of 70% through 130% of specified rate. Control is passed to S529, and the report unit 6 writes the value of 3 indicating that the range of the specified rate is exceeded to the report item of the record.

Next, in S530, it is determined whether or not there is a record added from the information development table 511 to the accumulative information development table 512. If YES, control is passed to S531. If NO, control is passed to S532. In S531, the index i is incremented, and control is returned to S525.

After S530, the process by the report unit 6 is performed. In S532, a record having a value other than 0 for the report item of each record is retrieved from the accumulative information development table 512, and a report corresponding to the value of the report item is output.

Next, in S533, the system administrator determines from the output report whether or not it is an event with a problem, and inputs NG for an event with a problem. Then, in S534, for the event specified as NG, the report unit 6 writes the value of 1 to the NG item of the record having the type of information of "latest" of the accumulative information development table 11.

The embodiment 4 is described above. According to the present embodiment, when the event occurrence rate exceeds a specified rate, it may be detected as a fraud.

Embodiment 5

Described below is the embodiment 5. The embodiment 5 refers to the case in which a fraud etc. is detected by determining whether or not the operation is performed according to the application information.

Figure 53:
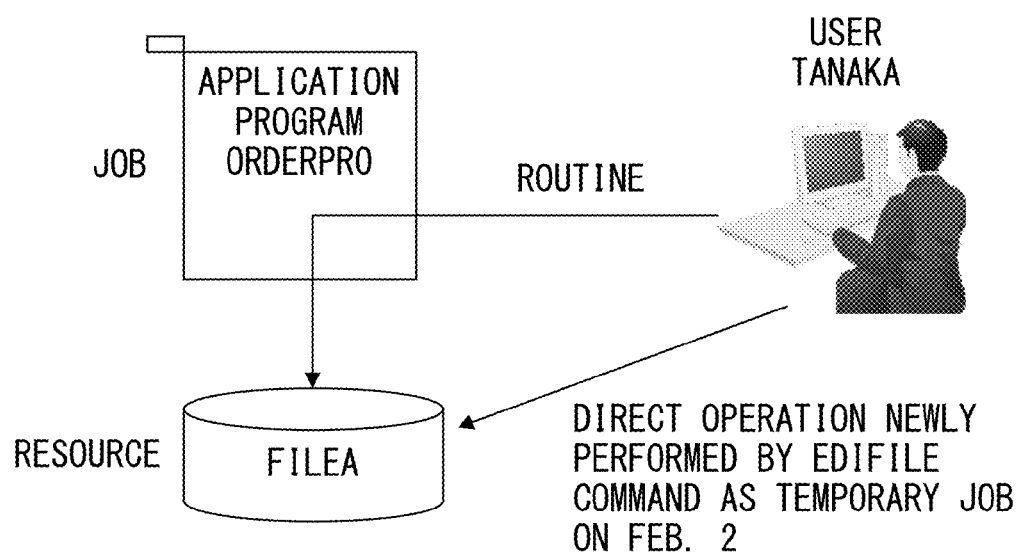
FIG. 53 is an explanatory view of an operation etc. according to the embodiment 5.

FIG. 53 illustrates the assumption of the system operation/action according to the embodiment 5.

That is, the order database resource=FILEA is processed only by an order application program (ORDERPRO). Since the user TANAKA requested to correct FILEA directly by the EDITFILE command on February 2, an advance application was presented by specifying February 2 at 10:00 through 12:00 as the operation date and time according to the trail log information about the operation collected previously. Afterwards, on February 2, the operation of correcting FILEA directly by the EDITFILE command on February 2.

Figure 54A:
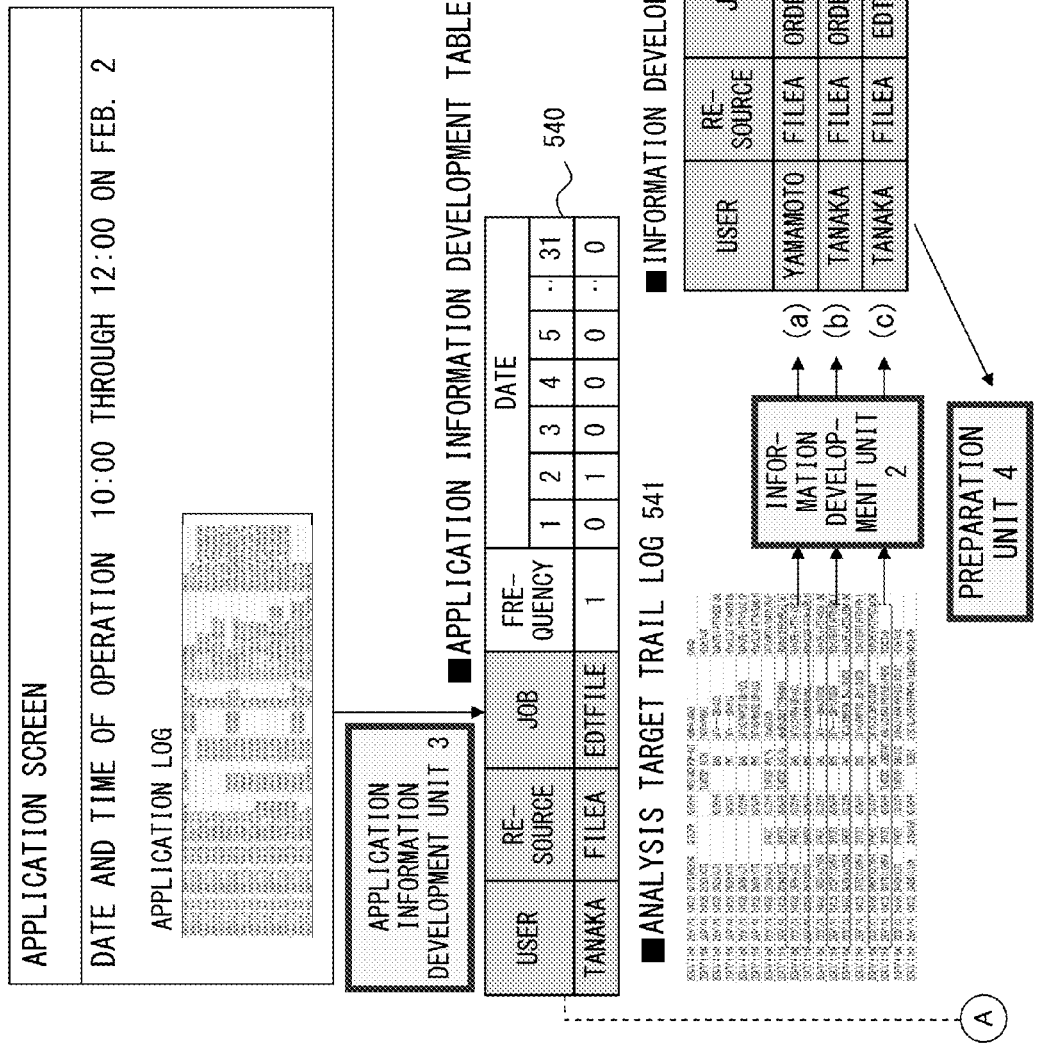
FIG. 54A is an explanatory view (1) of the outline of the process according to the embodiment 5.
Figure 54B:
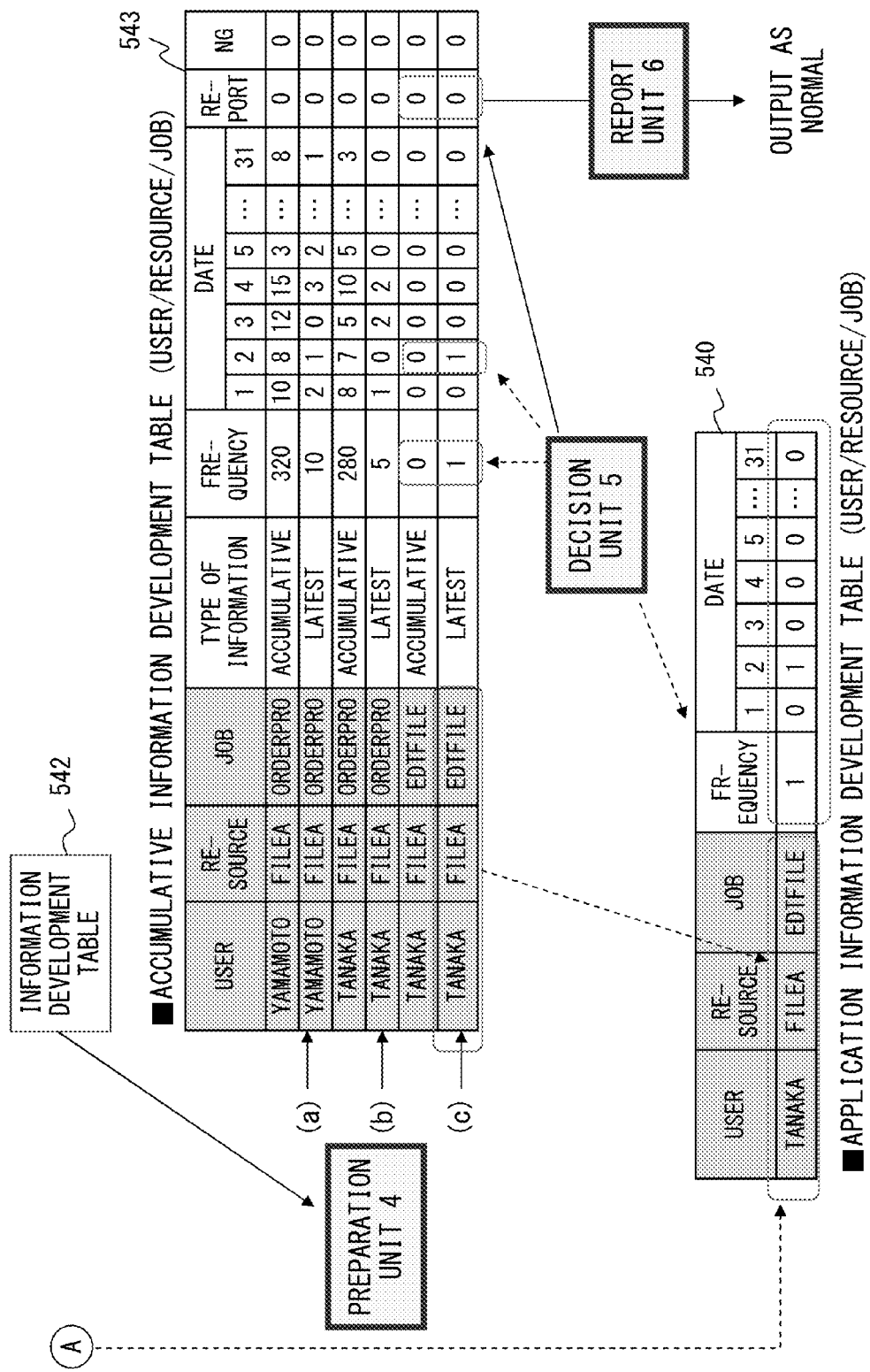
FIG. 54B is an explanatory view (2) of the outline of the process according to the embodiment 5.

FIG. 54 illustrates the outline of the process of the trail log analysis system according to the present embodiment in the case illustrated in FIG. 53.

First, the system administrator approves the operation applied for in advance. Then, an application information development table 540 is generated according to the information applied for in advance by the application information development unit 3. FIG. 53 is an example of a generated application information development table (user/resource/job) 540. That is, the value of the frequency of the trail log information applied for, that is, the value of 1 indicating the frequency of 1, is written to the item indicating the 2nd day as the date of the record having the value of the comparison key of "TANAKA+FILEA+EDTFILE", thereby generating the table.

Next, the analysis target trail log collected on February 2 is analyzed. First, the information development unit 2 generates an information development table 542 from an analysis target trail log 541. In this case, the following records (a), (b), and (c) are generated in the information development table 542 illustrated in FIG. 54.

(a) "YAMAMOTO+FILEA+ORFERPRO+10+2+ . . . 1"
(b) "TANAKA+FILEA+ORDERPROL+5+1+ . . . 0"
(c) "TANAKA+FILEAL+EDTFILE+1+0+ . . . 0"

In these records, the records (a) and (b) are records corresponding to a normal operation performed by the order application program (ORDERPRO). The record (c) corresponds to the log obtained by editing the file directly by the EDITFIEL command by the user TANAKA, and is a record for similar operation set in the application information table.

Next, the generated information development table 542 is added to an accumulative information development table 543 by the preparation unit 4. The records (a), (b), and (c) are added to the accumulative information development table 543 in FIG. 54.

Next, the decision unit 5 determines whether or not it is an event of a new occurrence. Whether or not it is an event of a new occurrence is made by determining the frequency item value other than 0 of the record having the type of information of "latest" and the frequency item value of 0 of the record having the type of information of "accumulative" as a newly performed operation or action. In FIG. 54, it is determined that the record (c) is an event of a new occurrence.

Furthermore, the decision unit 5 determines whether or not a record determined as an event of a new occurrence is an even applied for in advance. That is, it is determined whether or not there is the same comparison key value in the application information development table 540. When there is a record having the same comparison key value, it is determined whether or not the value of each item of the record is identical. In FIG. 54, since the comparison key and each item value of the record of an application information development table 540 and the record (c) are identical, the operation corresponding to the record (c) is not fraudulent operation etc., but is determined as a normal operation. If an operation is determined as a normal operation, the report unit 6 does not write anything to the report item of the corresponding record of the accumulative information development table 543.

Next, when a value other than 0 is written to the report item of each record of the information development table 542, the report unit 6 outputs a report, and presents it to the system administrator. Any value other than 0 is not stored in the report item of the record of the accumulative information development table 543 (a), (b), and (c) in FIG. 54. Therefore, a report of the normal operation of the system is displayed.

Figure 55B:
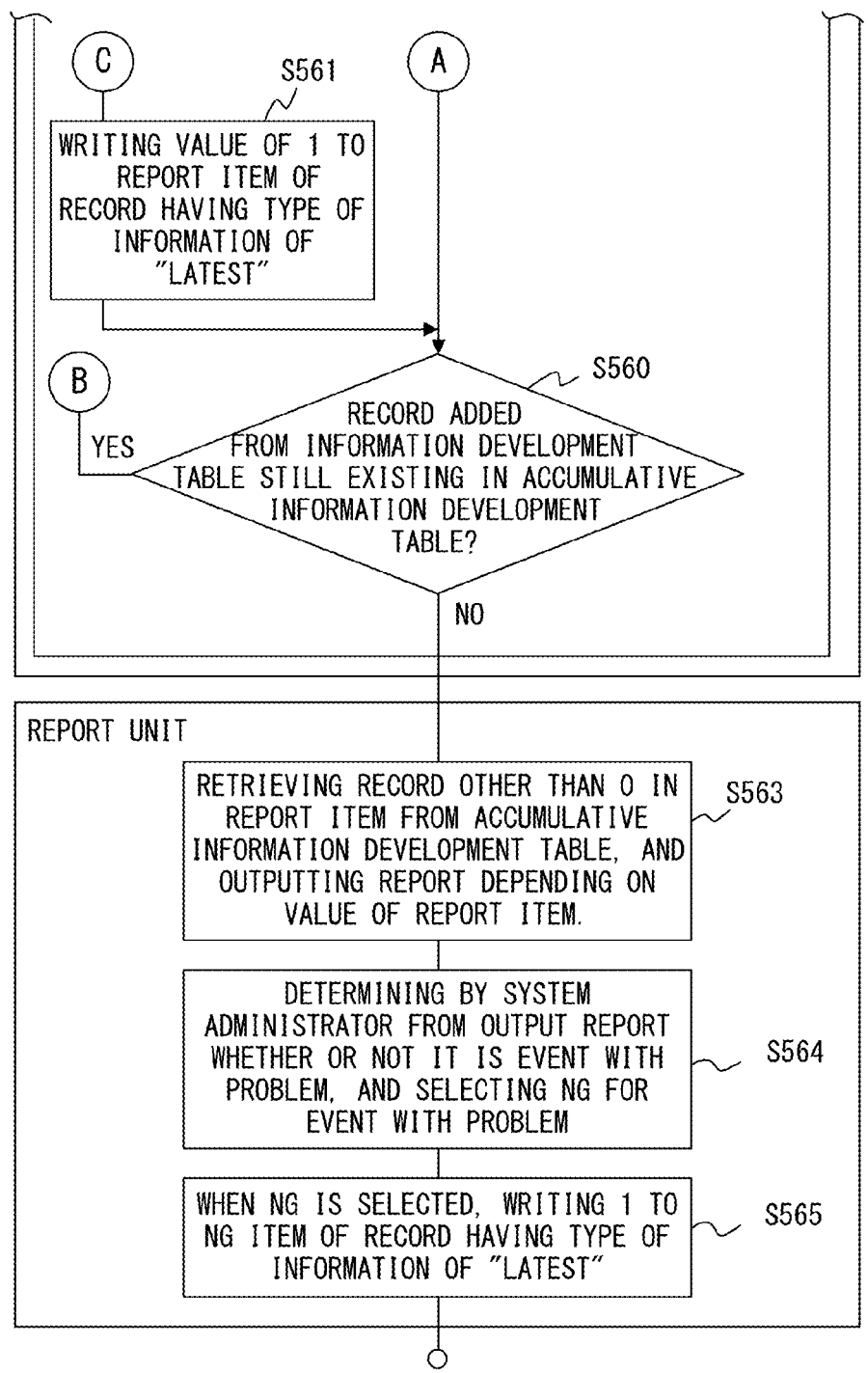

FIGS. 55A and 55B are a process flow according to the embodiment 5. The flowchart mainly illustrates the case in which the operation etc. in FIG. 53 is performed, and the detailed portion not illustrated in the flowchart is illustrated in the flowchart according to the embodiment 1.

First, although not illustrated in FIGS. 55A and 55B, the application information development unit 3 performs the process of converting the information applied for in advance into the application information development table 13. For detail, the flowchart of the application information development unit 3 according to the embodiment 1 is realized. Then, the trail log information is analyzed according to the flowchart illustrated in FIGS. 55A and 55B.

First, in S551 in FIG. 55A, the definition unit 1 generates the analysis definition information not illustrated in the attached drawings. Since the present embodiment is similar to detecting a newly performed operation/action, only setting a comparison key is requested.

Next, in S552, the information development unit 2 generates the information development table 542 from the analysis target trail log 541. For detail, refer to the flowchart of the information development unit 2 according to the embodiment 1.

Next, in S553, the preparation unit 4 adds the record having the type of information of "latest" to the accumulative information development table 543. The records (a), (b), and (c) are added. For detail, refer to the flowchart of the preparation unit 4 according to the embodiment 1.

Next, the decision unit 5 performs the processes in S554 through S562.

In S554, the index i is initialized to 1. Next, in S555, the i-th record added from the information development table 542 to the accumulative information development table 543 is retrieved. The records (a), (b), and (c) are retrieved. Next, it is determined in S556 whether or not it is an event of a new occurrence. That is, an event of the value of 0 of the frequency item of the corresponding record having the type of information of "accumulative" is determined as an event of a new occurrence. Thus, the record (c) is determined as an event of anew occurrence. For an event determined not as an event of a new occurrence in S556, control is passed to S3409 as illustrated in the flowchart of the decision unit 5 according to the embodiment 1.

Next, it is determined whether or not the record determined as an event of a new occurrence is an applied event. That is, in S557, S558, and S559, it is determined whether or not the identical comparison key exists in the application information development table 540, a record of the identical comparison key value exists, and the identical value of each item of the record is detected. If the determinations are all YES in S557, S558, and S559, no processes are performed, and control is passed to S560. If any determination in S557, S558, and S559 is NO, it is not an operation corresponding to an event applied for in advance. Therefore, the value of 1 is written to the report item of the record having the type of information of "latest".

After S559 or S561, it is determined in S560 whether or not there is still a record added from the information development table 542 to the accumulative information development table 543. If there is the record (YES), control is passed to S562. If there is not the record (NO) control is passed to S563. In S562, the index i is incremented by 1, and control is returned to S555.

After the process in S560, the process by the report unit 6 is performed. In S563, the report unit 6 retrieves a record having the value other than 0 for the report item of each record from the accumulative information development table 543, and a report corresponding to the value of the report item is output.

Next, in S564, the system administrator determines from the output report whether or not there is a problem with the event, and inputs NG to an event with a problem. Then, in S565, the report unit 6 writes the value of 1 to the NG item of the record having the type of information of "latest" of the accumulative information development table 543.

As described above, the embodiment 5 is described. According to the present embodiment, a newly performed operation/action may be detected.

Embodiment 6

Described next is the embodiment 6. The embodiment 6 is described for the case in which the correctness of a system operation is confirmed.

The assumption of the system operation/action is described as follows. That is, the contents of daily operations are identical, and all operations and action frequency on the system are performed constantly at a specified frequency every day with a change within about 30% normally. In a certain month, "the user B did not perform the operation of processing the resource (FILEA) with the application program (JOBA)" which is normally processed.

FIG. 56 illustrates an analysis definition information 561 according to the present embodiment. "All days of week" to compare the "comparison zone" on all days of week is specified, the "comparison key value" is specified for "all keys" to perform all operations/actions, and "70% through 130%" indicating the range of about 30% is specified for the "specified rate".

Figure 57:
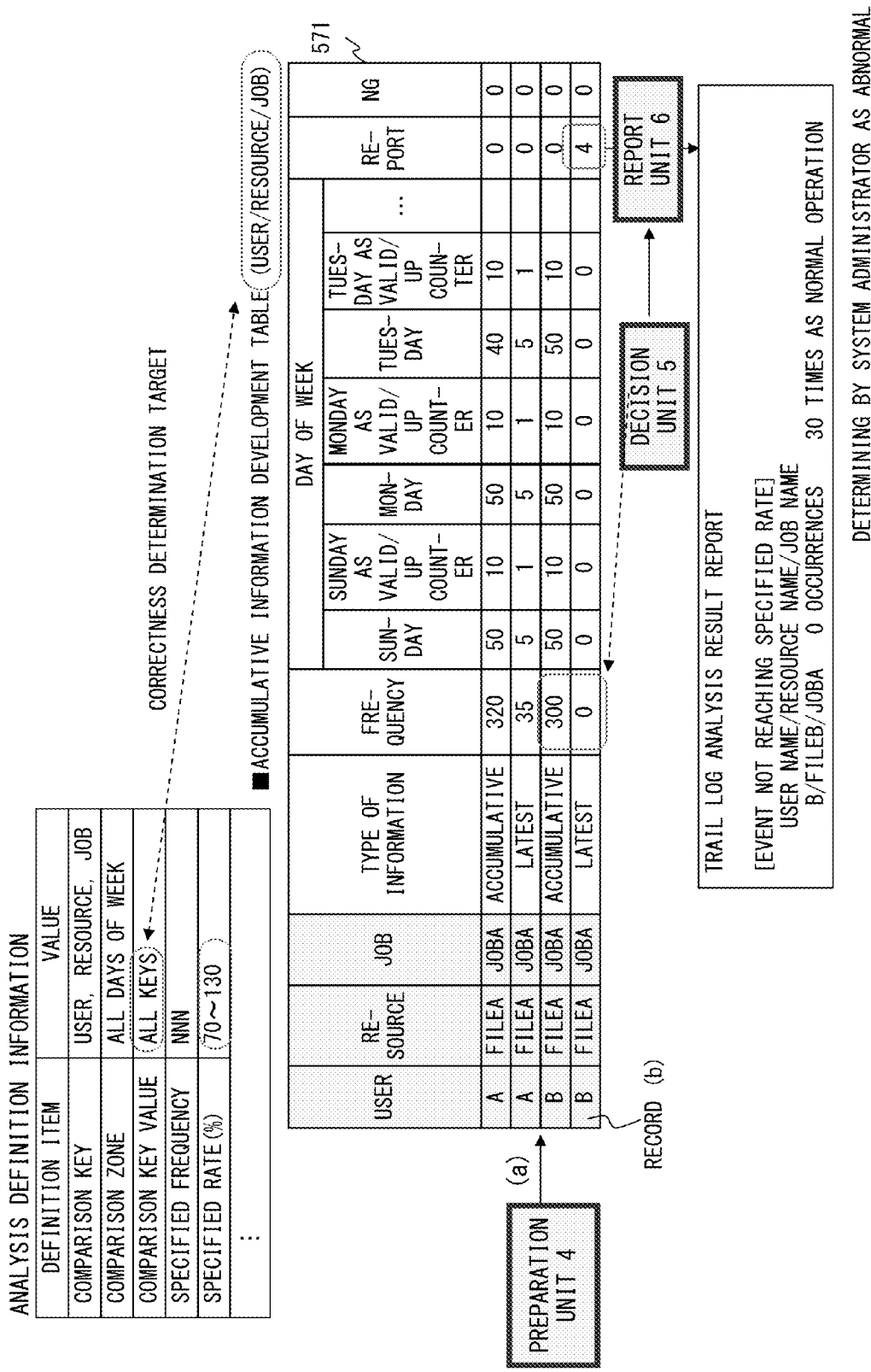
FIG. 57 illustrates the outline of the process according to the embodiment 6.

FIG. 57 illustrates the outline of the process of the trail log analysis system according to the present embodiment. First, in the information development table in which the information has been developed from the trail log to be analyzed, the preparation unit 4 adds the record having the type of information of "latest" to an accumulative information development table 571. In FIG. 57, the record (a) is added.

Record (a): "A+FILEA+JOBA+LATEST+35+ . . . "

In addition, each item of the record having the type of information of "accumulative" of the accumulative information development table 571 stores the value indicating the frequency of the daily operation and action. Since the user B does not perform the process of the resource FILEA with the application program JOB, the record (b) is not specifically updated in the accumulative information development table 571. (record (b): "B+FILEA+JOBA+LATEST+0 . . . "

After the decision unit 5 determines a fraud of the "specified frequency" and "specified rate" with respect to the "event of a new occurrence" of the record having the type of information of "latest", the correctness confirmation is performed on the record having the type of information of "latest" with the value of 0 for the frequency. The confirmation of the correctness is performed by detecting no operation or action while a specified operation and action were performed previously.

The confirmation of the correctness is made by determining whether or not the specified rate has been specified corresponding to the comparison key value of the accumulative information development table in the analysis definition information 561. According to the present embodiment, the comparison key value is "all keys", and the specified rate is set. Next, the decision unit 5 retrieves the record having the type of information of "latest" and having the value of 0 of the frequency item, and the record having the type of information of "accumulative" and having the value other than 0 of the frequency item. The event of the record has no operation or action while there were specified operations and actions previously. In FIG. 57, the record (b) ("B+FILE+JOBA") satisfies the condition, and is determined as the event having no operation or action in the last process while there were specified operations and actions previously. Thus, the value of 4 indicating the occurrence of an event does not satisfy the range of the specified rate is written to the report item of the corresponding record.

Then, the report unit 6 next outputs a report and presents it to the system administrator etc. when the value other than 0 is written to the report item of each record of the accumulative information development table 571.

Thus, according to the present embodiment, the system administrator etc. may detect that normally performed job, operation, etc. are not performed, and confirm the abnormal system operation. That is, it means that the normally performed job and operation are correctly performed, thereby confirming the correctness of the system.

Figure 58:
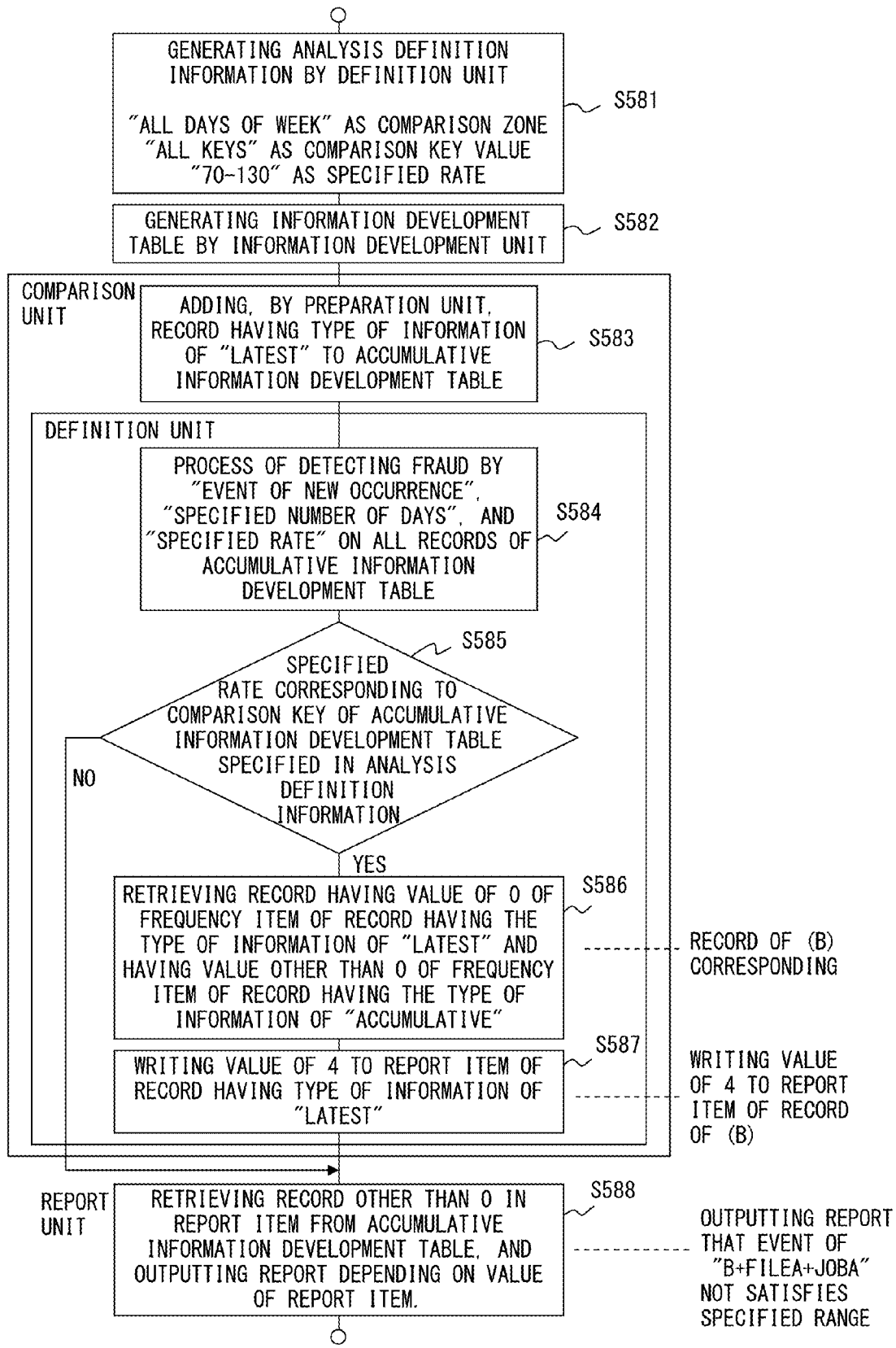
FIG. 58 illustrates the process flow according to the embodiment 6.

FIG. 58 is a system flowchart according to the embodiment 6. The flowchart specifically refers to the case in which the operation etc. in FIG. 47 is performed, and the detailed portion not illustrated in the flowchart is described in the flowchart according to the embodiment 1.

First, in S581 in FIG. 58, the definition unit 1 generates the analysis definition information 561. As illustrated in FIG. 566, the analysis definition information 561 is generated with "all days of week" as "comparison zone", "all keys" as "comparison key", and "70% through 130%" as "specified rate".

Next, in S582, the information development unit 2 generates an information development table.

Next, in S583, the preparation unit 4 adds the record having the type of information of "latest" to the accumulative information development table 571. For detail, refer to the flowchart of the preparation unit 4 according to the embodiment 1.

Next, the decision unit 5 performs the processes in S584 through S587.

In S584, the fraud detecting process is performed using "new event", "specified frequency", and "specified rate" on all records of the accumulative information development table.

Next, in S585, it is determined whether or not there is the analysis definition information 561 corresponding to the comparison key value of the accumulative information development table 571 in the analysis definition information 561. If there is no such information, control is passed to the process of the report unit 6. If there is the information, a record having the value of 0 of the frequency item of the record having the type of information of "latest" and a record having a value other than 0 of the frequency item value of record having the type of information of "accumulative" is retrieved. Then, in S587, the value of 4 indicating that the occurrence of an event does not satisfy the specified rate is written to the report item of the retrieved record (record having the type of information of "latest").

After the process by the decision unit 5, the process of the report unit 6 is performed. The report unit 6 retrieves a record having a value other than 0 for the report item of each record from the accumulative information development table 571 in S588, and outputs a report depending on the value of the report item. In the case of the present embodiment, the information that an event which normally occurs has not occurred in the latest process is displayed.

The embodiment 6 is described above. According to the present embodiment, the correctness of the system operation may be confirmed.

Thus, the embodiments 2 through 6 are described above in detail.

According to the embodiment 2, a newly performed operation or action may be detected as a fraud. According to the embodiment 3, a fraud etc. may be detected by a specified frequency in one day on a certain operation etc. According to the embodiment 4, a fraud may be detected by a specified rate in one day on a certain operation. According to the embodiment 5, a fraud etc. may be detected depending on whether or not an operation applied for in advance is maintained. According to the embodiment 6, the correctness of a system operation may be determined.

The respective embodiments are described above in detail, but it is obvious that the present invention is not limited to what is described above in the respective embodiments. For example, in the embodiments above, when the information development table is compared with the accumulative information development table in the comparing process, the comparing process is performed after adding a record of the information development table to the accumulative information development table. However, it is only a method for comparing the information development table with the accumulative information development table, and any process capable of comparing the tables is acceptable. Also, the configurations of the information development table and the accumulative information development table are described above, but the present invention is not limited to the configurations of the embodiments above, and any information for comparison between the number of occurrences of an event in a trail log to be analyzed and the number of occurrences of accumulated events is acceptable. Thus, the present invention is not limited to the descriptions above, but many variations may be made in a range within the scope of the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (cave) been described in detail, it should be understood that the various changes, substitutions, and alterations could be made hereto without departing from the spirit and scope of the invention.

What is claimed is:

1. A trail log analysis system comprising:
a processor that:
defines as comparison targets a subject, an object, and an action in a trail log of an information system, count an event occurrence number for each time zone corresponding to an event occurrence time recorded on a trail log to be analyzed which was last collected for each combination of the comparison targets, and generates a first information development table;
generates a second information development table by accumulating the event occurrence number of the first information development table corresponding to a trail log recorded previously and up to a time point immediately before the last collected trail log to be analyzed when the event occurrence number of the first information development table corresponds to a normal event, wherein the processor does not accumulate the event occurrence number of the first information development table in the second information development table when the event occurrence number of the first information development table corresponds to an abnormal event; and
compares the first information development table with the second information development table, and outputs a comparison result,
wherein the processor detects an event corresponding to a combination A as a newly performed operation and outputs the comparison result when the combination A of the comparison targets included in the first information development table does not exist in combinations of the comparison targets of the second information development table.

2. The system according to claim 1, wherein the processor sets analysis definition information for regulation of a configuration and a comparison condition of the first information development table.

3. The system according to claim 2, wherein the processor counts the event occurrence number for each day according to the analysis definition information to generate the first information development table.

4. The system according to claim 2, wherein the processor counts the event occurrence number for each day of week according to the analysis definition information to generate the first information development table.

5. The system according to claim 2, wherein the processor counts the event occurrence number for each hour according to the analysis definition information to generate the first information development table.

6. The system according to claim 2, wherein the processor makes a comparison with an event occurrence number for each time zone of a combination of comparison targets corresponding in the first information development table and outputs the comparison result when an event occurrence number corresponding to a combination of the comparison targets is defined as a specified frequency in the analysis definition information.

7. The system according to claim 2, wherein the processor obtains an occurrence rate using an event occurrence number for each time zone of a combination of comparison targets corresponding in the first information development table and a corresponding accumulative event occurrence number, compares the occurrence rate with a specified rate, and outputs the comparison result when an event occurrence rate corresponding to a combination of the comparison targets is defined as the specified rate in the analysis definition information.

8. The system according to claim 1, wherein
the processor generates a third information development table corresponding to an operation when an irregular operation which is not normally performed is entered in advance,
when there is an event detected as a newly performed operation in the comparison result, the processor further compares the third information development table with the first information development table, and
when it is determined that the newly performed operation has been entered in advance, the processor determines that the event is not a fraudulent operation.

9. The system according to claim 1, wherein when an event occurrence rate corresponding to a combination of the comparison targets is defined as a specified rate in the analysis definition information, and there is no combination of corresponding comparison targets in the information development table, the processor outputs information that a normal operation is not being performed, and correctness of a system operation is not confirmed.

10. The system according to claim 9, wherein the processor adds a record obtained by counting and recording an event occurrence number for each time zone corresponding to a combination of comparison targets configuring the first information development table to the second information development table with attached information that the record corresponds to a last acquired trail log to be analyzed, and makes a comparison by reference to the second information development table only.

11. The system according to claim 1, wherein the processor does not accumulate a record obtained by counting and recording the event occurrence number for each time zone in the first information development table in the second information development table when it is determined that the record does not refer to a normal operation.

12. The system according to claim 1, wherein the processor reports to and makes an entry with an existing fraudulent operation guard function for prohibiting execution of a fraudulent operation about a combination of comparison targets which has been determined as a fraudulent operation, and prohibits execution of a similar fraudulent operation in subsequent processes.

13. A non-transitory computer readable storage medium storing a trail log analysis program used to direct an information processing device to perform:
an information developing to define as comparison targets a subject, an object, and an action in a trail log of an information system, to count an event occurrence number for each time zone corresponding to an event occurrence time recorded on a trail log to be analyzed which has last collected for each combination of the comparison targets, and to generate a first information development table;
an accumulating to generate a second information development table by accumulating the event occurrence number of the first information development table corresponding to a trail log recorded previously and up to a time point immediately before the last collected trail log to be analyzed when the event occurrence number of the first information development table corresponds to a normal event, wherein the accumulating does not accumulate the event occurrence number of the first information development table in the second information development table when the event occurrence number of the first information development table corresponds to an abnormal event; and
a comparing to compare the first information development table with the second information development table, and to output a comparison result,
wherein the comparing detects an event corresponding to a combination A as a newly performed operation and outputs the comparison result when the combination A of the comparison targets included in the first information development table does not exist in combinations of the comparison targets of the second information development table.

14. The medium according to claim 13, further directing the information processing device to perform an analysis definition information setting to set analysis definition information for regulation of a configuration and comparison information of the first information development table.

15. The medium according to claim 13, further directing the information processing device to perform an application information developing to generate a third information development table corresponding to an operation when an irregular operation which is not normally performed is entered in advance,
wherein when there is an event detected as a newly performed operation in the comparison result, the comparing further compares the third information development table with the information development table, and when it is determined that the newly performed operation has been entered in advance, the comparing determines that the event is not a fraudulent operation.

16. The medium according to claim 13, wherein the comparing adds a record obtained by counting and recording an event occurrence number for each time zone corresponding to a combination of comparison targets configuring the first information development table to the accumulative second information development table with attached information that the record corresponds to a last acquired trail log to be analyzed, and makes a comparison by reference to the second information development table only.

17. The medium according to claim 13, wherein the accumulating does not accumulate a record obtained by counting and recording an event occurrence number for each time zone in the first information development table in the second information development table when it is determined that the record does not refer to a normal operation.

18. A trail log analysis method conducted by an information processing device, the method comprising:
defining as comparison targets a subject, an object, and an action in a trail log of an information system, counting an event occurrence number for each time zone corresponding to an event occurrence time recorded on a trail log to be analyzed which has last collected for each combination of the comparison targets, and generating a first information development table;
generating a second information development table by accumulating the even occurrence number of the first information development table corresponding to a trail log recorded previously and up to a time point immediately before the last collected trail log to be analyzed when the event occurrence number of the first information development table corresponds to a normal event, wherein the generating does not accumulate the event occurrence number of the first information development table in the second information development table when the event occurrence number of the first information development table corresponds to an abnormal event; and comparing the first information development table with the second information development table, and outputting a comparison result,
wherein the comparing detects an event corresponding to a combination A as a newly performed operation and the outputting outputs the comparison result when the combination A of the comparison targets included in the first information development table does not exist in combinations of the comparison targets of the second information development table.

* * * * *